US011481726B2

(12) United States Patent
Adato et al.

(10) Patent No.: US 11,481,726 B2
(45) Date of Patent: Oct. 25, 2022

(54) MANAGING INVENTORY OF PERISHABLE PRODUCTS

(71) Applicant: Trax Technology Solutions Pte Ltd., Singapore (SG)

(72) Inventors: Yair Adato, Kfar Shmuel (IL); Mark Cook, Tel Aviv (IL); Ziv Mhabary, Tel Aviv (IL); Dolev Pomeranz, Hod Hasharon (IL); Itai Lishner, Yahud (IL)

(73) Assignee: Trax Technology Solutions Pte Ltd., Singapore (SG)

(*) Notice: Subject to any disclaimer, the term of this patent is extended or adjusted under 35 U.S.C. 154(b) by 263 days.

(21) Appl. No.: 16/569,655

(22) Filed: Sep. 12, 2019

(65) Prior Publication Data

US 2020/0074373 A1 Mar. 5, 2020

Related U.S. Application Data

(63) Continuation of application No. PCT/US2019/049528, filed on Sep. 4, 2019.
(Continued)

(51) Int. Cl.
*G06Q 10/00* (2012.01)
*G06K 9/00* (2022.01)
(Continued)

(52) U.S. Cl.
CPC ..... *G06Q 10/0875* (2013.01); *G06F 16/5866* (2019.01); *G06K 9/6267* (2013.01);
(Continued)

(58) Field of Classification Search
CPC .......................................... G06Q 10/00–50/00
(Continued)

(56) References Cited

U.S. PATENT DOCUMENTS

| 2012/0323620 | A1* | 12/2012 | Hofman | G06Q 10/06 |
| | | | | 705/7.11 |
| 2013/0039543 | A1* | 2/2013 | Fuhr | G06Q 10/087 |
| | | | | 382/103 |

(Continued)

FOREIGN PATENT DOCUMENTS

| EP | 2662831 A2 | 11/2013 |
| WO | WO 2018/002709 | 1/2018 |
| WO | WO 2019/048924 | 3/2019 |

OTHER PUBLICATIONS

International Search Report and Written Opinion, dated Jan. 8, 2020 in corresponding international application No. PCT/US2019/049528, issued from the International Searching Authority (11 pages).

*Primary Examiner* — Mustafa Iqbal
(74) *Attorney, Agent, or Firm* — Finnegan, Henderson, Farabow, Garrett & Dunner LLP

(57) ABSTRACT

A system for identifying perishable products in a retail store based on analysis of image data and for automatically generating suggestions relating to the identified products is provided. The system may comprise at least one processor configured to: receive a set of images depicting a plurality of perishable products displayed on at least one shelving unit in a retail store; analyze the set of images to determine information about a displayed inventory of the plurality of perishable products; obtain information about additional perishable products scheduled to be displayed on the at least one shelving unit; use the information about the displayed inventory and the information about the additional perishable products to determine at least one suggestion regarding placement of perishable products in the retail store; and provide the at least one suggestion to an entity associated with the retail store.

31 Claims, 41 Drawing Sheets

Related U.S. Application Data

(60) Provisional application No. 62/773,427, filed on Nov. 30, 2018, provisional application No. 62/727,301, filed on Sep. 5, 2018.

(51) Int. Cl.
| | |
|---|---|
| *G06F 16/00* | (2019.01) |
| *G06V 20/00* | (2022.01) |
| *G06Q 10/08* | (2012.01) |
| *G06Q 10/06* | (2012.01) |
| *G06K 9/62* | (2022.01) |
| *G06F 16/58* | (2019.01) |
| *G06V 20/52* | (2022.01) |

(52) U.S. Cl.
CPC ..... *G06Q 10/06315* (2013.01); *G06Q 10/087* (2013.01); *G06V 20/00* (2022.01); *G06V 20/52* (2022.01)

(58) Field of Classification Search
USPC .................................................. 705/29, 7.29
See application file for complete search history.

(56) References Cited

U.S. PATENT DOCUMENTS

| | | | |
|---|---|---|---|
| 2014/0122169 A1* | 5/2014 | Jung | G06Q 30/0201 705/7.29 |
| 2017/0193430 A1 | 7/2017 | Avegliano et al. | |
| 2017/0337508 A1 | 11/2017 | Bogolea et al. | |
| 2018/0007453 A1* | 1/2018 | Taylor | H04Q 9/00 |
| 2018/0060804 A1 | 3/2018 | Cheruku et al. | |
| 2018/0114415 A1* | 4/2018 | Mattingly | G08B 21/182 |
| 2018/0365822 A1* | 12/2018 | Nipe | G06V 10/40 |

\* cited by examiner

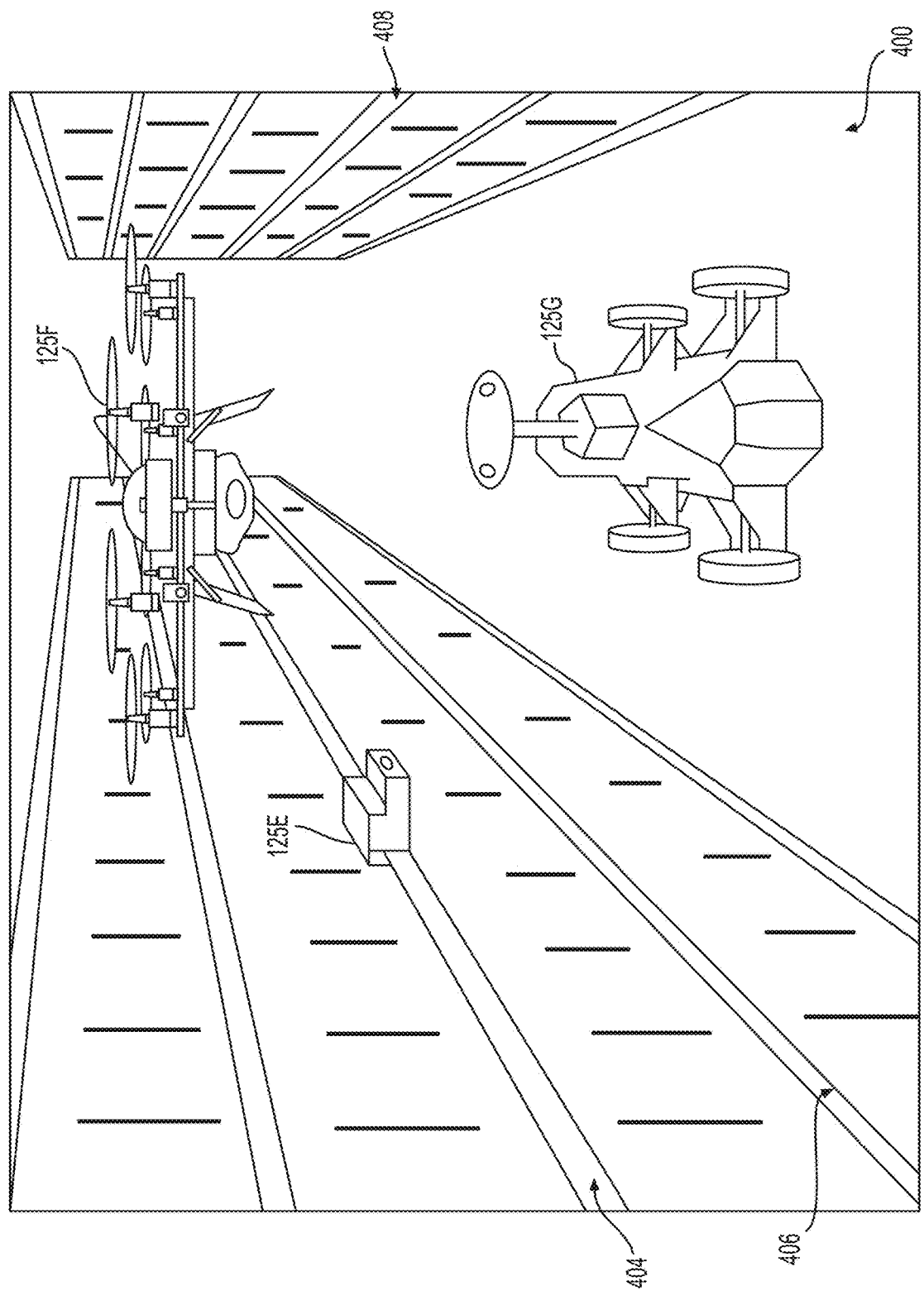

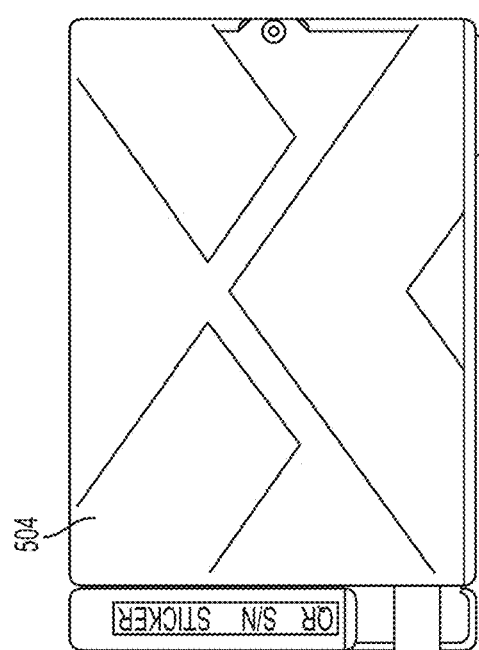
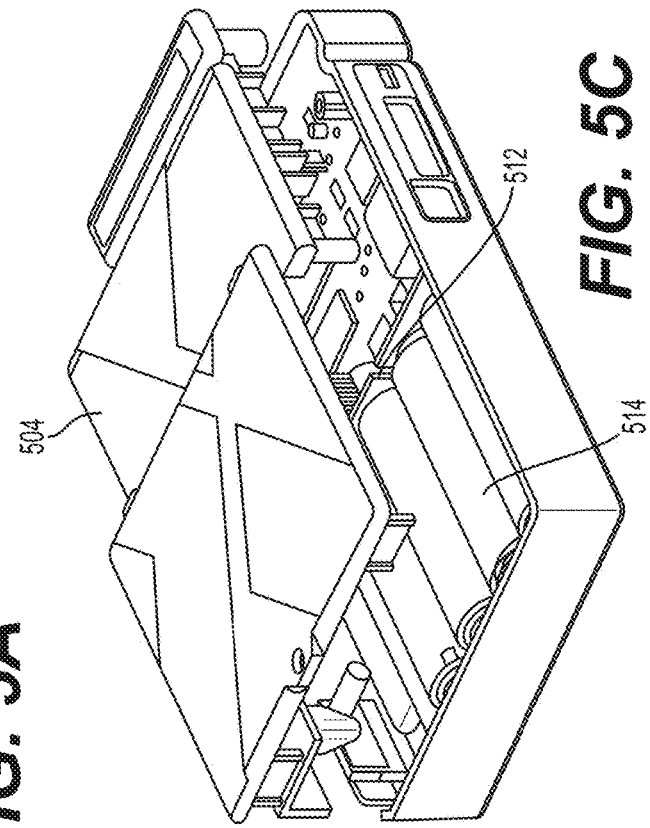
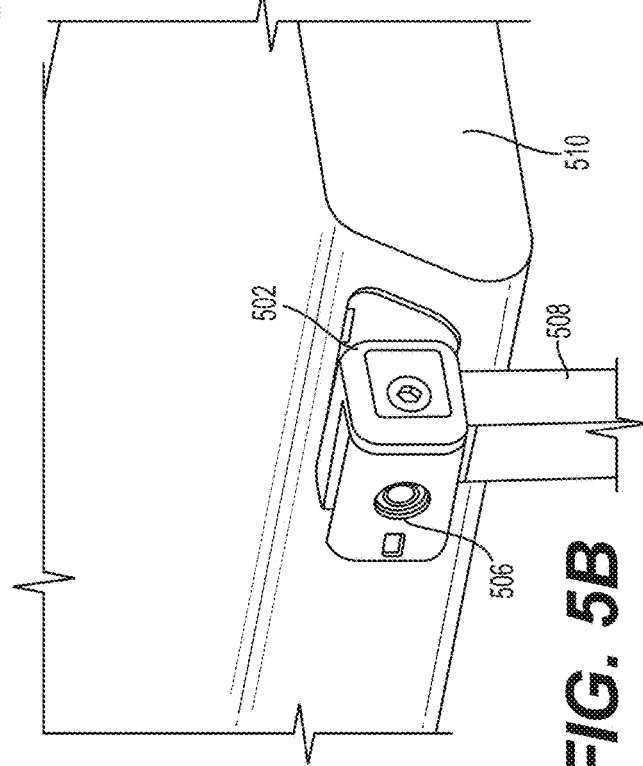
FIG. 5A
FIG. 5B
FIG. 5C

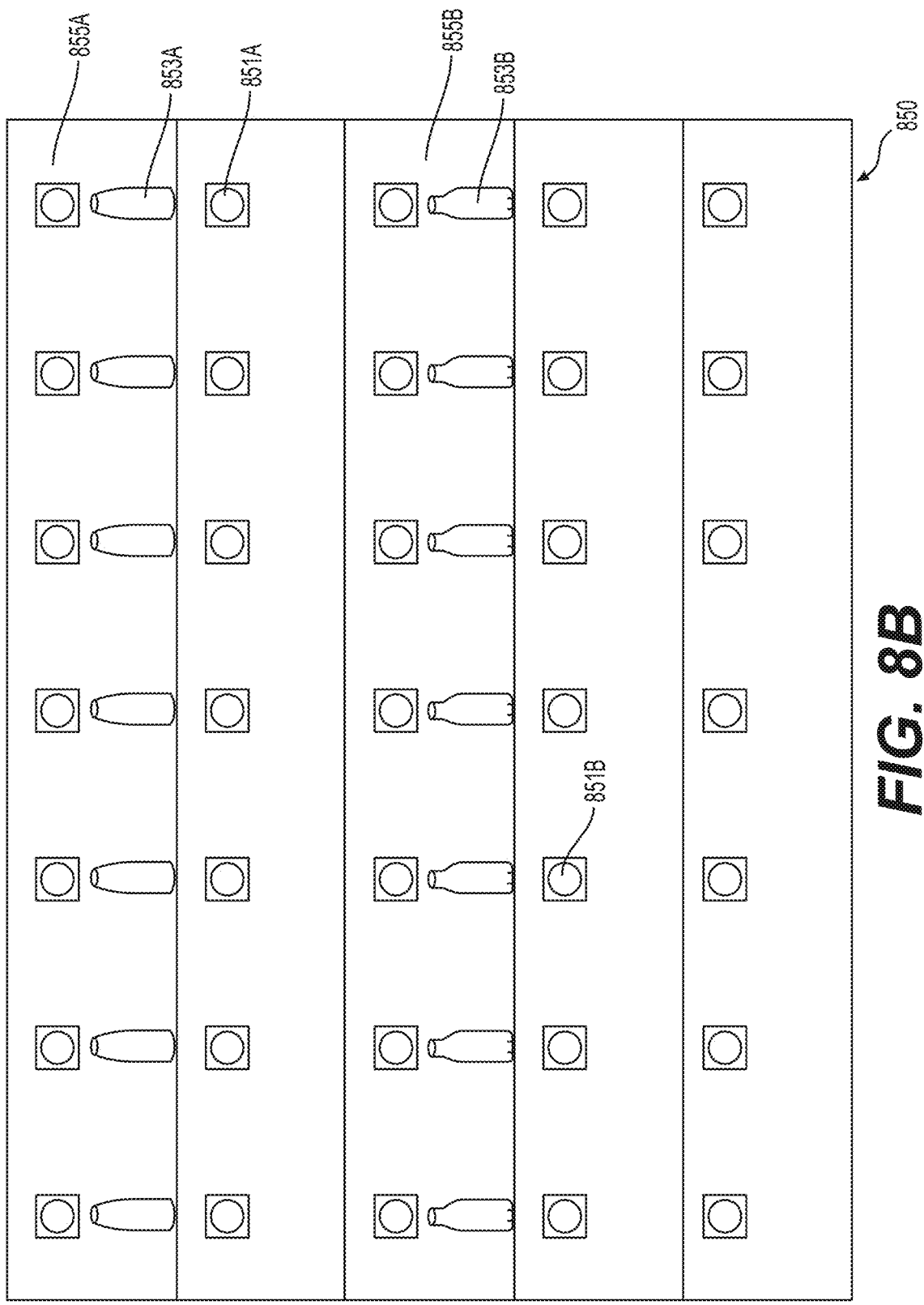

```
┌─────────────────────────────────────────────────────────────┐
│ Receive image data from a plurality of retail stores,       │
│ wherein the image data is indicative of a product shortage  │ 1602
│ of at least one product type relative to information        │
│ describing a desired placement of products on at least      │
│ one store shelf                                             │
└─────────────────────────────────────────────────────────────┘
                              │
                              ▼
┌─────────────────────────────────────────────────────────────┐
│ Analyze the image data to detect a plurality of occurrences │
│ of product shortages of the at least one product type in    │ 1604
│ the plurality of retail stores and determine product        │
│ shortage durations for the plurality of occurrences         │
└─────────────────────────────────────────────────────────────┘
                              │
                              ▼
┌─────────────────────────────────────────────────────────────┐
│ Identify at least one common factor contributing to product │ 1606
│ shortage duration of at least part of the plurality of      │
│ occurrences of the product shortages                        │
└─────────────────────────────────────────────────────────────┘
                              │
                              ▼
┌─────────────────────────────────────────────────────────────┐
│ Determine an action, associated with the at least one       │ 1608
│ common factor, for potentially reducing product shortage    │
│ durations of future shortages                               │
└─────────────────────────────────────────────────────────────┘
                              │
                              ▼
┌─────────────────────────────────────────────────────────────┐
│ Provide information associated with the identified action   │ 1610
│ to an entity                                                │
└─────────────────────────────────────────────────────────────┘
```

FIG. 16

MANAGING INVENTORY OF PERISHABLE PRODUCTS

CROSS REFERENCES TO RELATED APPLICATIONS

This application is a continuation of PCT International Application No. PCT/US2019/049528, filed Sep. 4, 2019, which claims the benefit of priority of U.S. Provisional Patent Application No. 62/727,301, filed on Sep. 5, 2018, and U.S. Provisional Patent Application No. 62/773,427, filed on Nov. 30, 2018. All of the foregoing applications are incorporated herein by reference in their entirety.

BACKGROUND

I. Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

Consistent an embodiment, a system for processing images captured in a retail store and automatically identifying a product shortage is disclosed. The system may include at least one processor configured to access information describing a desired placement of products of a certain product type on at least one store shelf. The at least one processor may receive image data from a plurality of image sensors mounted in the retail store, the image data including a plurality of images captured at different times and depicting the at least one store shelf. The at least one processor may also analyze, from among the plurality of images, a first image captured at a first time to determine that a first quantity of products of the certain product type at the first time exceeds a quantity threshold associated with the information describing the desired placement of products. Additionally, the at least one processor may analyze, from among the plurality of images, a second image captured at a second time later than the first time to determine that a second quantity of products of the certain product type at the second time is below the quantity threshold associated with the information describing the desired placement of products. Based on the determination that the first quantity of products of the certain product type at the first time exceeds the quantity threshold, the at least one processor may avoid initiating an unscheduled action to cause restocking the at least one store shelf with products of the certain product type at least until a third time later than the second time. The at least one processor may analyze, from among the plurality of images, a third image captured at the third time to determine that a third quantity of products of the certain product type at the third time is also below the quantity threshold associated with the information describing the desired placement of products. Thereafter, based on the determination that the second quantity of products of the certain product type at the second time and the third quantity of products at the third time are below the quantity threshold, the at least one processor may provide information indicative of a product shortage at the at least one store shelf.

Consistent with an embodiment, a method for processing images captured in a retail store and automatically identifying a product shortage is disclosed. The method may include accessing information describing a desired placement of products of a certain product type on at least one store shelf. The method may include receiving image data from a plurality of image sensors mounted in a retail store, the image data including a plurality of images captured at different times and depicting the at least one store shelf. The method may also include analyzing, from among the plurality of images, a first image captured at a first time to determine that a first quantity of products of the certain product type at the first time exceeds a quantity threshold associated with the information describing the desired placement of products. The method may include analyzing, from among the plurality of images, a second image captured at a second time later than the first time to determine that a second quantity of products of the certain product type at the second time is below the quantity threshold associated with the information describing the desired placement of products. Based on the determination that the first quantity of products of the certain product type at the first time exceeds the quantity threshold, the method may include avoiding initiating an unscheduled action to cause restocking the at least one store shelf with products of the certain product type until a third time later than the second time. The method may include analyzing, from among the plurality of images, a third image captured at the third time to determine that a third quantity of products of the certain product type at the third time is also below the quantity threshold associated with the information describing the desired placement of products. Based on the determination that the second quantity of products of the certain product type at the second time and the third quantity of products at the third time are below the quantity threshold, the method may also include providing information indicative of a product shortage at the at least one store shelf.

Consistent with an embodiment, a computer program product for processing images captured in a retail store and automatically identifying a product shortage is disclosed. The computer program product may be embodied in a non-transitory computer-readable medium and may be executable by at least one processor. The computer program product may include instructions for causing the at least one processor to execute a method including accessing information describing a desired placement of products of a certain product type on at least one store shelf. The method may include receiving image data from a plurality of image sensors mounted in a retail store, the image data including a plurality of images captured at different times and depicting the at least one store shelf. The method may also include analyzing, from among the plurality of images, a first image captured at a first time to determine that a first quantity of products of the certain product type at the first time exceeds a quantity threshold associated with the information describing the desired placement of products. The method may include analyzing, from among the plurality of images, a second image captured at a second time later than the first time to determine that a second quantity of products of the certain product type at the second time is below the quantity threshold associated with the information describing the desired placement of products. Based on the determination that the first quantity of products of the certain product type at the first time exceeds the quantity threshold, the method may include avoiding initiating an unscheduled action to cause restocking the at least one store shelf with products of the certain product type until a third time later than the second time. The method may also include analyzing, from among the plurality of images, a third image captured at the third time to determine that a third quantity of products of the certain product type at the third time is also below the quantity threshold associated with the information describing the desired placement of products. Based on the determination that the second quantity of products of the certain product type at the second time and the third quantity of products at the third time are below the quantity threshold, the method may include providing information indicative of a product shortage at the at least one store shelf.

Consistent with an embodiment, a system for reducing product shortage durations in retail stores based on analysis of image data is disclosed. The system may include a communication interface configured to receive image data from a plurality of retail stores, wherein the image data is indicative of a product shortage of at least one product type relative to information describing a desired placement of products of the at least one product type on at least one store shelf. The system may also include at least one processor configured to analyze the image data to detect a plurality of occurrences of product shortages of the at least one product type in the plurality of retail stores and determine product shortage durations associated with the plurality of occurrences. The at least one processor may identify at least one common factor contributing to product shortage duration of at least part of the plurality of occurrences of the product shortages of the at least one product type in the plurality of retail stores. The at least one processor may also determine an action, associated with the at least one common factor, for potentially reducing product shortage durations of future shortages of the at least one product type in the plurality of retail stores. Additionally, the at least one processor may provide information associated with the identified action to an entity.

Consistent with an embodiment, a method reducing product shortage durations in retail stores based on analysis of image data is disclosed. The method may include receiving image data from a plurality of retail stores, wherein the image data is indicative of a product shortage of at least one product type relative to information describing a desired placement of products of the at least one product type on at least one store shelf. The method may include analyzing the image data to detect a plurality of occurrences of product shortages of the at least one product type in the plurality of retail stores and determine product shortage durations for the plurality of occurrences. The method may also include identifying at least one common factor contributing to product shortage duration of at least part of the plurality of occurrences of the product shortages of the at least one product type in the plurality of retail stores. The method may include determining an action, associated with the at least one common factor, for potentially reducing product shortage durations of future shortages of the at least one product type in the plurality of retail stores. Finally, the method may include providing information associated with the identified action to an entity.

Consistent with an embodiment, a computer program product for reducing product shortage durations in retail stores based on analysis of image data is disclosed. The computer program product may be embodied in a non-transitory computer-readable medium and may be executable by at least one processor. The computer program product may include instructions for causing the at least one processor to execute a method. The method may include receiving image data from a plurality of retail stores, wherein the image data is indicative of a product shortage of at least one product type relative to information describing a desired placement of products of the at least one product type on at least one store shelf. The method may include analyzing the image data to detect a plurality of occurrences of product shortages of the at least one product type in the plurality of retail stores and determine product shortage durations for the plurality of occurrences. The method may also include identifying at least one common factor contributing to product shortage duration of at least part of the plurality of occurrences of the product shortages of the at least one product type in the plurality of retail stores. The method may include determining an action, associated with the at least one common factor, for potentially reducing product shortage durations of future shortages of the at least one product type in the plurality of retail stores. Finally, the method may include providing information associated with the identified action to an entity.

Consistent with an embodiment, a system for identifying perishable products in a retail store based on analysis of image data and for automatically generating suggestions relating to the identified products is disclosed. The system may include at least one processor configured to receive a set of images depicting a plurality of perishable products displayed on at least one shelving unit in a retail store. The at least one processor may analyze the set of images to determine information about a displayed inventory of the plurality of perishable products. The at least one processor may also obtain information about additional perishable products scheduled to be displayed on the at least one shelving unit. Additionally, the at least one processor may use the information about the displayed inventory and the information about the additional perishable products to determine at least one suggestion regarding placement of perishable products in the retail store. Thereafter, the at least one processor may provide the at least one suggestion to an entity associated with the retail store.

Consistent with an embodiment, a system for managing inventory of perishable products in retail stores is disclosed. The system may include at least one processor configured to receive a set of images depicting a plurality of perishable products displayed on at least one shelving unit in a retail store. The at least one processor may analyze the set of images to determine whether a quantity of the products of a certain type of perishable products is below a quantity threshold. In response to a determination that the quantity of the products of the certain type of perishable products is below the quantity threshold, the at least one processor may initiate an action for restocking the shelving unit with additional products from the certain type of perishable products. And in response to a determination that the quantity of the products of the certain type of perishable products is above the quantity threshold, the at least one processor may forgo initiating the action for restocking the shelving unit with additional products from the certain type of perishable products. The at least one processor may also analyze the set of images to determine that the quantity of the products of the certain type of perishable products is above the quantity threshold, but a quality associated with the products of the certain type of perishable products is below a quality threshold. In response to a determination that the quantity of the products of the certain type of perishable products is above the quantity threshold but the quality associated with the products of the certain type of perishable products is below the quality threshold, the at least one processor may initiate an action for improving the quality associated with the products of the certain type of perishable products.

Consistent with an embodiment, a system for managing inventory of perishable products in retail stores is disclosed. The system may include at least one processor configured to receive a set of images depicting a plurality of perishable products displayed on at least one shelving unit in a retail store. The at least one processor may identify in the set of images representations of one or more products of a first type of perishable products and one or more products of a second type of perishable products different from the first type of perishable product. The at least one processor may also analyze the set of images to determine information about a displayed inventory of the first type of perishable product and to determine information about a displayed inventory of the second type of perishable product. Based on the determined information about the displayed inventory of the first type of perishable product, the at least one processor may initiate an action prompting a clearance sale of the products of the first type of perishable products. Furthermore, based on the determined information about the displayed inventory of the first type of perishable product and the determined information about the displayed inventory of the second type of perishable products, the at least one processor may avoid initiating an action prompting a clearance sale of products of the second type of perishable products.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4C is a schematic illustration of another example configuration for capturing image data in a retail store, consistent with the present disclosure;

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 8B is a schematic illustration of another example configuration for detecting products and empty spaces on a store shelf, consistent with the present disclosure;

FIG. 11E is a schematic illustration of an example output for an online customer of the retail store, consistent with the present disclosure.

FIG. 16 is a flowchart of an exemplary process for reducing product shortage durations in retail stores based on analysis of image data consistent with the present disclosure.

DETAILED DESCRIPTION

Figure 1:
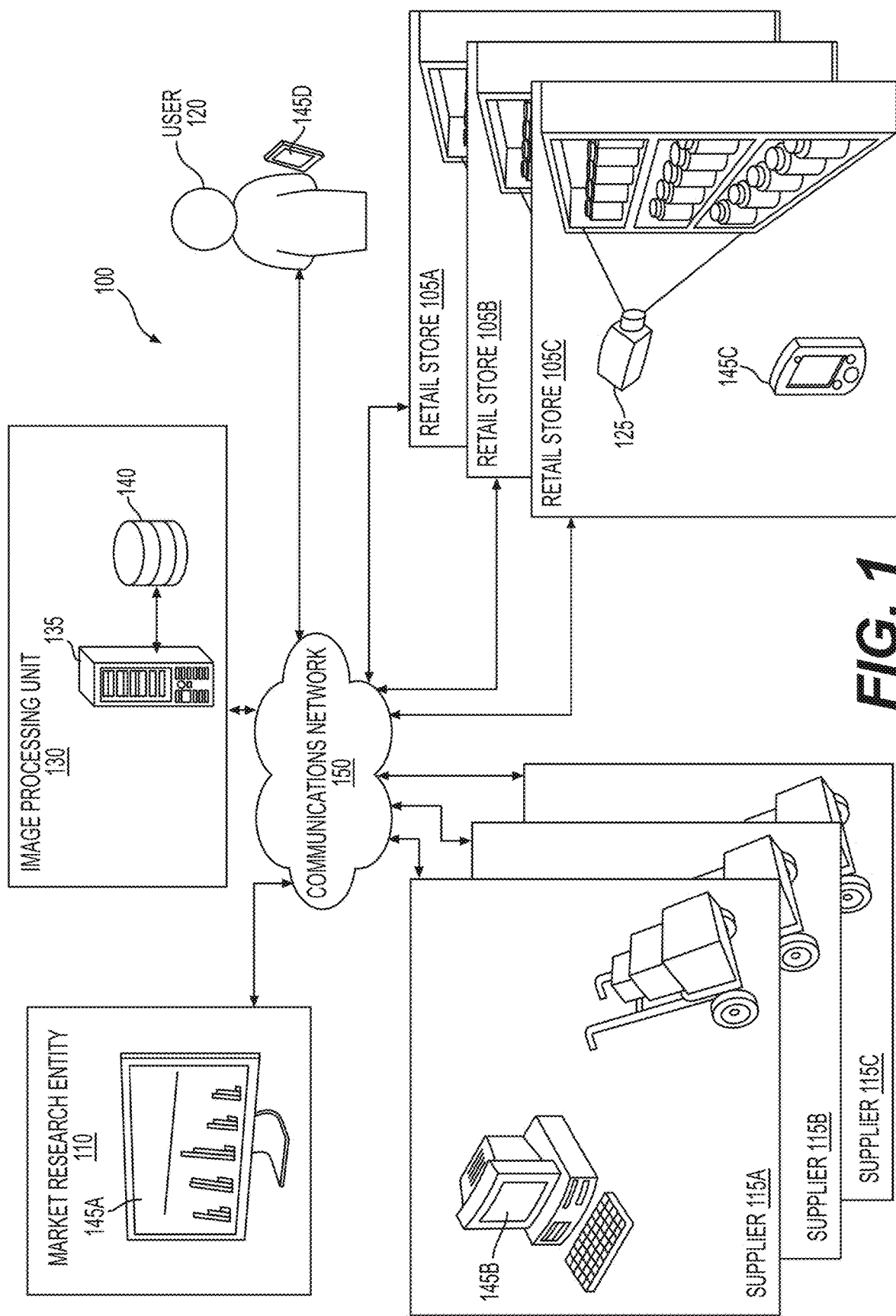
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store employee, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 can generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
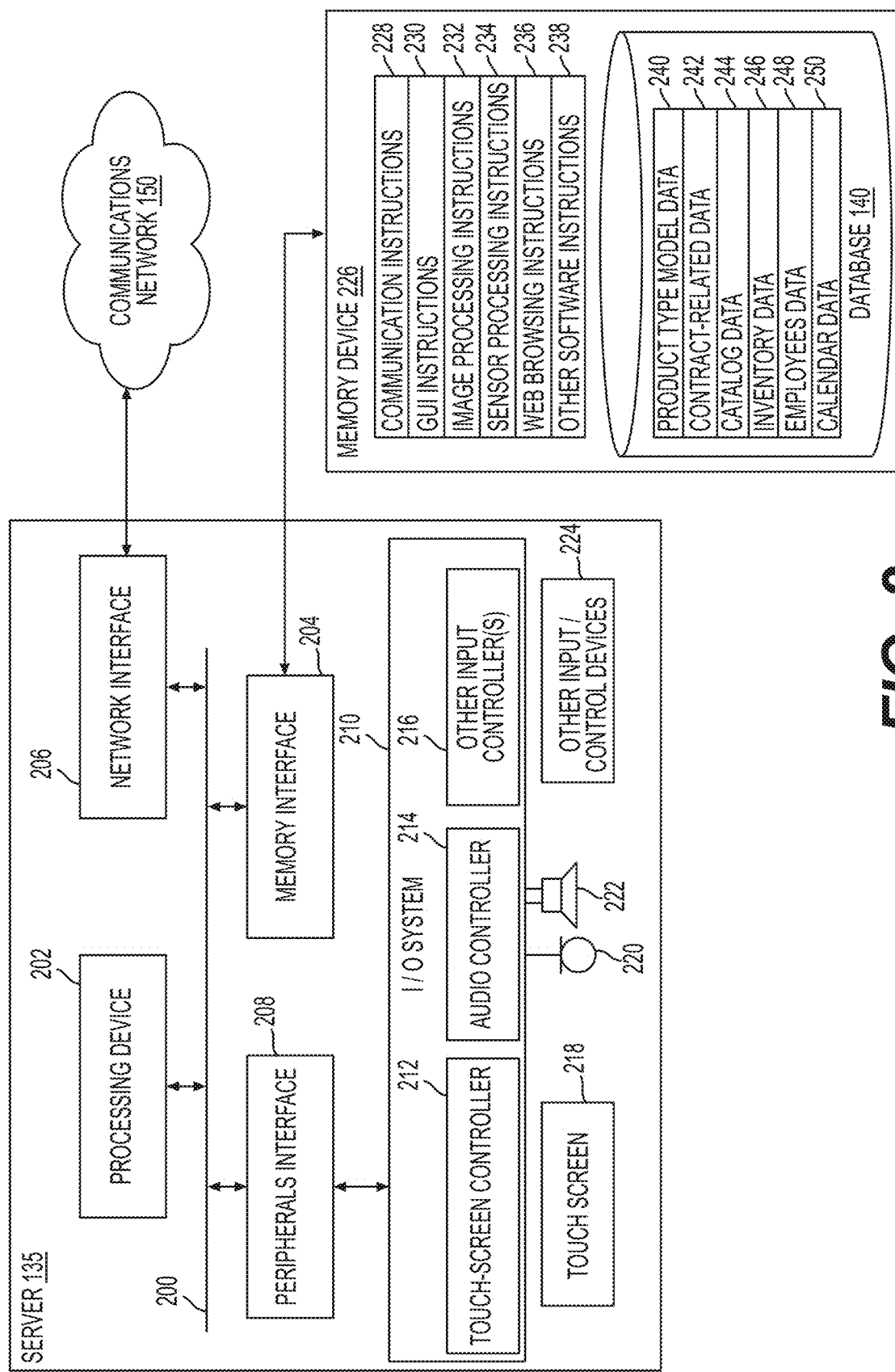
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumb-wheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™ Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific employees to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
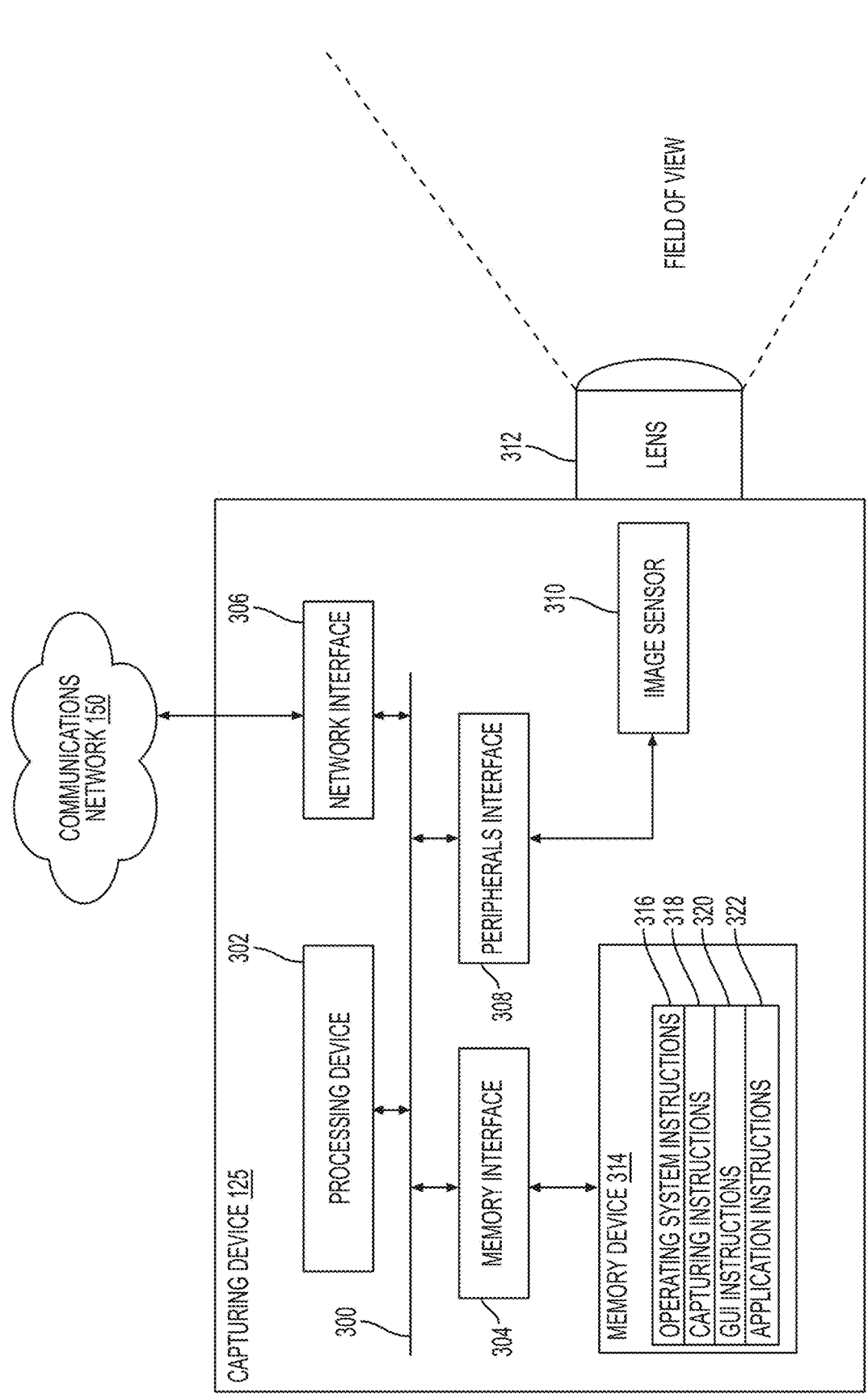
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components can be separated or can be integrated in one or more integrated circuits. The various components in capturing device 125 can be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 can include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4A:
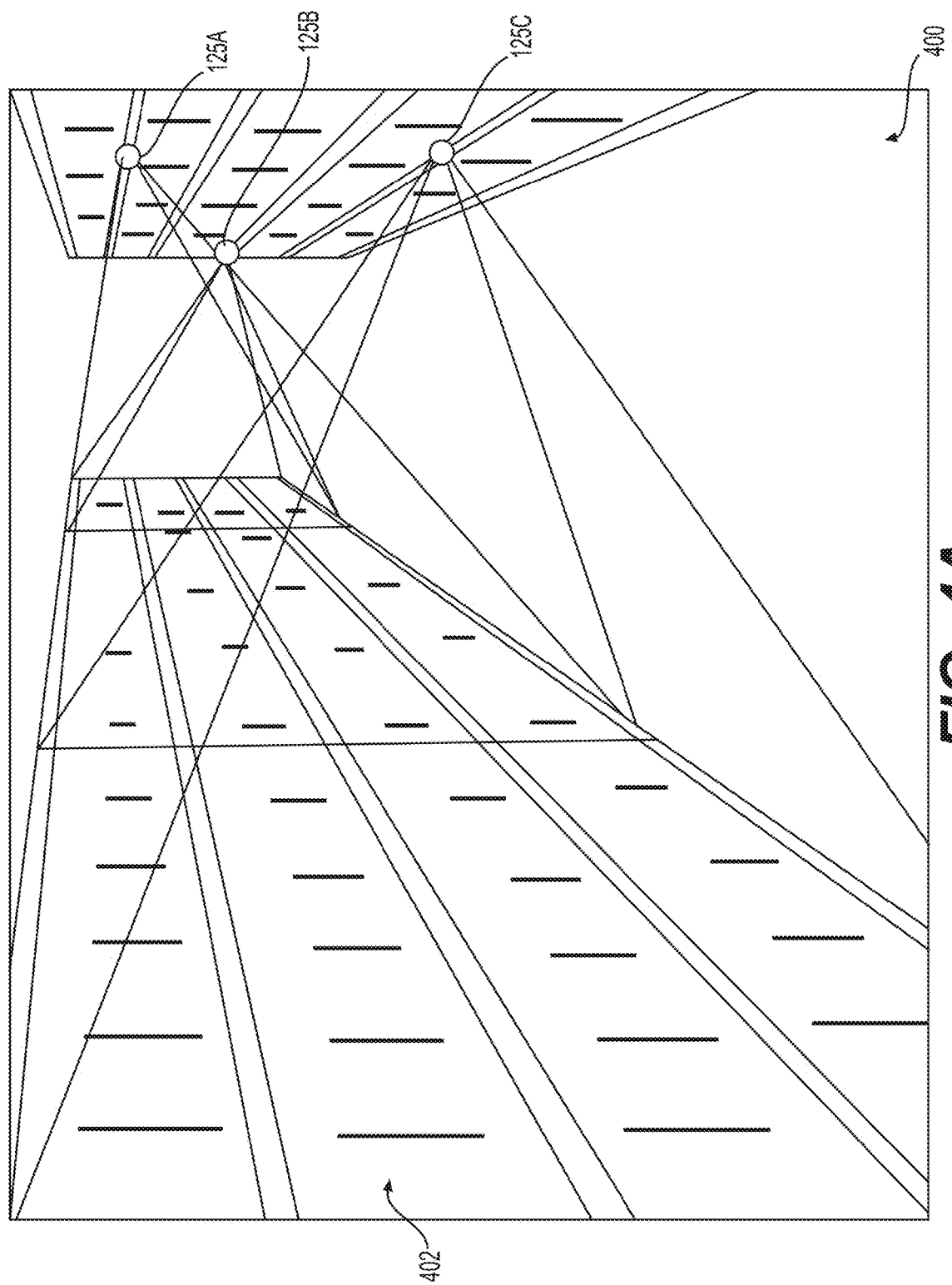
FIG. 4A is a schematic illustration of an example configuration for capturing image data in a retail store, consistent with the present disclosure.
Figure 4B:
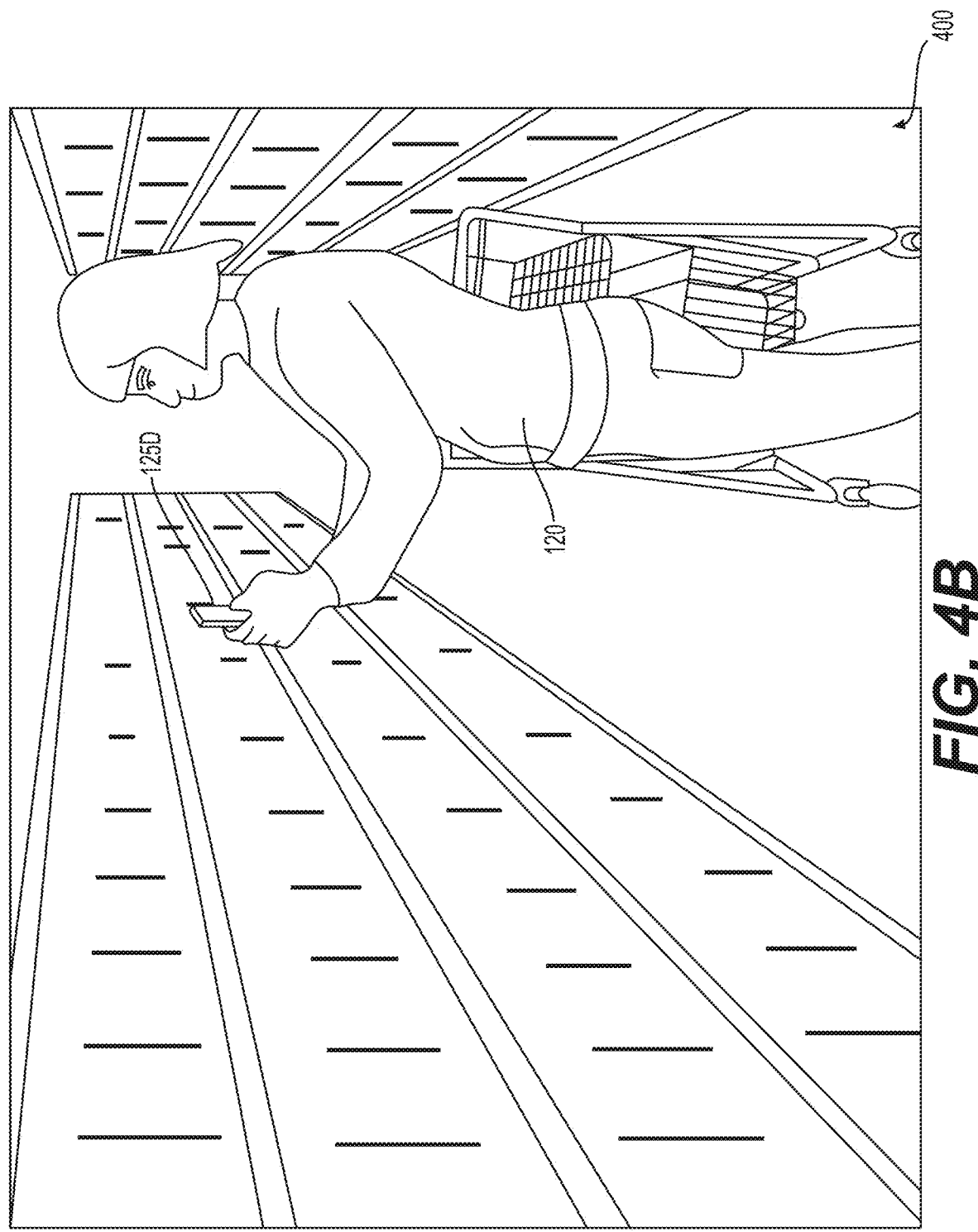
FIG. 4B is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store employees. In one implementation, a handheld device of a store employee (e.g., capturing device 125D) may display a real-time video stream captured by the image sensor of the handheld device. The real-time video stream may be augmented with markings identifying to the store employee an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store employees. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between $1.1 \times 1.1$ um$^2$ and $1.7 \times 1.7$ um$^2$, for example, $1.4 \times 1.4$ um$^2$.

Figure 6A:
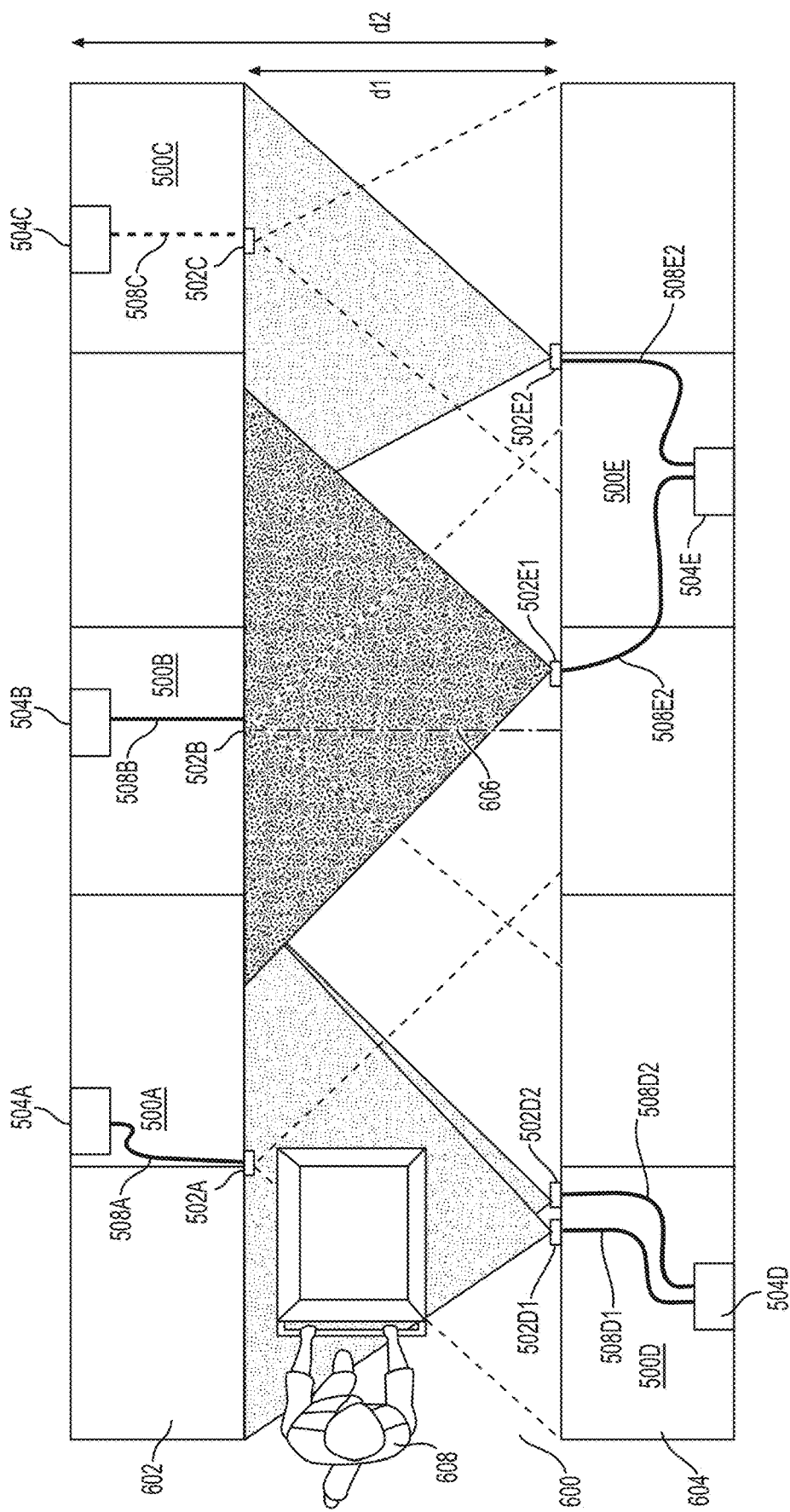
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
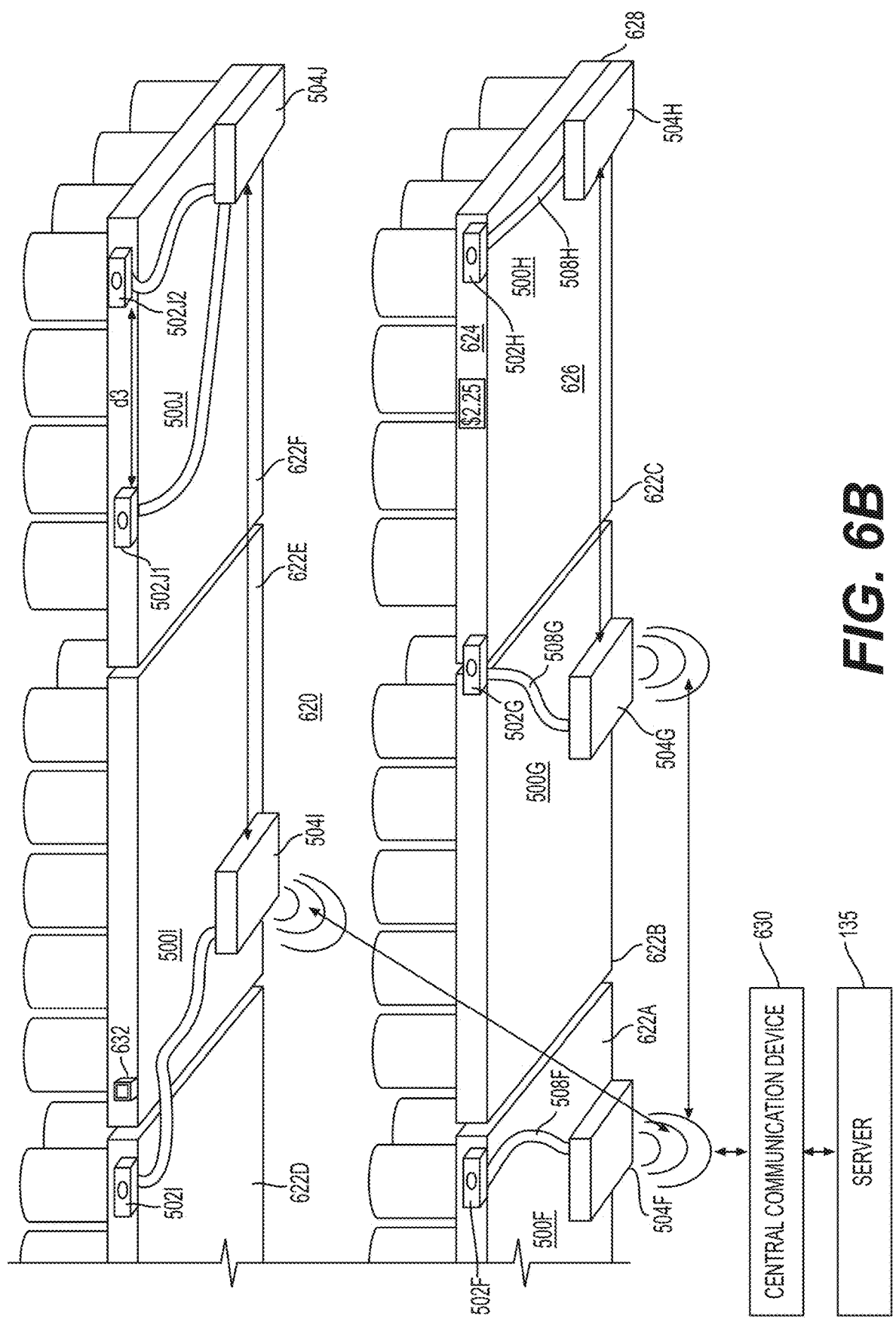
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store employee. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of d1*log(d1) and/or d2*log(d2) such as a1* d1*log(d1) for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of d1*log(d1) and/or d2*log(d2) such as a1* d1*log(d1) for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when supplier 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
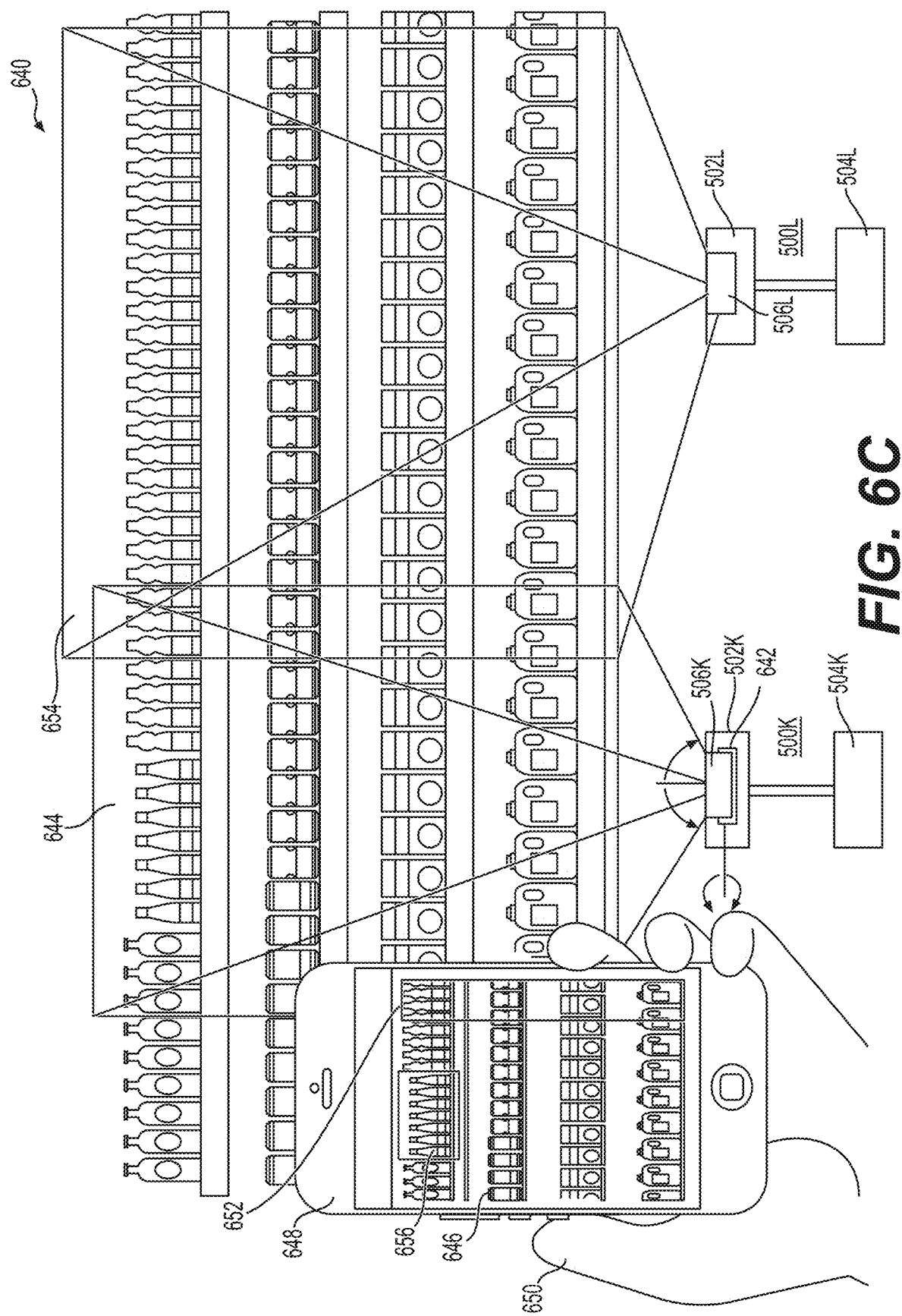
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of an employee installing image capturing device 506K. Such an arrangement may provide the employee/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the employee/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
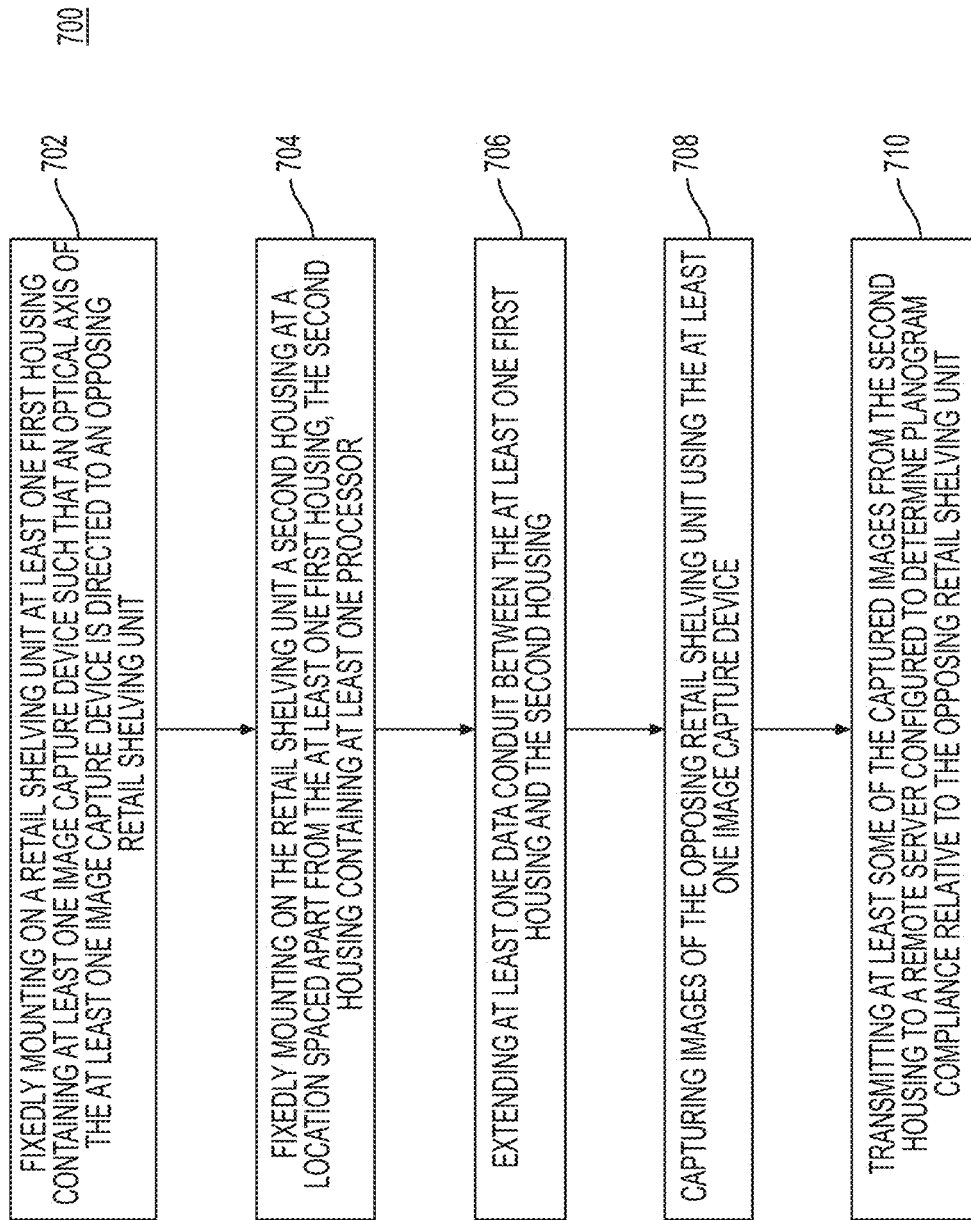
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1* d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
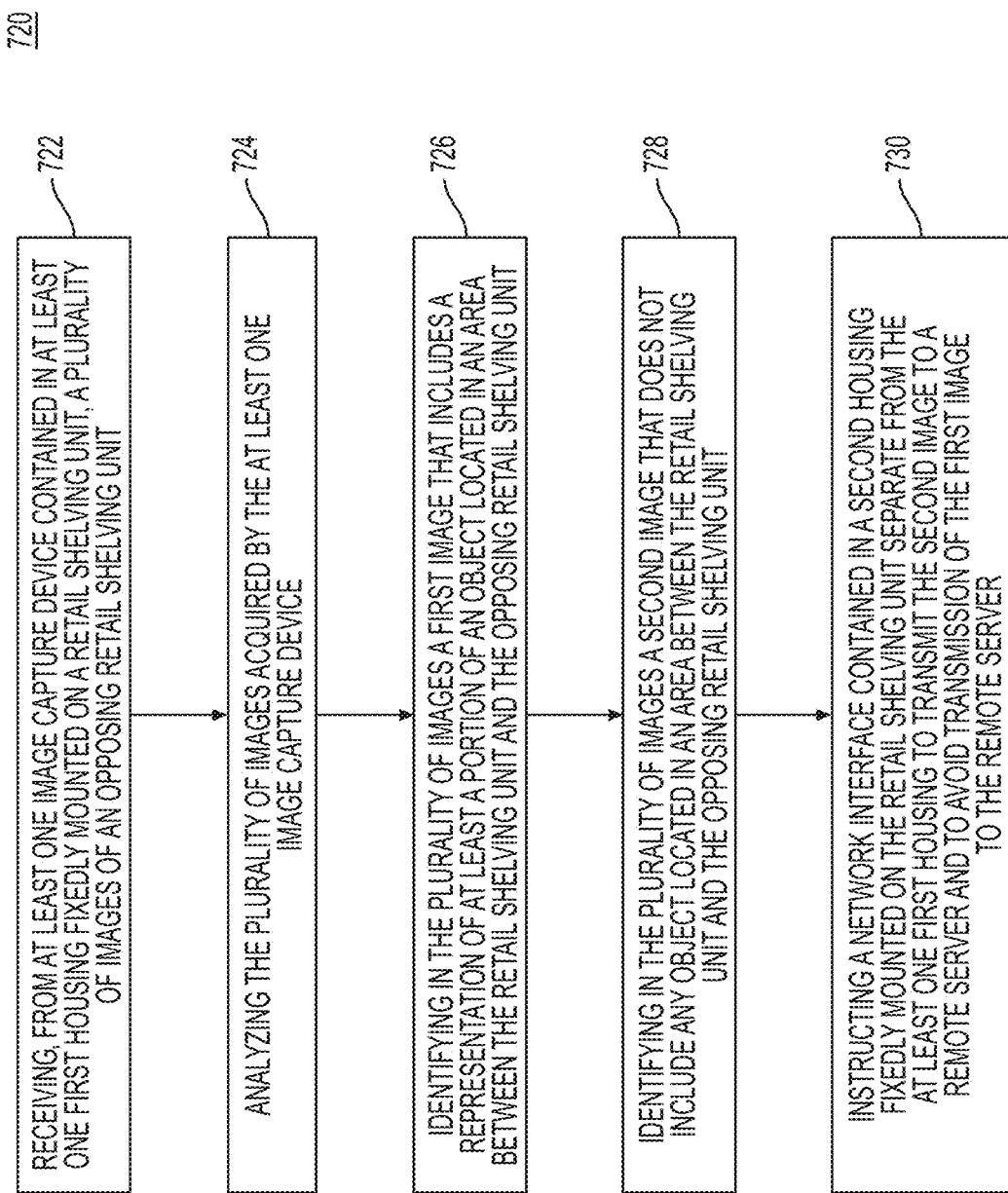
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store employee. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
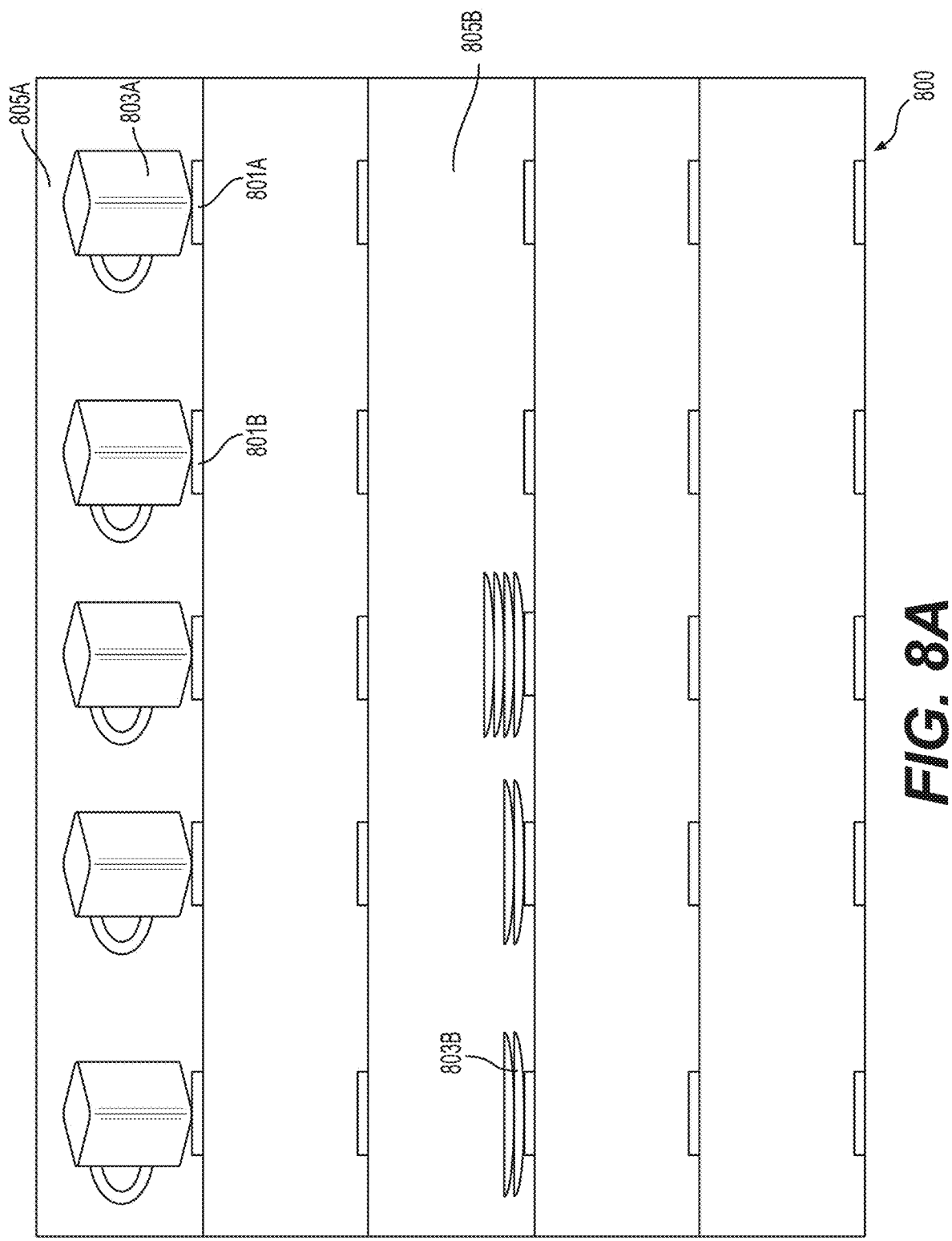
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by an employee due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
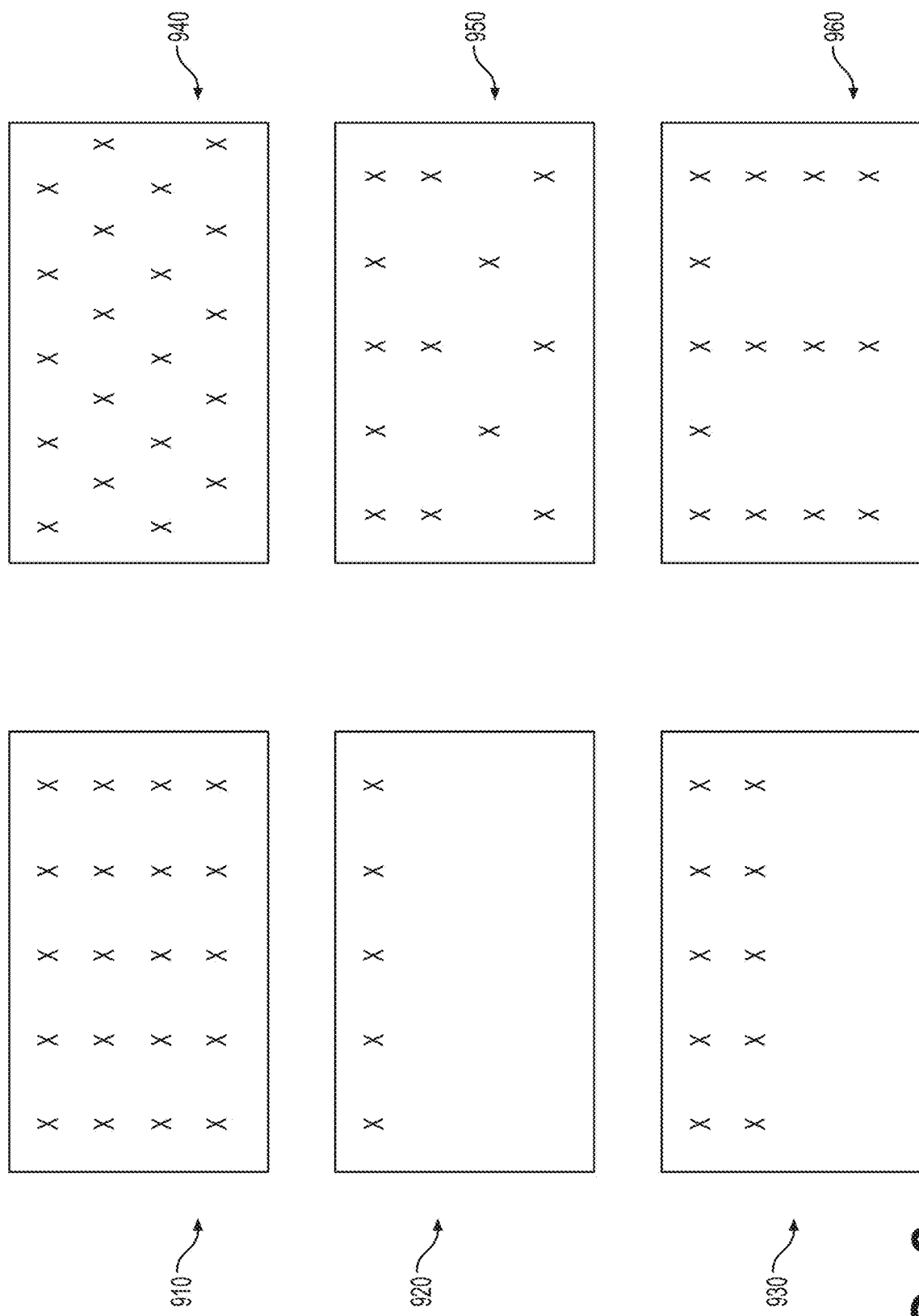
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or employee, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

Figure 10A:
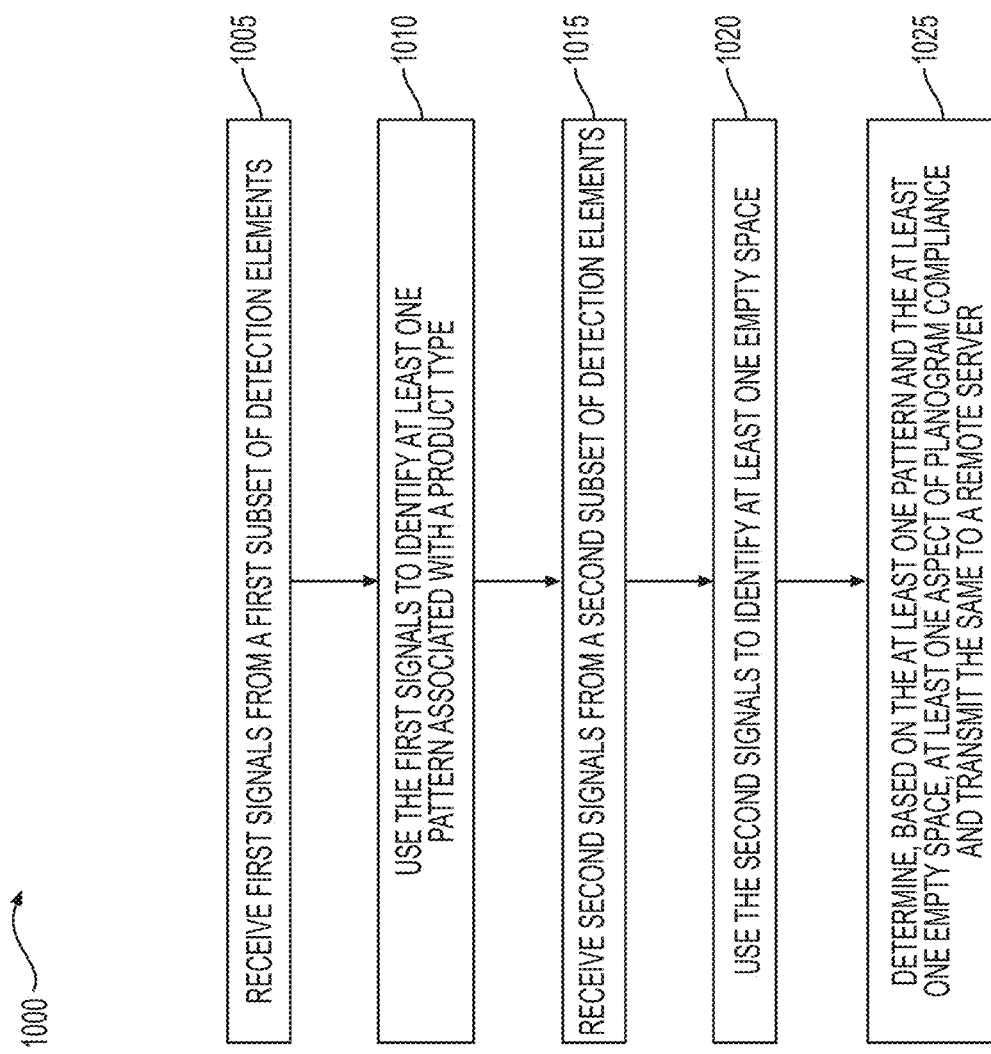
FIG. 10A illustrates an exemplary method for monitoring planogram compliance on a store shelf, consistent with the present disclosure.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House 0). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that can be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for an employee of the retail store.

Additionally or alternatively, method 1000 may be combined with method 1050 of FIG. 10B, described below, such that step 1055 is performed any time after step 1005.

Figure 10B:
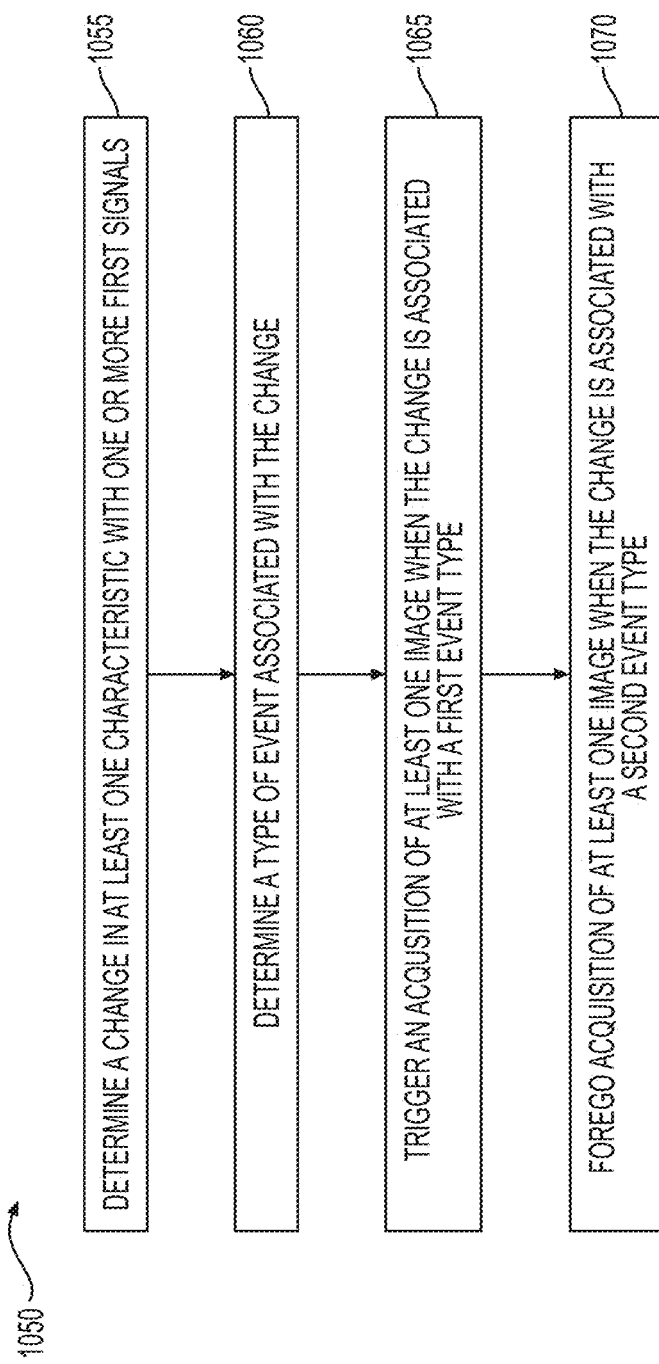
FIG. 10B is illustrates an exemplary method for triggering image acquisition based on product events on a store shelf, consistent with the present disclosure.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for an employee of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by an employee, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
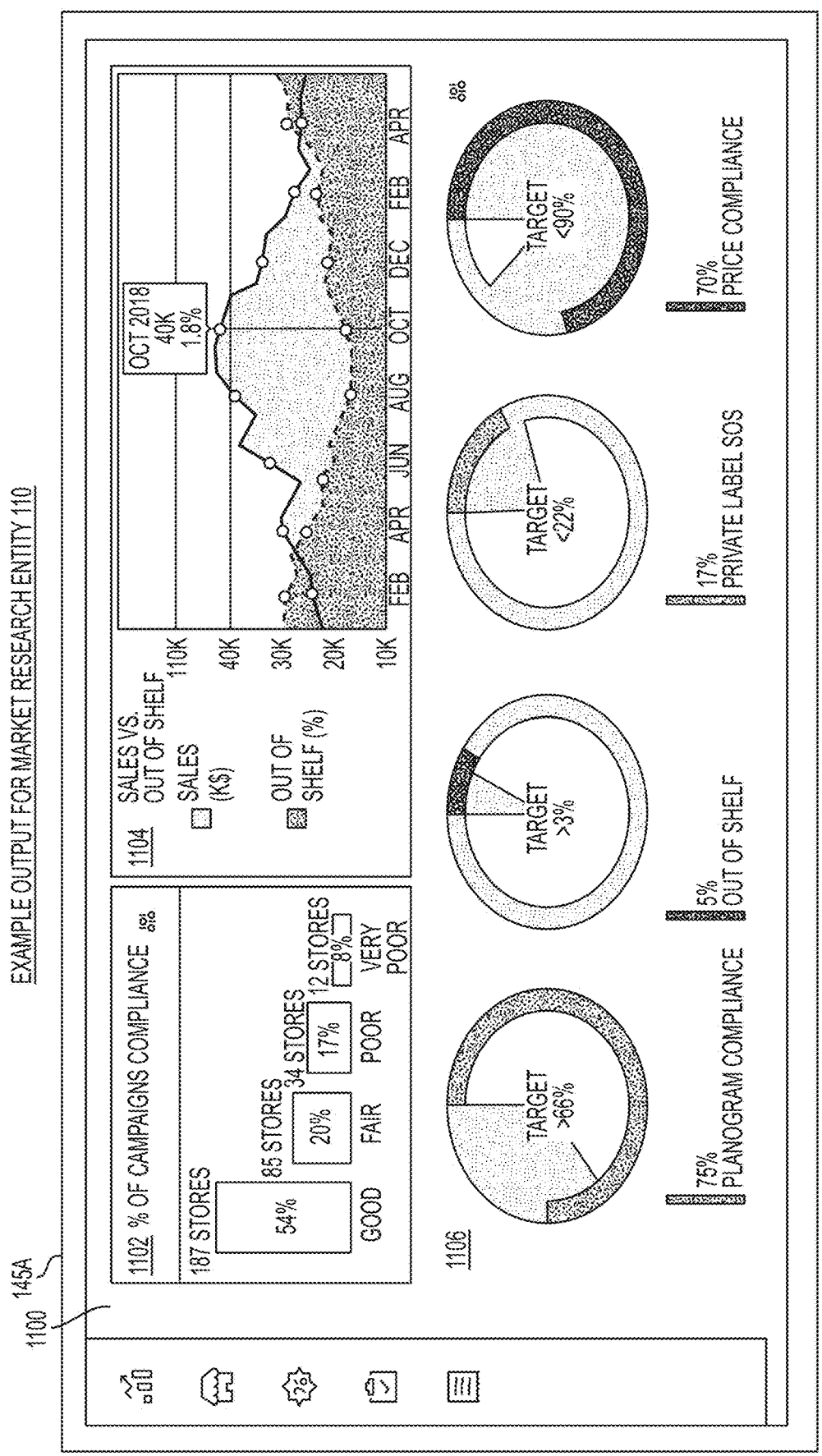
FIG. 11A is a schematic illustration of an example output for a market research entity associated with the retail store, consistent with the present disclosure.
Figure 11B:
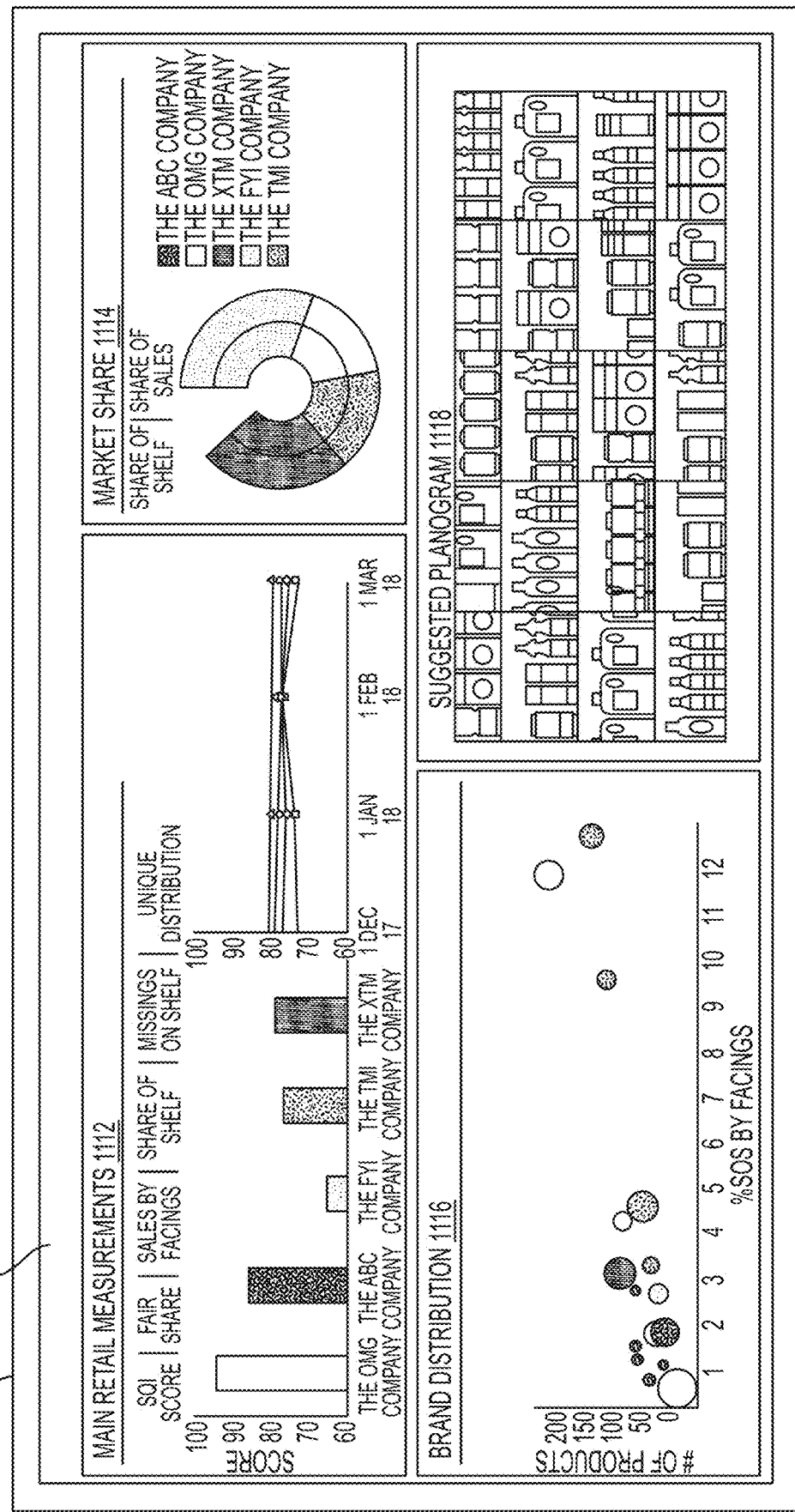
FIG. 11B is a schematic illustration of an example output for a supplier of the retail store, consistent with the present disclosure.
Figure 11C:
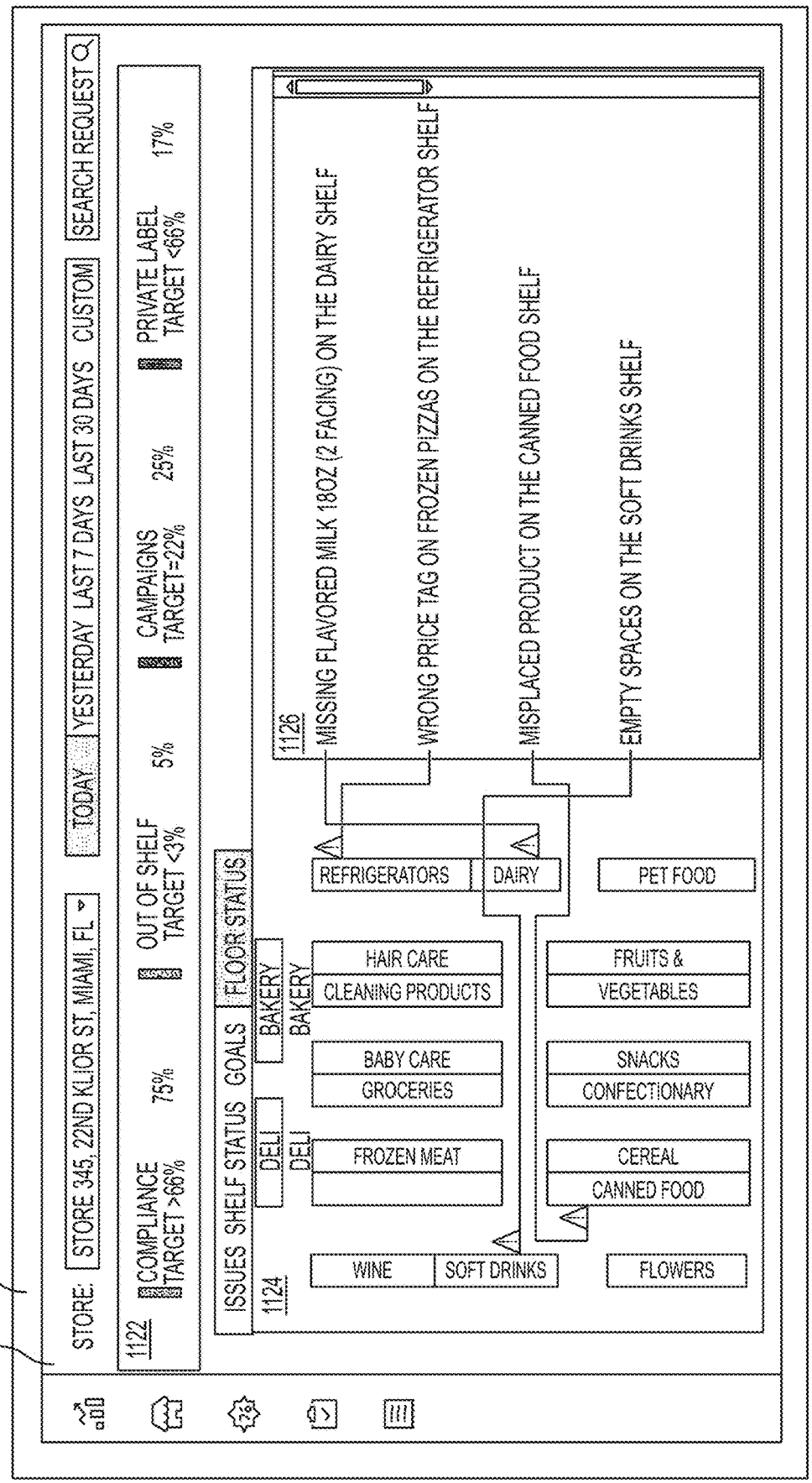
FIG. 11C is a schematic illustration of an example output for a manager of the retail store, consistent with the present disclosure.
Figure 11D:
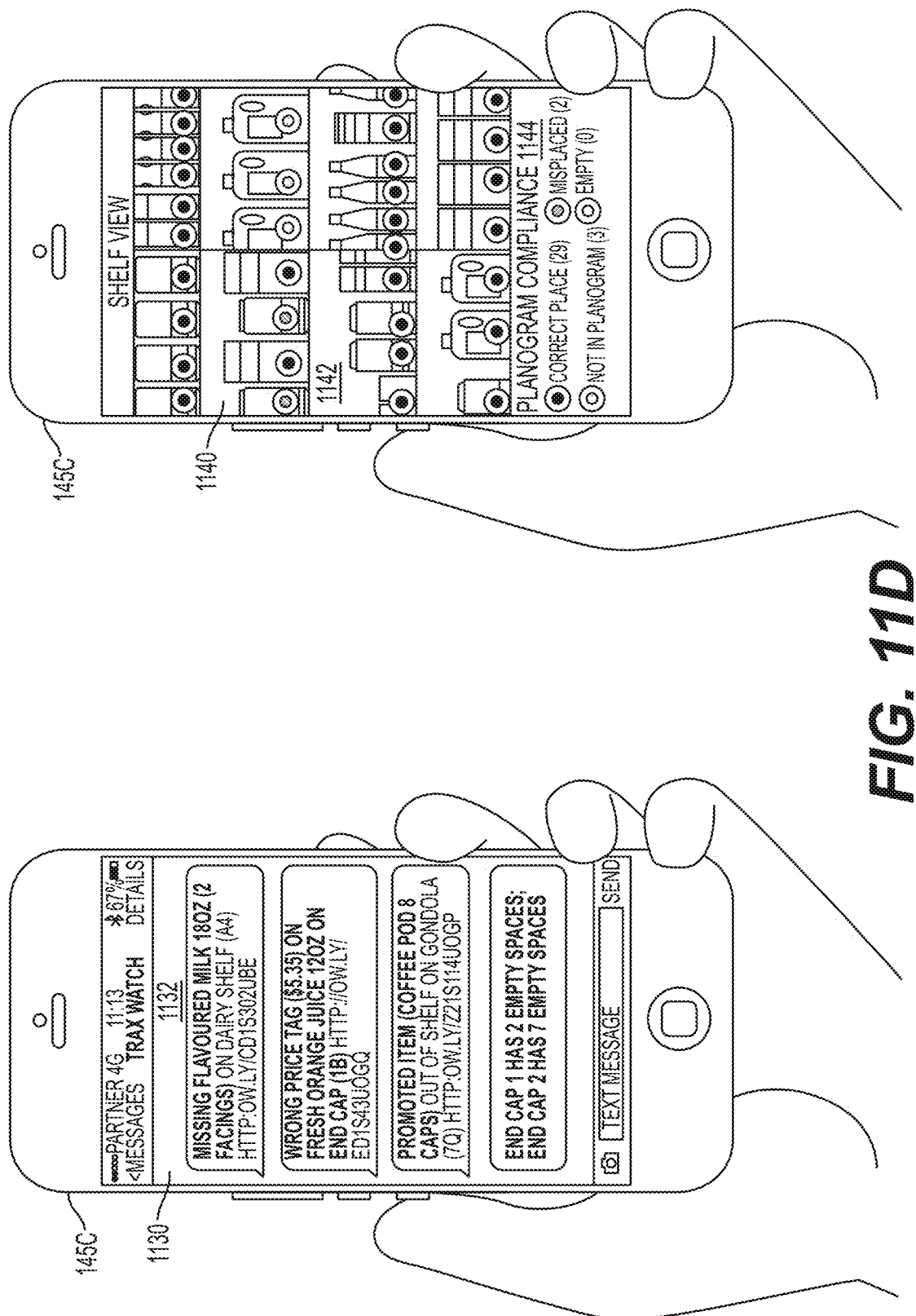
FIG. 11D is a schematic illustration of two examples outputs for an employee of the retail store, consistent with the present disclosure.
Figure 11E:
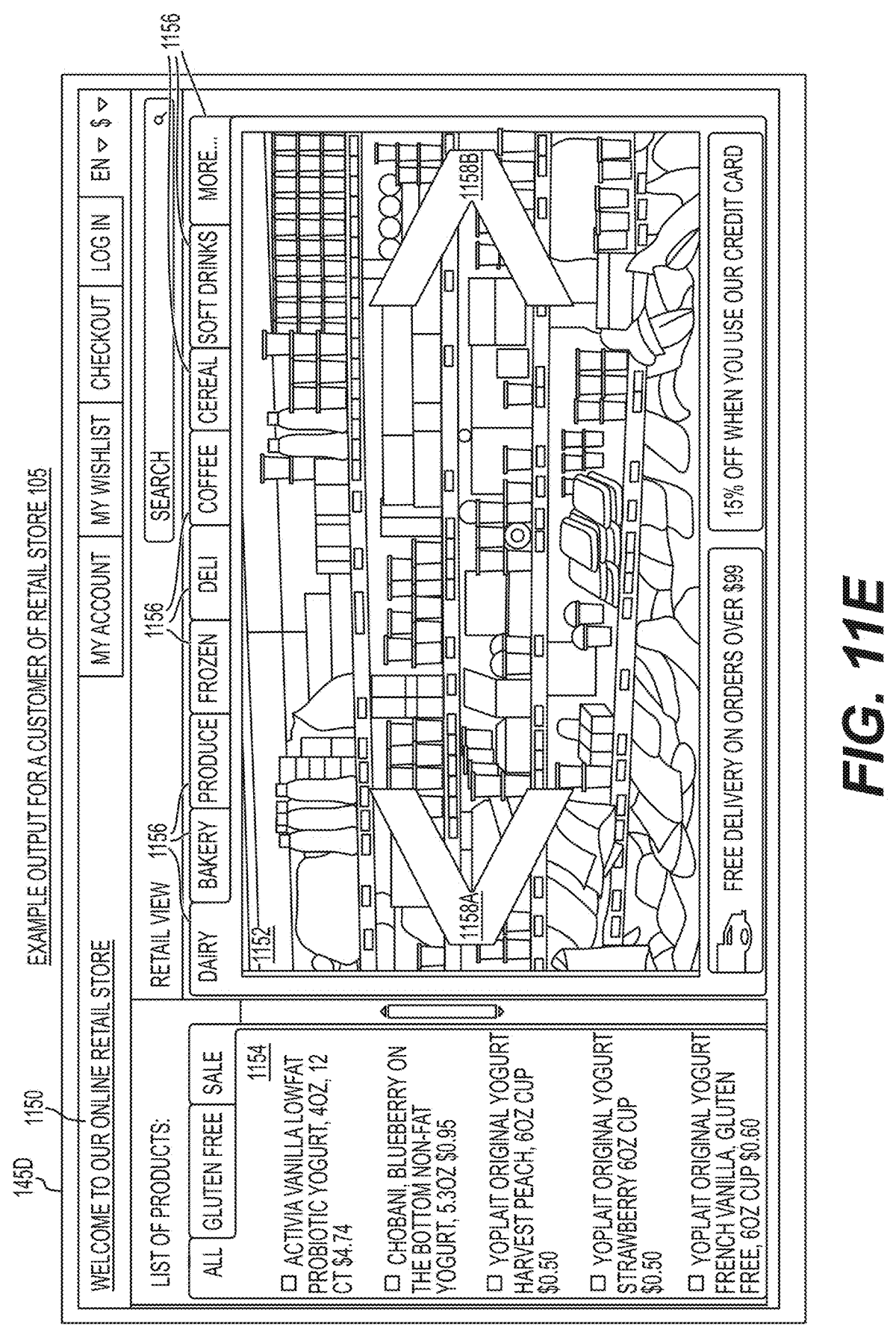

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for employees of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by employees of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign employees to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help employees of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents can be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer can virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

Monitoring Product Shortages Over Time

In the retail world, stores tend to avoid technology for detecting an on-shelf product shortage due to the large number of unnecessary or irrelevant alerts these systems often generate. Many of these alerts are in response to shortages that are part of the "usual flow" of the store, which need no intervention on the part of the store. Other alerts, however, may relate to real shortages, but the large number of alerts may desensitize the store to the alerts and, as a result, these real shortages tend to be ignored without any intervention. Disclosed systems provide alerts when there is a real shortage of products from a certain product type. These alerts may be based on time periods associated with observed shortages (e.g., shortages that persist beyond an acceptable time limit). The system, however, may avoid providing unnecessary alerts, for example, by analyzing data from a number of sources such that actual shortages generate alerts, rather than normal shortages that occur during the hour-by-hour operation of the store.

Figure 12:
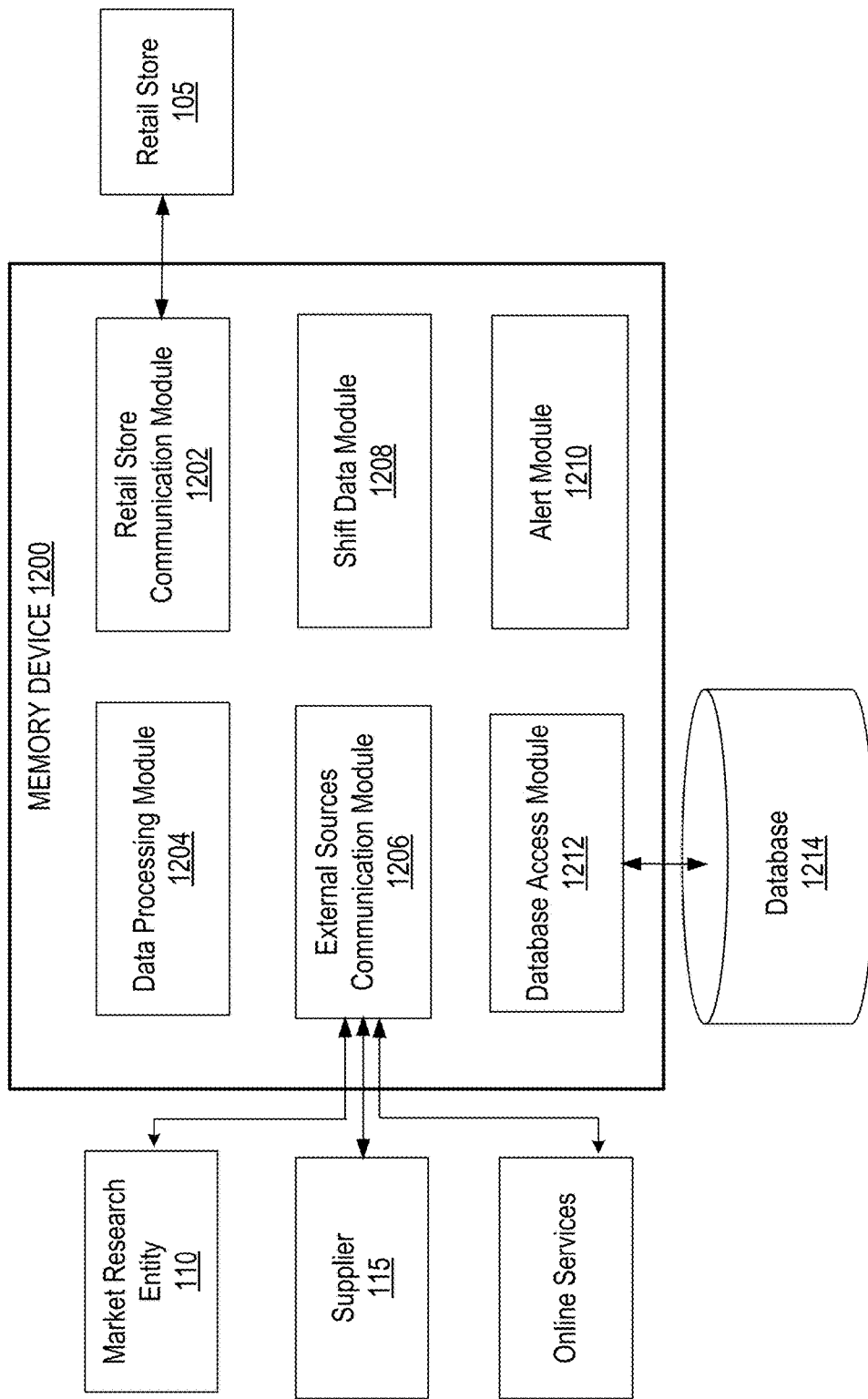
FIG. 12 is a block diagram illustrating an exemplary embodiment of a memory device containing software modules for executing methods consistent with the present disclosure.

FIG. 12 illustrates an exemplary embodiment of a memory device 1200 containing software modules consistent with the present disclosure. As shown, memory device 1200 may include a retail store communication module 1202, a data processing module 1204, an external sources communication module 1206, a shift module 1208, an alert module 1210, a database access module 1212, and a database 1214. Modules 1202, 1204, 1206, 1208, 1210, and 1212 may contain software instructions for execution by at least one processor (e.g., processing device 202) associated with system 100. Retail store communication module 1202, data processing module 1204, external sources communication module 1206, shift data module 1208, alert module 1210, database access module 1212, and database 1214 may cooperate to perform multiple operations. For example, retail store communication module 1202 may receive image data from a plurality of image capturing devices 125 in retail store 105, data processing module 1204 may use the received image data to determine information about a displayed inventory of products of a certain product type on at least one store shelf, external sources communication module 1206 may obtain scheduling data about additional product inventory scheduled to arrive to the retail store (e.g., from supplier 115), shift data module 1208 may use employee scheduling data to determine information about scheduled restocking of the certain product type, and alert module 1210 may generate one or more alerts and/or suggestions regarding a product shortage of products in retail store 105, for example, alerting management to the shortage of a particular product.

In some embodiments, memory device 1200 may be part of system 100, for example, memory device 226. Alternatively, memory device 1200 may be stored in an external database or an external storage communicatively coupled with server 135, such as one or more databases or memories accessible over communication network 150. Further, in other embodiments, the components of memory device 1200 may be distributed in more than one server and more than one memory device.

In some embodiments, retail store communication module 1202 may receive information from sensors located in retail store 105. In one example, retail store communication module 1202 may receive images captured by a plurality of image sensors fixedly mounted in retail store 105 or receive data derived from images captured by plurality of image sensors fixedly mounted in retail store 105. In another example, retail store communication module 1202 may receive image data (e.g., images or data derived from images) from robotic capturing devices configured to navigate autonomously within retail store 105 and to capture images of multiple types of products on at least one store shelf. In yet another example, retail store communication module 1202 may receive data from one or more shelf sensors configured to measure quantities of products placed on a store shelf. The one or more shelf sensors may include pressure sensitive pads, light detectors, weight sensors, light sensors, odor sensors, resistive sensors, ultrasonic sensors, and more.

In some embodiments, data processing module 1204 may process the information collected by retail store communication module 1202 to determine a quantity of products located on at least one shelf in retail store 105. In some embodiments, products of the same product type may be located in a display area accessible to customers, while another portion of the products found in retail store 105 may be located in storage area not accessible to customers. The term "storage area" broadly includes all storage areas of products not displayed for sale in the retail store, for example, high shelves, below display areas of shelving unit, in a dedicated storage area, and more. In one embodiment, data processing module 1204 may determine product quantities for multiple types of products at a number of time intervals based on image data received from a plurality of image sensors fixedly mounted in retail store 105 (e.g., as illustrated in FIG. 4A). In another embodiment, data processing module 1204 may determine quantities of multiple types of products using a combination of image data and data from one or more shelf sensors configured to measure properties of products placed on a store shelf (e.g., as illustrated in FIG. 8A). For example, the data processing module 1204 may analyze the data received from detection elements attached to store shelves, alone or in combination with images captured in retail store 105, to determine the quantity of a certain product on at least one store shelf. In another embodiment, data processing module 1204 may determine whether a product is out-of-stock using a combination of image data and information about products available in at least one storage area of retail store 105. For example, the data processing module 1204 may use inventory records and image data to determine information about the current inventory of a certain type of product. The current inventory of the product may include the inventory displayed for sale and the inventory stored in retail store 105.

In addition, data processing module 1204 may determine the quantity of products of a certain product type by analyzing image data and other types of captured data. For example, data processing module 1204 may calculate a shortage duration or estimated duration of a product shortage. In some cases, determining the quantity of products of a certain product type on at least one store shelf may include aggregating data from two or more locations in retail store 105. For example, in one embodiment, data processing module 1204 may monitor the quantity of a certain product type displayed on a first shelving unit, on a second shelving unit, and/or in a storing area. For example, the first shelving unit may be located in a specific aisle, the second shelving unit may be located in a display next to the cashier, and the storing area may be in a cold room.

In some embodiments, external sources communication module 1206 may obtain scheduling data about additional products scheduled to arrive to the retail store. In one embodiment, external sources communication module 1206 may receive the scheduling data from one or more of entities in the supply chain. In one example, the scheduling data may be received from online services (e.g., from a server that store data on shipments orders). In another example, the scheduling data may be received from supplier 115 associated with the products (e.g., from a supplier scheduling deliveries). In another example, the scheduling data may be received from a market research entity 110 (e.g., statistics about demand for certain products). In another example, the scheduling data may be received from a shipment company that delivers the products (e.g., from an IoT sensor in a cargo ship). In another example, the scheduling data may be received from a distribution company that delivers the products (e.g., from an agent who supplies the products to retail stores). In one embodiment, external sources communication module 1206 may determine the scheduling data about the additional products using information collected from one or more of entities in the supply chain and other data sources, for example, Enterprise Resource Planning (ERP), Warehouse Management Software (WMS), and Supply Chain Management (SCM) applications. In addition, external sources communication module 1206 may generate the scheduling data using analytics of data associated with past delivery of products. For example, the external sources communication module 1206 may determine that a shipment of dairy products is scheduled to be delivered to retail store 105 based on past deliveries.

In some embodiments, shift data module 1208 may process information associated with employees in retail store 105. For example, shift data module 1208 may receive information from one or more systems (e.g., employee time-clock, weekly employee schedules, daily tasks assigned to employees) and determine whether an employee is currently assigned to restock a shelf or whether to generate an alert to have a product that is available in storage be restocked on a store shelf.

In some embodiments, alert module 1210 may use the output of data processing module 1204 and shift data module 1208 to determine whether or not to generate an alert for a product shortage in the retail store. In some embodiments, an alert may include a recommendation to mitigate the shortage, for example, the alert may generate an assignment to an employee to restock the particular product. In other embodiments, alert module 1210 may determine not to generate an alert, thereby, not alerting management to false shortages or desensitizing management by over-alerting to shortages. For example, in response to a shortage identified based on image data, alert module 1210 may receive shift data from shift data module 1208 indicating an employee is scheduled to restock. Because a restock of the product is already scheduled, alert module 1210 will not generate a shortage alert.

In some embodiments, database access module 1212 may cooperate with database 1214 to retrieve stored scheduling data such as product supply information. The product supply information may include, for example, a schedule of arrivals of additional products, inventory records, checkout data, calendar data, and historical product turnover data. Data processing module 1204 and shift data analysis module 1208 may use the product supply information stored in database 1214 to determine one or more factors related to product deliveries, product turnover, and/or restock frequency. Database 1214 may include separate databases, including, for example, a vector database, raster database, tile database, viewport database, and/or a user input database, configured to store data. The data stored in database 1214 may be received from modules 1202-1212, server 135, from any communication device associated with retail stores 105, market research entity 110, suppliers 115, and users 120. Moreover, the data stored in database 1814 may be provided as input using data entry, data transfer, or data uploading.

Modules 1202-1212 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 1202-1212 and data associated with database 1214 may be stored in database 140 and/or located on server 135, which may include one or more processing devices. Processing devices of server 135 may be configured to execute the instructions of modules 1202-1212. In some embodiments, aspects of modules 1202-1212 may include software, hardware, or firmware instructions (or a combination thereof) executable by one or more processors, alone, or in various combinations with each other. For example, modules 1202-1212 may be configured to interact with each other and/or other modules of server 135 to perform functions consistent with disclosed embodiments.

Figure 13A:
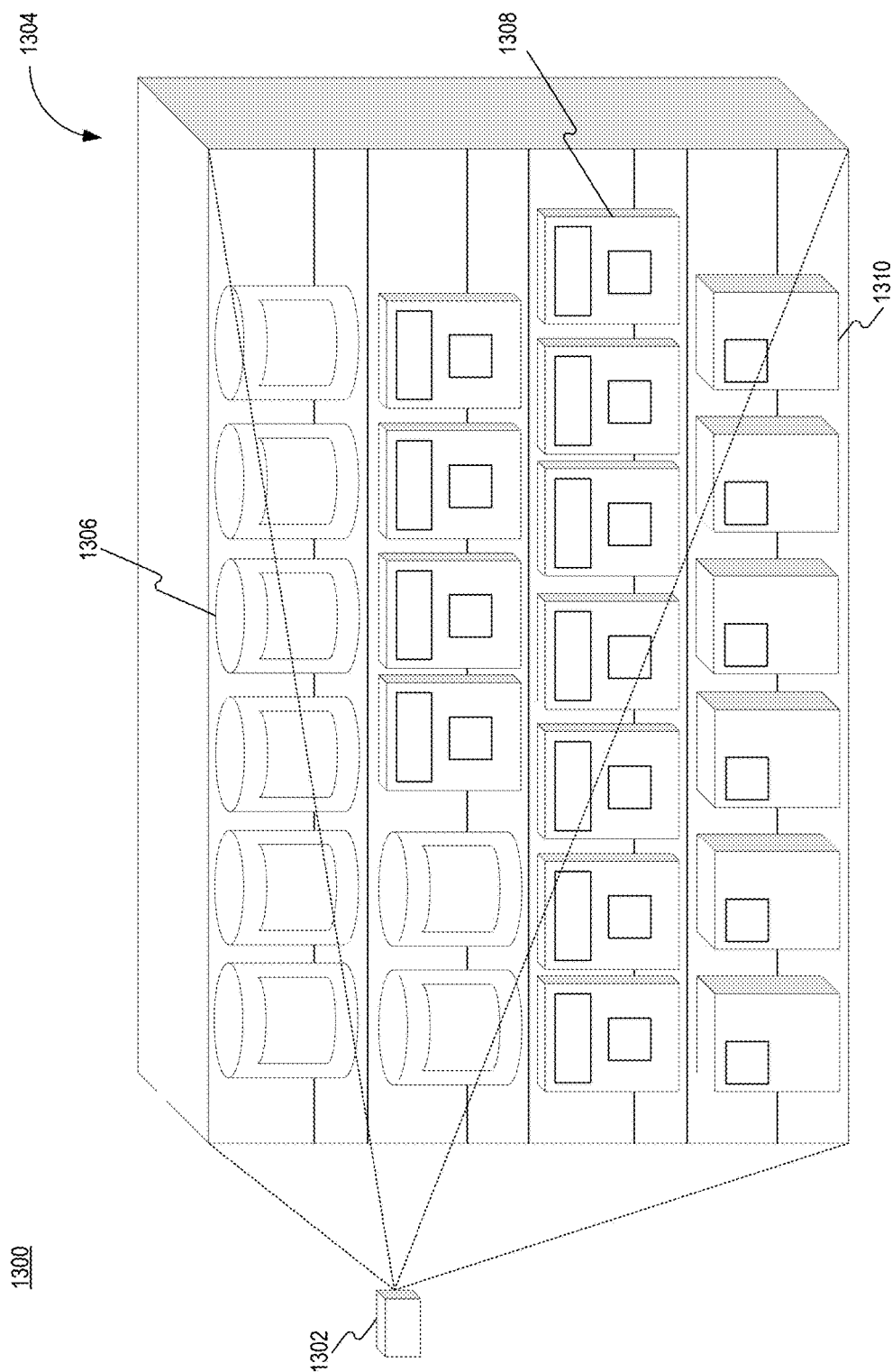
FIG. 13A is an illustration of a shelving unit at a first time consistent with the present disclosure.
Figure 13B:
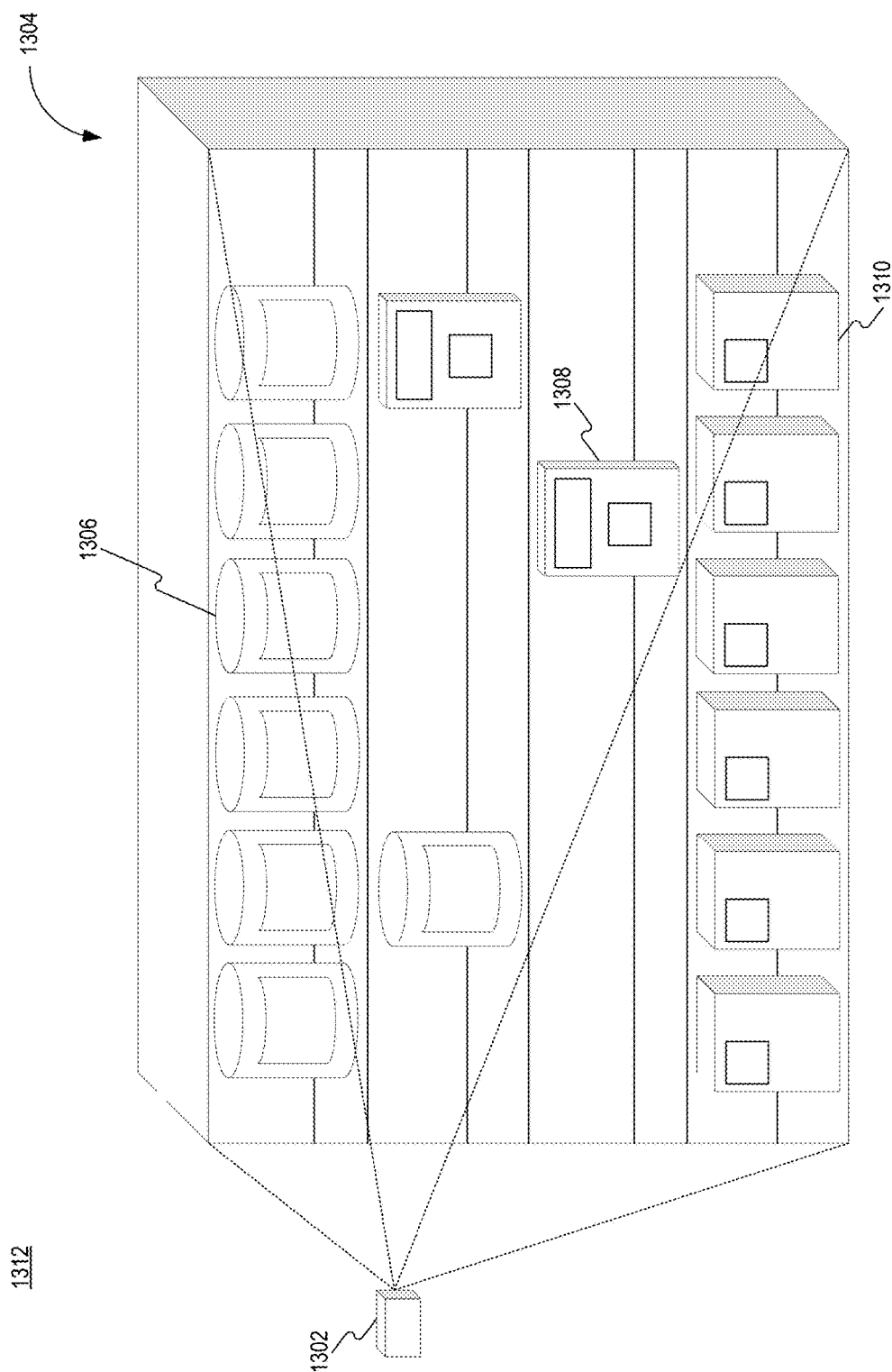
FIG. 13B is an illustration of a shelving unit at a second time consistent with the present disclosure.
Figure 13C:
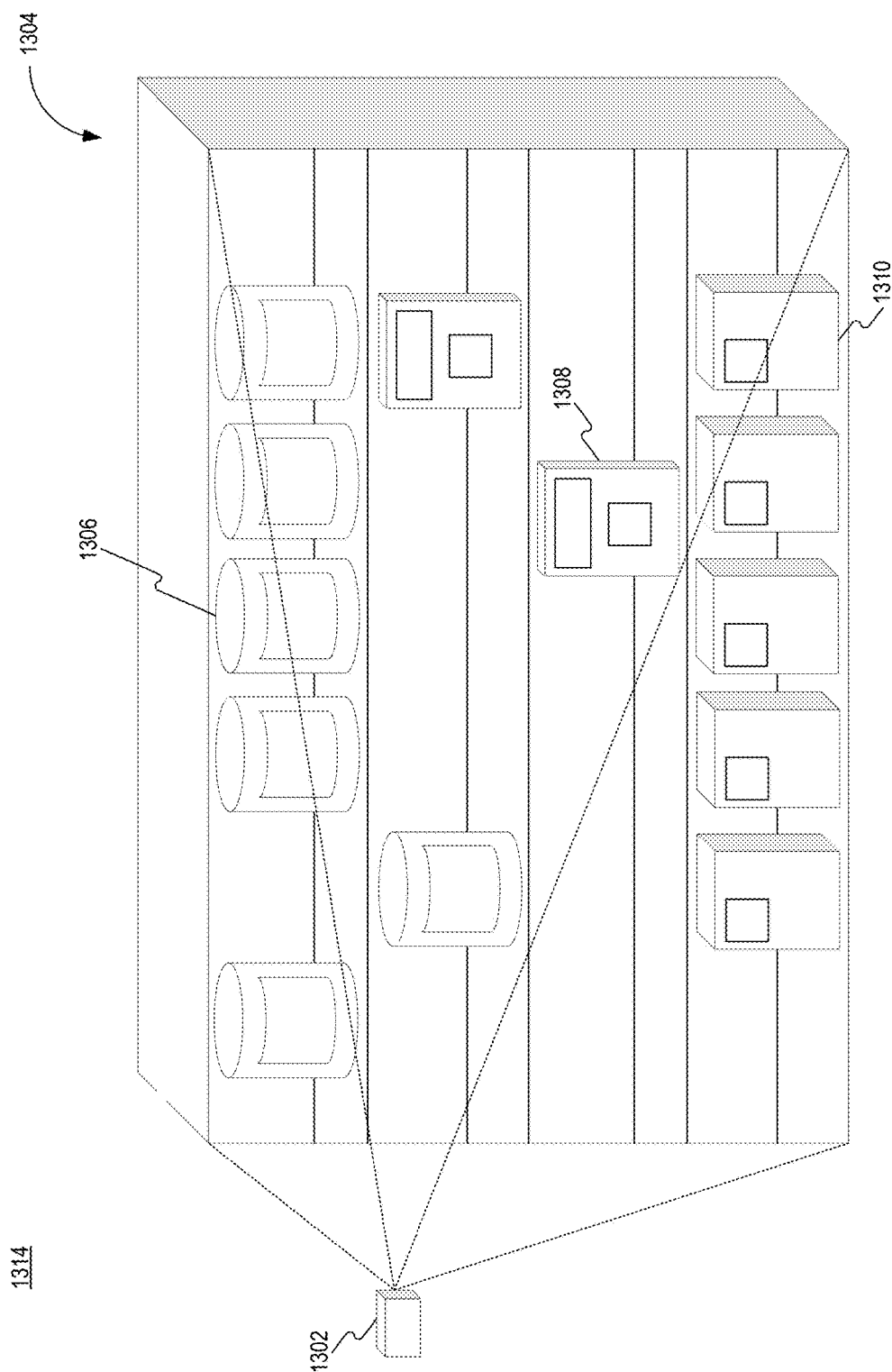
FIG. 13C is an illustration of a shelving unit at a third time consistent with the present disclosure.

Reference is now made to FIGS. 13A-13C, which illustrate shortage scenarios at a number of discrete times (e.g., a first time of scene 1300 of FIG. 13A, a second time of scene 1312 of FIG. 13B, and a third time of scene 1314 of FIG. 13C) that may be detected by an image capture device 1302 (e.g., image capture device 125) of system 100 (e.g., processing device 202). For example, image capture device 1302 may capture one or more images of a store shelf 1304 and product types 1306, 1308, and 1310. In some embodiments, a processor (e.g., processing device 202) of system 100 may access information describing a desired placement of products of a certain product type (e.g., product type 1306, 1308, or 1310) on at least one store shelf (e.g., shelf 1304). Processing device 202 may receive, at data processing module 1204, image data from a plurality of image sensors (e.g., image capture device 1302) including a plurality of images captured at different times and depicting the at least one store shelf 1304. Processing device 202 may access, e.g., via data interface 1212, information describing a desired placement of products of a certain product type on at least one store shelf. The information describing desired placement of objects may include a planogram, a realogram, other kind of instructions, rules, obligations, etc.

Data processing module 1204 may analyze, from among the plurality of images, a first image captured at a first time to determine that a first quantity of products of the certain product type at the first time exceeds a quantity threshold associated with the information describing the desired placement of products. In some embodiments, alert module 1210 may receive, e.g., from data access module 1212, a quantity threshold associated with each product type. For example, data access module 1212 may query database 1214 to retrieve a quantity threshold for each of product types 1306, 1308, and 1310 identified in images of shelf 1304.

In some embodiments, the quantity threshold may be selected based on type of product (e.g., brand, category, particular product, etc.). In other embodiments, the quantity threshold may be based on the location of shelf within the store. For example, the same product may have one threshold for a promotional display and a second threshold for a shelf within the category area. In other embodiments, the quantity threshold may be based on the type of shelf (e.g., an end display, a display at a register, or a shelf within the category area). The quantity threshold may also be based on time of day, retail store, adjunct products, number of facings of the product type, and so forth. As an example, a small store may have different thresholds than a large store, a store with a first number of store associates may have different thresholds than a store with fewer associates, and a discount store may have different threshold than a high end store, etc.

In another example, a product may have a higher quantity threshold at peak times than at off-peak times.

In some embodiments, the threshold quantity, as well as other predetermine values discussed below, may be determined based on information including at least one of: a schedule of arrivals of the additional products (e.g., dates, times, updates from a supplier, etc.), known orders of the additional products (e.g., quantity of scheduled products), delivery records (e.g., the reports on the delivery progress of the additional products and/or data predicting future delivery of additional products), cost data (e.g., the different costs associated with the additional products), calendar data (e.g., holidays, sport games, etc.), historical product turnover data (e.g., the amount of avocados sold per last April), average turnover (e.g., per hour in a day, per day in a week, per special events), and more. In one embodiment, the information may be obtained from multiple sources (e.g., market research entity 110, supplier 115, and multiple retail stores 105) and may include different types of parameters. In some embodiments, the obtained information may be stored digitally in memory device 226, stored in database 140, received using network interface 206 through communication network 150, received from a user, determined by processing device 202, and so forth.

In some embodiments, at least one product type may be a fresh product. The processing device may analyze the plurality of images to determine a quality of the products on the at least one store shelf, and to determine if there is a product shortage based on both the quantity and determined quality of the products on the at least one store shelf, as described in further detail with reference to FIGS. 18-25. As an example, even if the quantity of tomatoes on a shelf is greater than the threshold quantity, a shortage may still be reported if their quality is low.

FIG. 13B depicts a scene 1312 at a second time, the second time being later than the first time. Data processing module 1204 may analyze, from among the plurality of images, a second image captured at a second time later than the first time to determine that a second quantity of products of the certain product type at the second time is below the quantity threshold associated with the information describing the desired placement of products. Alert module 1210 may receive, e.g., from data access module 1212, a quantity threshold associated with each product type and/or information describing the desired placement of products.

For example, in scene 1312, data processing module 1204 may determine that the shelf 1304, at the second time, is stocked with seven of product type 1306 (fewer than at the first time), two of product type 1308 (fewer than at the first time), and six of product type 1310 (the same quantity as at the first time). In this example, the respective quantity thresholds for each of product type 1306, 1308, and 1310 is two units, five units, and three units, respectively. Also, in this example, the quantity of product type 1308 is below the threshold amount of five units. Although the quantity of product type 1306 on shelf 1304 has decreased, the quantity is not less than the threshold of two units. In some embodiments, the quantity threshold may be a product density, number of units, etc.

For each of the three product types 1306, 1308, and 1310 at a first time in scenario 1300, based on the determination that the first quantity of products of the certain product type at the first time exceeds the quantity threshold, alert module 1210 may avoid initiating an unscheduled action to cause restocking the at least one store shelf with products of the certain product type at least until a third time later than the second time. For example, because the shelf 1304 is stocked with a number of units for each product that is greater than the quantity threshold for each product, no alert is generated by the system.

FIG. 13C depicts a scene 1314 at a third time, the third time being later than the first time and the second time. Data processing module 1204 may analyze, from among the plurality of images, a third image captured at the third time to determine that a third quantity of products of the certain product type at the third time is also below the quantity threshold associated with the information describing the desired placement of products. Again, alert module 1210 may receive, e.g., from data access module 1212, a quantity threshold associated with each product type and/or information describing the desired placement of products.

Referring to FIG. 13C, at the third time shown in scenario 1314, shelf 1304 is now stocked with six of product type 1306 (fewer than at the first time and at the second time), two of product type 1308 (fewer than at the first time, but the same amount as at the second time), and five of product type 1310 (fewer than at the first time and at the second time). Remembering that the quantity thresholds for product types 1306, 1308, and 1310 are two units, five units, and three units, respectively, the quantity of product 1308 is below its quantity threshold at both the second time (scenario 1312) and third time (scenario 1314).

Thus, for product type 1308, based on the determination that the second quantity of products of the certain product type at the second time and the third quantity of products at the third time are below the quantity threshold, alert module 1210 may provide information indicative of a product shortage at the at least one store shelf. In this example, even though the number of products of product types 1306 and 1310 have decreased between the first, second, and third times, neither is below the threshold quantity and, therefore, alert module 1210 will not generate a shortage alert for product types 1306 and 1310.

Alert module 1210 may provide an alert, information regarding a detected shortage, and/or suggestion of how to mitigate a shortage to an entity associated with retail store 105. Consistent with the present disclosure, the entity associated with retail store 105 may be an employee (human or robot) of retail store 105, a customer of retail store 105, a user of system 100 that monitors retail store 105 (e.g., market research entity 110), a processing device that control operations associated with retail store 105 (e.g., ERP system, WMS system, and SCM system), and any other device or individual capable of implementing suggestions regarding restocking products in retail store 105.

In some embodiments, the processing device may provide the information indicative of a product shortage to an external system configured to aggregate product shortage information from a plurality of retail stores, for example, via external communication module 1206. The processing device may receive, from the external system, information relating to the aggregation of product shortage information from the plurality of retail stores. Such information may include, for example, the estimated time span until restocking, type of product (brand, category, particular product, etc.), location within the store, time in day associated with the product shortage, information about the retail store (size, type, location, etc.), information about adjunct products, information about the planogram (number of facings, etc.). For example, the aggregated data may be used to generate statistics about shortage durations associated with the certain product type. These statistics may be used by retail store 105, market research entity 110, and/or supplier 115 to inform operational decisions and evaluate performance.

Figure 14A:
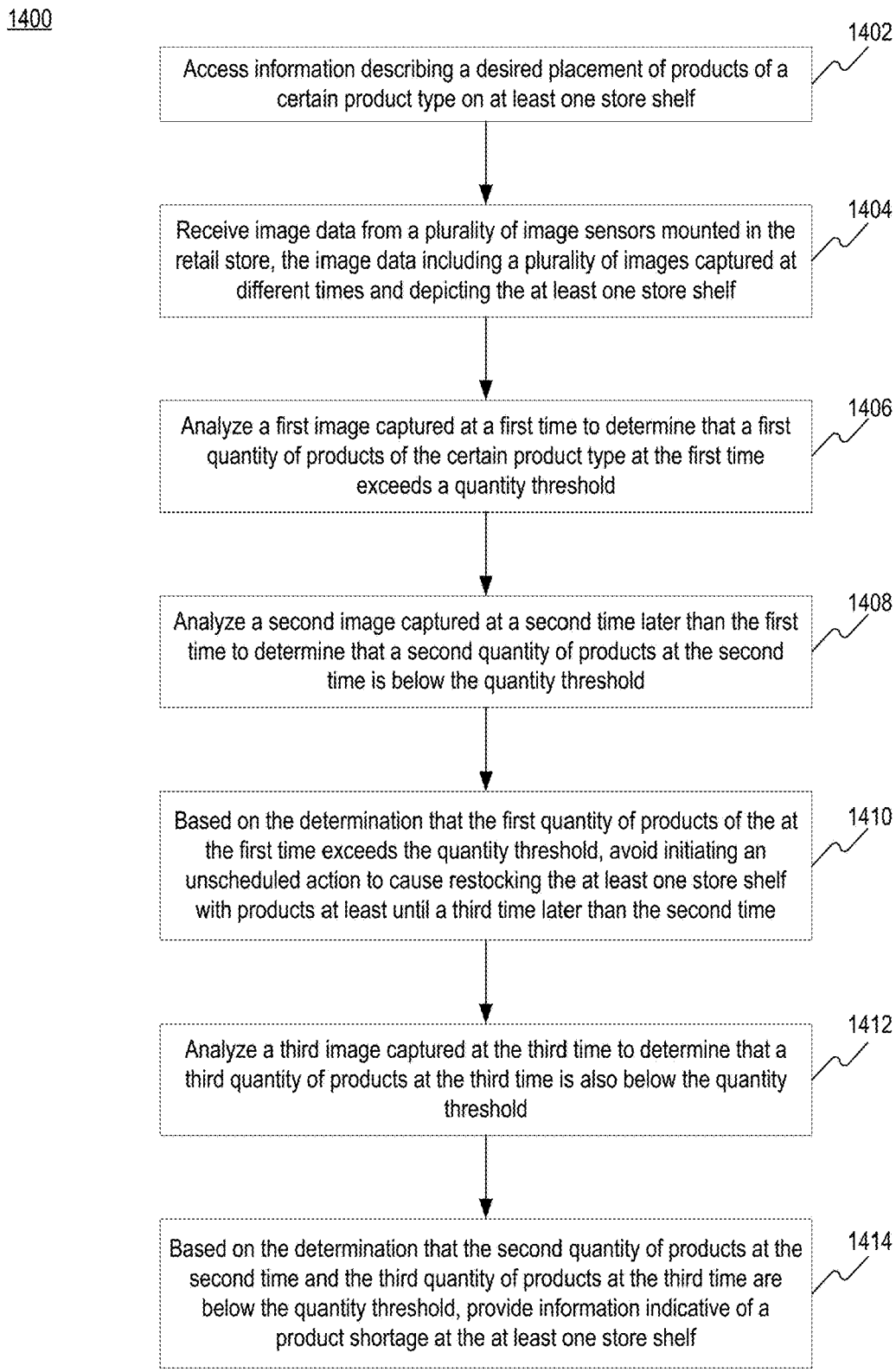
FIG. 14A is a flowchart of an exemplary method for processing images captured in a retail store and automatically identifying a product shortage consistent with the present disclosure.

FIG. 14A depicts an exemplary method 1400 for processing images captured in a retail store and automatically identifying a product shortage. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 1402, a processing device (e.g., processing device 202) may access information describing a desired placement of products of a certain product type on at least one store shelf in retail store 105. For example, processing device may retrieve placement information, via database access module 1212, from database 1214. In other embodiments, placement information may be received from a market research entity 110 or a supplier 115 via external sources communication module 1206. The placement information may include a planogram, a realogram, instructions, rules, obligations, etc. For example, the product placement information may reflect an agreed upon arrangement or product density as described in a contract between retail store 105 and supplier 115. In another example, a market research entity 110 may provide retail store 105, or supplier 115, with an optimized product placement plan based on aggregate data analysis of the product type at a number of retail stores. In yet another example, the realogram may be determined according to actual placement of products on the at least one store shelf, for example, as determined by analyzing images of the at least one store shelf captured over time, as determined from manual reports, and so forth.

At step 1404, the processing device may receive image data from a plurality of image sensors mounted in the retail store, the image data including a plurality of images captured at different times and depicting the at least one store shelf in retail store 105. In one embodiment, the image data may be generated from the plurality of images acquired by any one of image capturing devices 125 illustrated in FIG. 4A-4C. For example, the set of images may be acquired by a plurality of image sensors fixedly mounted in retail store 105. Details of the image capturing devices mounted in retail store 105 and configured to acquire the plurality of images are described with references to FIGS. 5A-5C. The plurality of images may be used by data processing module 1204 to derive image data such as processed images (e.g., cropped images, video streams, and more) or information derived from the captured images (e.g., data about products identified in captured images, data that may be used to construct a 3D image, and more). In one embodiment, the processing device may periodically receive a plurality of images that corresponds with the certain product type on the at least one shelf. For example, the processing device may receive an image of the plurality of images at predetermined time intervals (e.g., every minute, every 5 minutes, every 15 minutes, every 30 minutes, etc.). In another embodiment, the processing device may receive an image of the plurality of images in response to a detection of a certain identified event. In one example, the processing device may receive the plurality of images after an event, such as a detected lifting of a product from the shelving unit.

At step 1406, the processing device may analyze, from among the plurality of images, a first image captured at a first time to determine that a first quantity of products of the certain product type at the first time exceeds a quantity threshold associated with the information describing the desired placement of products. In one embodiment, the processing device may determine quantity of products using a combination of image data derived from the received plurality of images and data from one or more additional sensors. In another embodiment, the processing device may determine a quantity of products using data from the one or more additional sensors without using the image data. For example, the one or more additional sensors may include weight sensors, pressure sensors, touch sensors, light sensors, and detection elements as described in relation to FIGS. 8A, 8B and 9, and so forth. Such sensors may be used alone or in combination with image capturing devices 125. For example, the processing device may analyze the data received from weight sensors alone or in combination with images captured from the retail store, to estimate the number of units of product on a store shelving unit.

In some embodiments, analyzing an image of the plurality of images to determine a quantity of products may further comprise preprocessing the image data. In some examples, the image data may be preprocessed (e.g., by data processing module 1204) by transforming the image data using a transformation function to obtain a transformed image data, and the preprocessed image data may include the transformed image data. For example, the transformation function may comprise convolutions, visual filters (such as low-pass filters, high-pass filters, band-pass filters, all-pass filters, etc.), nonlinear functions, and so forth. In some examples, the image data may be preprocessed by smoothing the image data, for example, by using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy compression representation of at least part of the image data; a lossless compression representation of at least part of the image data; a time order series of any of the above; any combination of the above; and so forth. In some examples, the image data may be preprocessed to extract edges, and the preprocessed image data may include information based on and/or related to the extracted edges. In some examples, the image data may be preprocessed to extract visual features from the image data. Some examples of such visual features include edges, corners, blobs, ridges, Scale Invariant Feature Transform (SIFT) features, temporal features, and so forth. One of ordinary skill in the art will recognize that the image data may be preprocessed using other kinds of preprocessing methods.

In some embodiments, analyzing an image of the plurality of images to determine a quantity of products may further comprise using a trained machine learning model to analyze the image and/or the preprocessed images to determine the quantity of products. For example, the machine learning model may be trained using training examples to determine numbers of products of selected product types from images and/or videos. An example of such training example may include an image together with a number of products of the selected product types depicted in the image. In some embodiments, analyzing an image of the plurality of images to determine a quantity of products may further comprise using an artificial neural network (such as a deep neural network, a convolutional neural network, etc.) to analyze the image and/or the preprocessed image to determine the quantity of products. For example, the artificial neural network may be configured to determine numbers of products of selected product types from images and/or videos.

At step 1408, the processing device may analyze, from among the plurality of images, a second image captured at a second time later than the first time to determine that a second quantity of products of the certain product type at the second time is below the quantity threshold associated with the information describing the desired placement of products. Analysis of the second image may include preprocessing, or the processing techniques discussed above with reference to step 1406. As in step 1406, the second quantity may be determined, based at least in part, on information collected from one or more other types of sensors, e.g., a weight sensor.

At step 1410, based on the determination that the first quantity of products of the certain product type at the first time exceeds the quantity threshold, the processor may avoid initiating an unscheduled action to cause restocking the at least one store shelf with products of the certain product type at least until a third time later than the second time. For example, alert module 1210 may receive the data from analysis of the first and second images at steps 1406 and determine that the quantity of the product exceeds a quantity threshold for that product. In some embodiments, the quantity threshold may be based on a weight of the product on the shelf, as detected by a weight sensor.

At step 1412, the processor may analyze, from among the plurality of images, a third image captured at the third time to determine that a third quantity of products of the certain product type at the third time is also below the quantity threshold associated with the information describing the desired placement of products. As described above, the analysis of the third image may include one or more preprocessing steps, and/or may include analyzing data from a number of different types of sensors.

At step 1414, based on the determination that the second quantity of products of the certain product type at the second time and the third quantity of products at the third time are below the quantity threshold, the processor may provide information indicative of a product shortage at the at least one store shelf. In some embodiments, the information indicative of a shortage may include one or more suggestions for mitigating the shortage. Some examples of such suggestions may include a suggestion to restock the at least one store shelf, a suggestion for reordering products on the at least one store shelf, a suggestion for moving products of the certain product type from another part of the retail store to the at least one store shelf, a suggestion to allocate space of the at least one store shelf to another product type (for example when products of the certain product type are unavailable for restocking), and so forth.

Consistent with the present disclosure, the processing device may perform big data analytics on the information about the displayed inventory and/or the information about the product. Typically, the big data analytics may be executed in an automatic or autonomous manner without using any user input during the learning analysis. In one embodiment, the processing device may perform large-scale data analysis on the received information image data and scheduling data to discover, detect, or learn new data. For example, the large-scale data analysis involves the process of examining large quantities of data (e.g., data mining, data discovery, etc.) to extract new or previously unknown interesting data or patterns, such as unusual demand events for a certain type of product or an average shortage duration. The processing device may also perform large-scale data analysis on the stored data (e.g., machine learning analysis, data modeling, pattern recognition, predictive analysis, correlation analysis, etc.) to predict, calculate, or identify implicit relationships or inferences within the stored data. For example, the processing device may identify at least one pattern correlating a combination of different parameters to product sales. The different parameters may include the quantity of products on display, the number of employees working at the time of a product shortage, the predicted demand for the products, the location at which the products are being displayed, the time of day, the day of the week, the price of the product, and the like. The identified at least one pattern may be used for determining whether or not to generate an alert indicating a product shortage or to generate suggestions of how to mitigate an ongoing shortage in retail store 105.

Figure 14B:
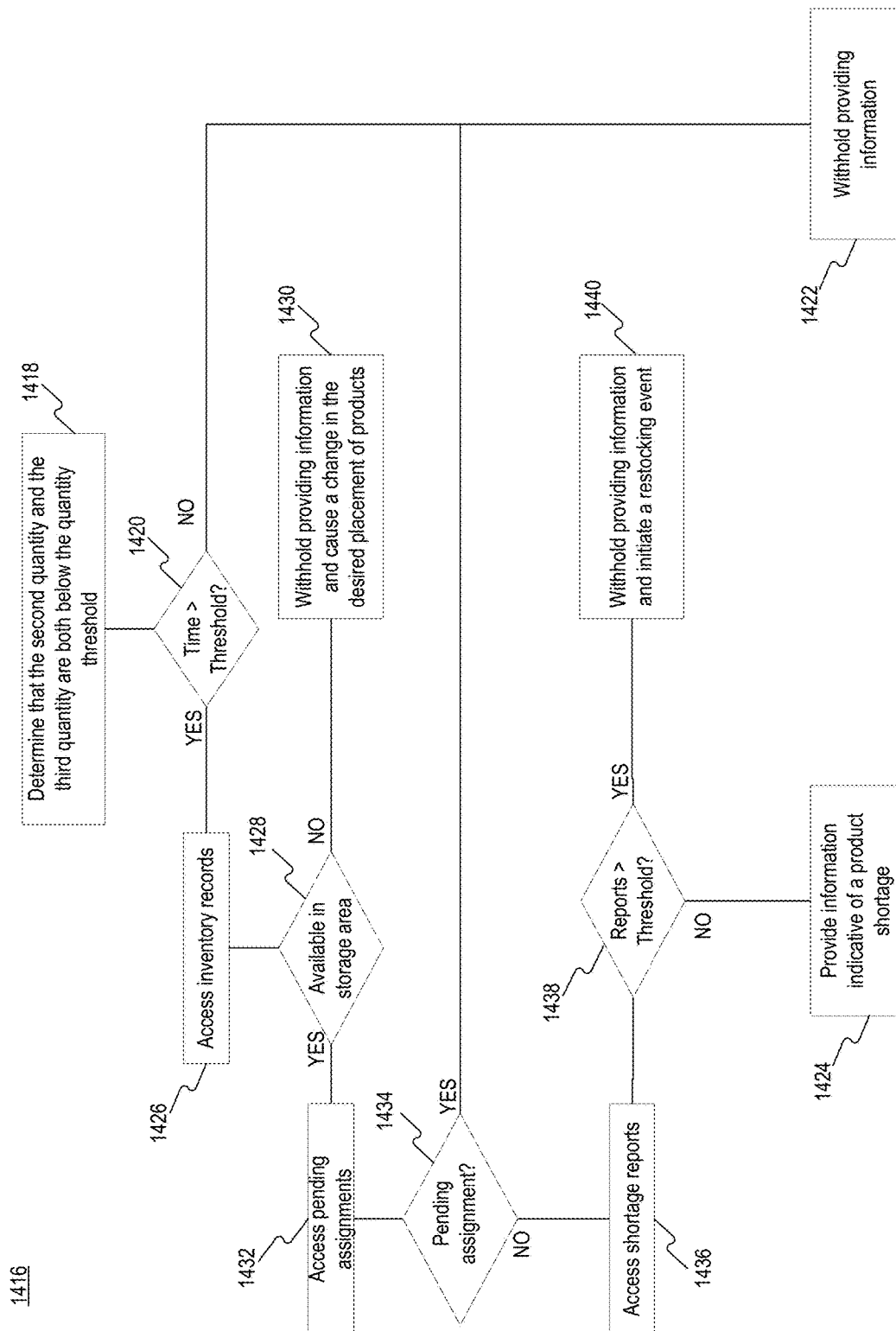
FIG. 14B is a flowchart of an exemplary process for automatically identifying a product shortage consistent with the present disclosure.

FIG. 14B depicts a flowchart of an example process 1416 executed by a processing device of system 100 (e.g., processing device 202) for processing images captured in a retail store and automatically identifying a product shortage in retail store 105. For purposes of illustration, in the following description, reference is made to certain components of system 100. It will be appreciated, however, that other implementations are possible and that other components may be used to implement example process 1416. It will also be readily appreciated that the example process 1416 can be altered to modify the order of steps, delete steps, or further include additional steps.

Process 1416 may begin when the processing device analyzes a received set of images to determine that the second quantity and the third quantity are both below the quantity threshold (block 1418). For example, block 1418 may occur after, or in tandem, with steps 1406-1414 of method 1400.

The processing device may access information indicating that a scheduled restocking event related to the certain product type is about to take place within a period of time after the third time. For example, shift data module 1208 may analyze current workstreams and/or employee data to determine whether a restocking event is scheduled or has been assigned to an employee. The processing device may determine whether the scheduled restocking event falls within a period of time after the third time (decision block 1420).

The time threshold may be selected based on type of product (brand, category, particular product, etc.). In some embodiments, the time threshold may be based on the location of a shelf within the store or the type of shelf. For example, the same product may have one time threshold for a promotional display and a second time threshold for a shelf within the category area. The time threshold may be based on the time of day such that, for example, a shorter time threshold indicates higher urgency at peak times. The time threshold may also depend on the type or size of the retail store. For example, a small store may have different time threshold than a large store, a store with a first number of store associates may have different time threshold than a store with fewer associates, or a discount store may have different time threshold than a high end store, etc. In other embodiments the time threshold may be based on adjunct products, number of facings of the product type, and the like.

The processing device may withhold providing the information indicative of a product shortage when the period of time is less than the time threshold (block 1422). For example, if a scheduled restocking event is about to take place, there is no need to provide an alert to a store manager or employee. When the period of time is greater than a time threshold, the processing device may provide the information indicative of a product shortage (block 1424), for example, via an alert provided to a device of a store manager. In some embodiments, if the time is greater than the time threshold, process 1416 may proceed to block 1426.

In some embodiments, the processing device may access information indicative of a quantity of products of the certain product type available in a storage area of the retail store (block 1426). As used herein, storage area may refer to any area of retail store 105 storing product that is not currently being offered for sale. For example, a storage area may include a warehouse, industrial freeze or refrigerator, stock room, etc. Information indicative of quantity of products available in the storage area may include inventory data maintained in database 1214, image data collected by image capture devices 125 and analyzed by data processing module 1204, and/or other inventory information. For example, the available quantity may be based on purchase order data, sales data, real-time NFC information (e.g., RFID tag scans), and/or optical information (e.g., barcode or QR code scans).

Based on the determined product availability information (decision block 1428), the system may determine whether or not to indicate a product shortage and provide shortage information to one or more systems or devices. If there are no available products of the certain product type available in the storage area of the retail store, the processing device may withhold providing the information indicative of a product shortage (block 1430). For example, if a product is out-of-stock, or there is low or no inventory in a storage area, the processing device may not report a shortage of the product, since no mitigating action (e.g., restocking the shelf) may be taken.

In some embodiments, the processing device may cause a change to the desired placement of products when there are no available products of the certain product type in the storage area of the retail store. For example, if a product is out-of-stock, alert module 1210 may generate information indicative of a change in the desired placement of products to avoid empty shelves or to move remaining product to a more heavily trafficked area of the store. In some embodiments, alert module 1210 may generate updated information describing a desired placement of products of a certain product type on at least one store shelf, e.g., a modified planogram.

As an example, a product shortage may be identified for Product A, which is displayed on a shelf and at a register. If the shortage occurs at the register display and there is no inventory of Product A in the store's storage area, alert module 1210 may generate instructions to move some of Product A on the shelf to the register display. In some embodiments, the product shortage information may include information indicative of a quantity of products in each location. In another example, instructions to restock one location may be assigned a lower priority if the customer can find the item in a second location. The instructions may be provided, for example, to an employee or manager via a user device. In some embodiments, the instructions change the product display may be based on instructions from market research entity 110, supplier 115, or on other historical or aggregate product data.

When there are available at least some products of the certain product type in the storage area of the retail store, the processing device may provide the information indicative of a product shortage, for example, to a device associated with a store manager or employee (block 1426). In some embodiments, when there are available at least some products of the certain product type in the storage area of the retail store, the processing device may communicate with one or more systems of the retail store 105 to cause a restocking event related to the product type when there are available products of the certain product type available in the storage area of the retail store.

In some embodiments, when there are available at least some products of the certain product type in the storage area of the retail store, process 1416 may proceed to block 1432. The processing device may access information indicative of pending assignments of one or more store employees, for example, via shift module 1208. Pending assignments may include, for example, employee-specific assignments, scheduled events, shift start and end times, etc. The processing device may then determine whether or not a pending assignment exists in one or more systems of the retail store 105 for restocking the at least one store shelf (decision block 1434). When there is a pending assignment for restocking the at least one store shelf, the processing device may withhold providing the information indicative of a product shortage when there is a pending assignment for restocking the at least one store shelf (block 1422). For example, the processing device will not generate extraneous shortage alerts if the product shortage is known and being handled or if an employee has already begun or is assigned to begin restocking the at least one shelf. In some embodiments, the pending assignment, e.g., to restock a shelf in response to a shortage, may be created manually by a store associate, by a customer (via a crowd sourcing application), by another image processing system, in response to data from other sensors, etc.

When there is no pending assignment for restocking the at least one store shelf, process 1416 may provide the information indicative of a product shortage (block 1424). In some embodiments, when there is no pending assignment for restocking the at least one store shelf, process 1416 may proceed to block 1436.

The processing device may also determine a number of times within a certain time period that the information indicative of a product shortage at the at least one store shelf was previously provided (block 1436). The number of times may include shortage information input manually by a store associate, by a customer (via a crowd sourcing application) or may include automatically generated shortage reports from another image processing system, in response to data from other sensors, etc. The system may then compare the number of times with a predetermined threshold (decision block 1438).

The processing device may, for example, withhold providing the information indicative of a product shortage when the number of times is at least equal to the predefined number (block 1440), for example, in order to reduce number of alerts that are ignored by the store associates (e.g., the alerts may be ignored by the store associates since no remedy to the shortage is currently available). The predetermined number may be selected based on type of product (brand, category, particular product, etc.), for example, by selecting a first predetermined number for a first product type and selecting a second predetermined number for a second product type. In some embodiments, the predetermined number may be based on the location of a shelf within the store or the type of shelf. For example, there may be a number of times for a promotional display in a high-traffic area and a second number for a shelf within the category area. The number may be based on the time of day such that, for example, a lower number indicates higher urgency at peak times. The number may also depend on the type or size of the retail store. For example, a small store may have a different predetermined number than a large store, a store with a first number of store associates may have a different predetermined number than a store with fewer associates, or a discount store may have a different number of times than a high end store, etc. In other embodiments the predetermined number may be based on adjunct products, number of facings of the product type, and the like.

In some embodiments, the system may initiate a restocking event. For example, the processing device may initiate a restocking event if a shortage has been reported a number of times greater than or equal to the predetermined number and no restocking event is scheduled, nor is any employee assigned a restocking task.

It is to be understood that the steps of process 1416 may occur in any order, and may be executed simultaneously or in tandem.

When the number of times is smaller than a predetermined number the processing device may provide the information indicative of a product shortage (block 1424). At block 1424, the information may be provided via one or more user devices, or may be provided to one or more other automated systems associated with the retail store 105, market research entity 110, or supplier 115. For example, the information may be provided as described above in connection with step 1414.

Figure 14C:
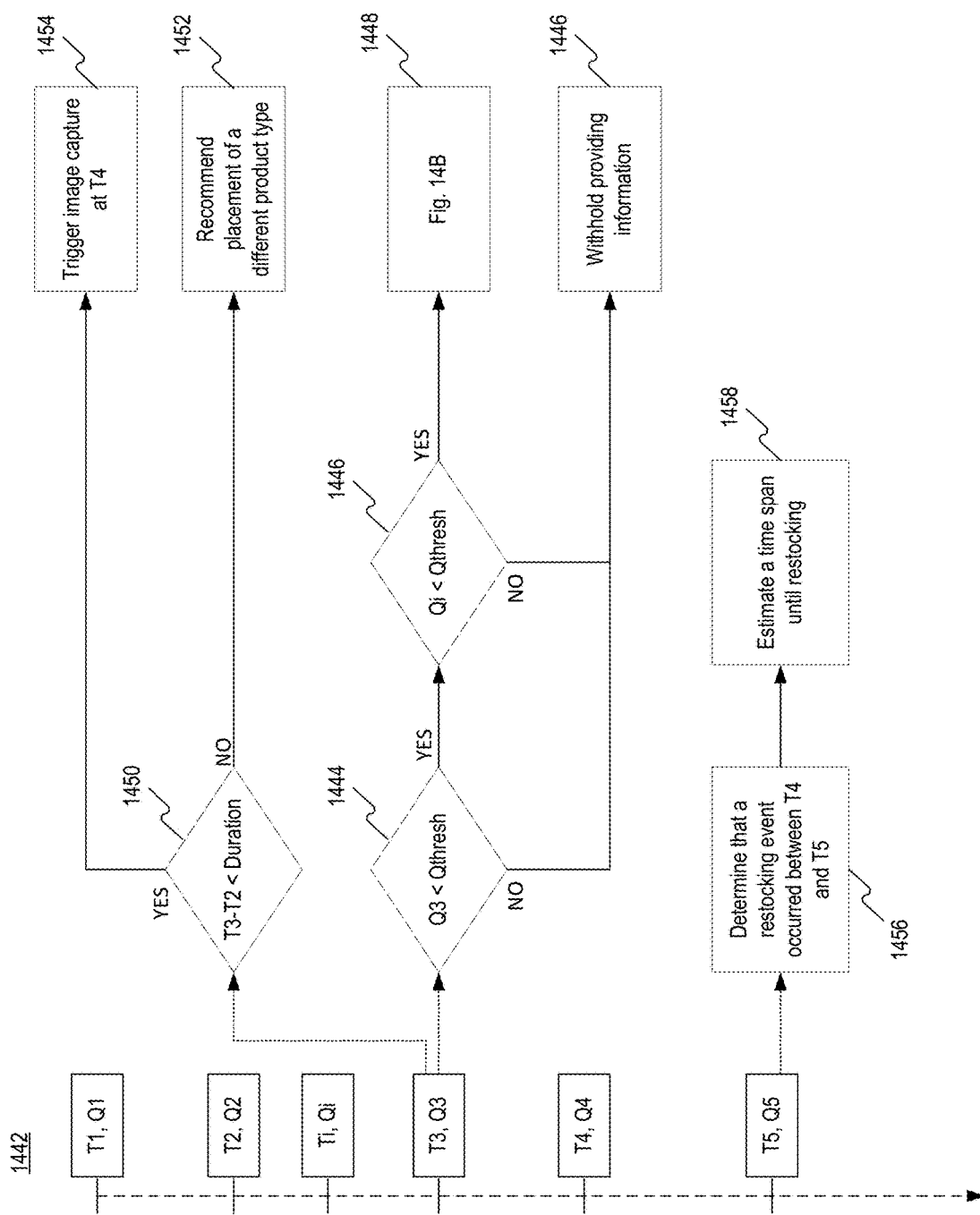
FIG. 14C is a flowchart of another exemplary process for automatically identifying a product shortage consistent with the present disclosure.

FIG. 14C is a flowchart of an example of a process 1442 for processing images captured in a retail store and automatically identifying a product shortage. Process 1442 may begin when the processing device analyzes a received set of images to determine that the second quantity and the third quantity are both below the quantity threshold and may occur after, or in tandem, with steps 1406-1414 of method 1400 and steps 1418-1440 of process 1416.

As previously described, the processing device may receive a plurality of images taken by an image capture device (e.g., image capture device 125) at times T1, T2, Ti, T3, T4, and T5. Also as previously described, the processing device may analyze, from among the plurality of images, each image captured at each time to determine a quantity of products (Q1, Q2, Qi, Q3, Q4 and Q5, respectively) of the certain product type at each time. As described above, the analysis of each image may include one or more preprocessing steps, and/or may include analyzing data from a number of different types of sensors.

In some embodiments, the processing device may analyze, from among the plurality of images, an additional image captured at an intermediate time (Ti) between the second time (T2) and the third time (T3) to determine a fourth, or intermediate, quantity (Qi) of products of the certain product type at the intermediate time. The processing device may determine whether the quantity of product at T3 is below a quantity threshold (Qthresh) (decision block 1444) and may also determine whether the intermediate quantity is below the threshold quantity (decision block 1446).

If the third quantity and intermediate quantity are both greater than the threshold quantity, the processor may withhold providing the information indicative of a product shortage (block 1446). If the third quantity is less than the threshold quantity, but the intermediate quantity is greater than the threshold quantity, the processor may also withhold providing the information indicative of a product shortage (block 1446). However, if both the third quantity and the intermediate quantity are both less than the threshold quantity, the processing device may provide the information indicative of a product shortage or may continue with one or more steps of process 1416 (block 1448).

For example, if the third quantity is below the threshold, but an intermediate quantity is above the threshold, the difference in quantity may be due to normal fluctuations. As an example, product on the at least one shelf may be depleted and restocked several times during peak hours. Even if both Q2 and Q3 are below the threshold, if Qi is greater than the threshold, the shelf may have been recently restocked at a time between T2 and T3. In another example, the processing device may receive image data captured at a number of intermediate times between T2 and T3.

In some embodiments, the threshold quantity for the intermediate images may be different from the threshold quantity at times T2 and T3. For example, the threshold for the intermediate images may be based on the quantity in the image at T2 such that the threshold represents any increase in the number of products on the at least one shelf between T2 and Ti. In some embodiments, the interim threshold may be a number of products, a product density, a percentage of the quantity of products at T2, etc. Thus, the intermediate images may be used to account for noise, thereby reducing erroneous shortage alerts. Noise may occur due to, for example, detection errors by the computer vision, a customer returning a product, etc.

In some embodiments, the processing device may determine whether an elapsed time between the second time and the third time is less than or greater than a predetermined shortage time duration (block 1450). The duration may be selected based on type of product (brand, category, particular product, etc.). In some embodiments, the duration may be based on the location of a shelf within the store or the type of shelf. For example, there may be one duration for a promotional display in a high-traffic area and another duration for a shelf within the category area. The duration may be based on the time of day such that, for example, a shorter duration indicates higher urgency at peak times. The duration may also depend on the type or size of the retail store. For example, a small store may have a different duration than a large store, a store with a first number of store associates may have different duration than a store with fewer associates, or a discount store may have a different duration than a high end store, etc. In other embodiments the duration may be based on adjunct products, number of facings of the product type, and the like.

Thus, if the difference between T3 and T2 is less than the predetermined duration, the processing device may withhold providing the information indicative of a product shortage based on the determination. For example, the duration may be one minute. A change in product quantity over a period of time of less than a minute would not trigger a shortage alert. Similarly, in some embodiments, if the difference between T3 and T2 is on the order of, for example, days, a shortage alert is not triggered. In some embodiments, if the elapsed time between the second time and the third time is greater than the predetermined shortage time duration, the at least one processor is further configured to provide a recommendation to place products from a differing product type on the at least one store shelf (block 1452). As an example, if a product has not been restocked for ten days (e.g., T2 occurred ten days prior to T3 and Q2 and Q3 are both less than the quantity threshold), the system should not generate continuous shortage alerts. Rather, such a scenario may occur due to other factors, e.g., stocking changes, contractual changes with a vendor, seasonal items, etc.

If the elapsed time between the second time and the third time is less than the predetermined shortage time duration, the at least one processor may be further configured to trigger capturing of an additional image to determine a quantity of products of the certain product type at a time after the third time, e.g., at T4 (block 1454). As an example, assuming that the selected shortage duration is between 4 hours and 8 hours, and the elapsed time is 3.5 hours, the system may trigger one or more image capture devices to capture an additional image after 0.5 hours. Thus, system receives an image at regular intervals such that a shortage in the appropriate time frame may be detected.

In some embodiments, the processing device may analyze a fourth image captured at a fourth time (T4) later than the third time and a fifth image captured at a fifth time (T5) later than the fourth time to determine that a restocking event occurred between the fourth time and the fifth time (block 1456). The processing device may estimate a time span until restocking based on at least one of the first time and the second time and based on at least one of the fourth time and the fifth time and provide information based on the estimated time span until restocking (block 1458). For example, the estimated time span may be used in calculating future shortage durations, determining image capture intervals, providing metrics on anticipated shortages, etc.

It is to be understood that the steps of process 1416 may occur in any order, and may be executed simultaneously or in tandem.

Aggregating Product Shortage Information

Product shortages may cause inefficiencies and losses for retail stores due to inefficient use of space, decreased product turnover, inability to meet customer demand, etc. Disclosed embodiments may reduce product shortage durations in retail stores by using aggregated product shortage information from many stores and applying big data algorithms to identify patterns and/or common factors contributing to the shortage of a product.

Figure 15:
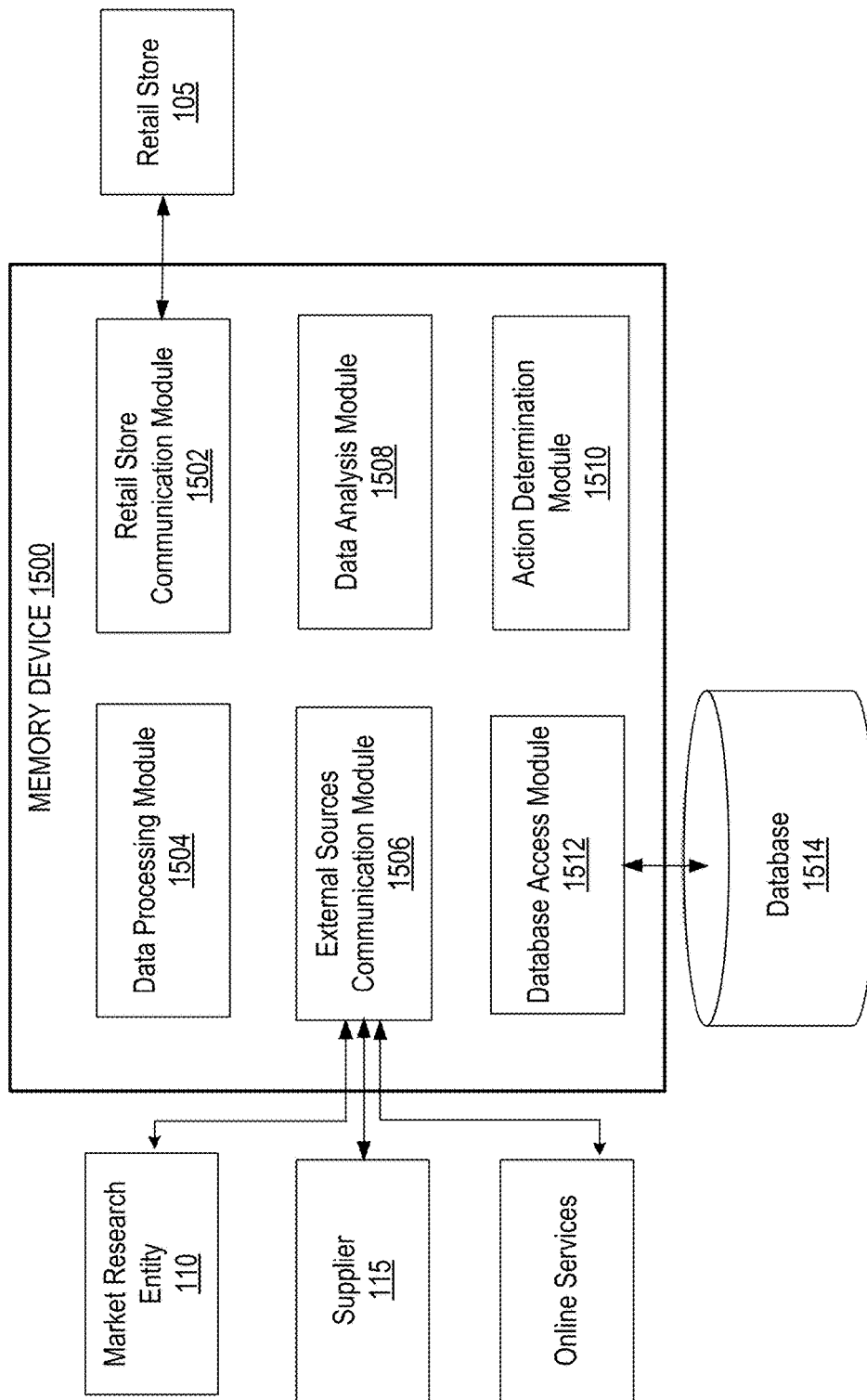
FIG. 15 is a block diagram illustrating an exemplary embodiment of a memory device containing software modules for executing methods consistent with the present disclosure.

FIG. 15 illustrates an exemplary embodiment of a memory device 1500 containing software modules consistent with the present disclosure. In particular, as shown, memory device 1500 may include a retail store communication module 1502, a data processing module 1504, an external sources communication module 1506, a data analysis module 1508, an action determination module 1510, a database access module 1512, and a database 1514. Modules 1502, 1504, 1506, 1508, 1510, and 1512 may contain software instructions for execution by at least one processor (e.g., processing device 202) associated with system 100. Retail store communication module 1502, data processing module 1504, external sources communication module 1506, data analysis module 1508, action determination module 1510, database access module 1512, and database 1514 may cooperate to perform multiple operations. For example, retail store communication module 1502 may receive image data from a plurality of image capturing devices 125 in retail store 105, data processing module 1504 may use the received image data to determine information about a displayed inventory of a plurality of products, external sources communication module 1506 may obtain scheduling data about additional products scheduled to arrive to the retail store (e.g., from supplier 115), data analysis module 1508 may use data from a number of sources (e.g., from database 1514, image processing module 1504, one or more image capture devices 125, one or more other sensors, etc.) to identify one or more patterns and/or factors associated with product shortages at one or more retail stores, and action determination module 1510 may determine at least one suggested action for addressing a shortage of products in retail store 105 based on the identified patterns and factors, for example, changing product prices, restocking shelves, changing the number of employees staffed during a shift, etc.

In some embodiments, memory device 1500 may be part of system 100, for example, memory device 226. Alternatively, memory device 1500 may be stored in an external database or an external storage communicatively coupled with server 135, such as one or more databases or memories accessible over communication network 150. Further, in other embodiments, the components of memory device 1500 may be distributed in more than one server and more than one memory device.

In some embodiments, retail store communication module 1502 may receive information from sensors located in retail store 105. In one example, retail store communication module 1802 may receive images captured by a plurality of image sensors fixedly mounted in retail store 105 or receive data derived from images captured by plurality of image sensors fixedly mounted in retail store 105. In another example, retail store communication module 1502 may receive image data (e.g., images or data derived from images) from robotic capturing devices configured to navigate autonomously within retail store 105 and to capture images of multiple types of products. In yet another example, retail store communication module 1502 may receive data from one or more shelf sensors configured to measure properties of products placed on a store shelf. The one or more shelf sensors may include pressure sensitive pads, light detectors, weight sensors, light sensors, odor sensors, resistive sensors, ultrasonic sensors, and more.

Retail store communication module 1502 may also receive information associated with the management and staffing of retail store 105. For example, retail store communication module 1502 may receive employee timecards, shift information, scheduled tasks (e.g., restocking events), assigned tasks, etc. Data analysis module 1508 may use this data, coupled with information from data processing module 1504, to identify one or more patterns associated with product shortages. For example, a higher number of shortages may occur at a time in which fewer restocking events are scheduled.

In some embodiments, data processing module 1504 may process the information collected by retail store communication module 1502 to determine and monitor one or more product shortages (e.g., as described with reference to FIGS. 12, 13A-13C, and 14A-14C). A portion of the products found in retail store 105 may be located in a display area accessible to customers, while another portion of the products found in retail store 105 may be located in storage area not accessible to customers. The term "storage area" broadly includes all storage areas of products not displayed for sale in the retail store, for example, high shelves, below display areas of shelving unit, in a dedicated storage area, and more. In one embodiment, image processing module 1504 may identify one or more shortages for multiple types of products based on image data received from a plurality of image sensors fixedly mounted in retail store 105 (e.g., as illustrated in FIG. 4A). In another embodiment, data processing module 1504 may identify a shortage of products using a combination of image data and data from one or more shelf sensors configured to measure properties of products placed on a store shelf (e.g., as illustrated in FIG. 8A). For example, the image processing module 1504 may analyze the data received from detection elements attached to store shelves, alone or in combination with images captured in retail store 105, to identify and monitor shortages of products. In another embodiment, data processing module 1504 may identify a product shortage or product shortage information using a combination of image data and information about products available in at least one storage area of retail store 105. For example, the data processing module 1504 may use inventory records and image data to determine information about the current inventory of multiple types of products. The current inventory may include the inventory displayed for sale and the inventory stored in retail store 105.

In addition, data processing module 1504 may also analyze textual information derived from image data, analyze visual appearance of the products, calculate a duration of products on a shelf, determining turnover of products from the product type on the shelf, determine a shortage duration, and determining storage requirements associated with the products.

In some embodiments, data processing module 1504 may preprocess received image data by transforming the image data using a transformation function to obtain a transformed image data. Preprocessed image data may include the transformed image data. For example, the transformation function may comprise convolutions, visual filters (such as low-pass filters, high-pass filters, band-pass filters, all-pass filters, etc.), nonlinear functions, and so forth. In some examples, the image data may be preprocessed by smoothing the image data, for example, by using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy compression representation of at least part of the image data; a lossless compression representation of at least part of the image data; a time order series of any of the above; any combination of the above; and so forth. In some examples, the image data may be preprocessed to extract edges, and the preprocessed image data may include information based on and/or related to the extracted edges. In some examples, the image data may be preprocessed to extract visual features from the image data. Some examples of such visual features include edges, corners, blobs, ridges, Scale Invariant Feature Transform (SIFT) features, temporal features, and so forth. One of ordinary skill in the art will recognize that the image data may be preprocessed using other kinds of preprocessing methods.

In some embodiments, external sources communication module 1506 may obtain scheduling data about additional products scheduled to arrive to the retail store. In one embodiment, external sources communication module 1506 may receive the scheduling data from one or more of entities in the supply chain. In one example, the scheduling data may be received from online services (e.g., from a server that store data on shipments orders). In another example, the scheduling data may be received from supplier 115 associated with the products (e.g., from a farmer or manufacturer that produced the products). In another example, the scheduling data may be received from a market research entity 110 (e.g., statistics about demand for certain products). In another example, the scheduling data may be received from a shipment company that delivers the products (e.g., from an IOT sensor in a cargo ship). In another example, the scheduling data may be received from a distribution company that delivers the products (e.g., from an agent who supplies the products to retail stores). In one embodiment, external sources communication module 1506 may determine the scheduling data about the additional products using information collected from one or more of entities in the supply chain and other data sources, for example, Enterprise Resource Planning (ERP), Warehouse Management Software (WMS), and Supply Chain Management (SCM) applications. In addition, external sources communication module 1506 may generate the scheduling data using analytics of data associated with past delivery of products. For example, the external sources communication module 1506 may determine that a shipment is scheduled to be delivered to retail store 105 based on past deliveries.

In some embodiments, data analysis module 1508 may process the information collected by external sources communication module 1506 and generated by image processing module 1504 to determine one or more patterns associated with one or more product shortages in retail store 105. In some embodiments, data analysis module 1508 may receive information from data processing module 1504 associated with a number of retail stores. Data analysis module 1508 may aggregate data from two or more retail stores. The aggregated data may be sourced from retail stores based on, for example, store size, geographic location, number of employees, store price-point, etc. In other embodiments, data analysis module 1508 may analyze data from a single store to determine patterns and factors associated with product shortages.

Consistent with the present disclosure, data analysis module 1508 may use artificial neural networks, convolutional neural networks, machine learning models, image regression models, and other processing techniques to determine shortage patterns and/or factors. For example, data analysis module 1508 may use a regression model on the received employment or delivery data to predict future product shortages in retail store 105. In some embodiments, data processing module 1504 may analyze the image data to detect a plurality of occurrences of product shortages of multiple product types in at least one retail store. Based on the analysis, data analysis module 1508 may identify a pattern associated with the product shortages of the multiple product types and provide information associated with the identified pattern to the entity. For example, the identified pattern and/or identified common factors associated with one or more shortages may be displayed to a user via a communication device. The device may display information regarding the shortages, for example, that a particular department has a higher or lower rate of shortages than another department. This pattern information may aid a retail store manager in evaluating which action to use to prevent future shortages.

Figure 17A:
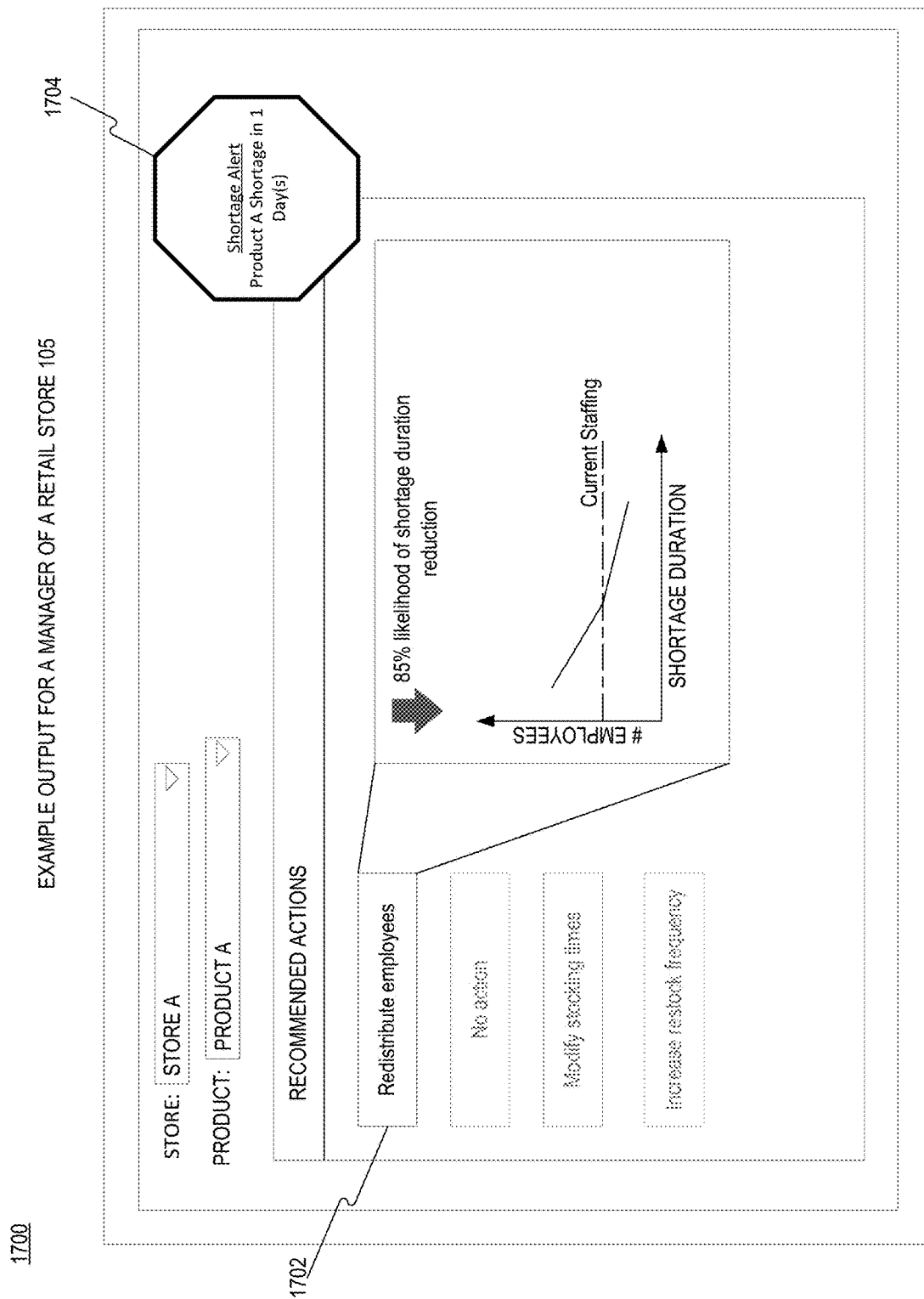
FIG. 17A is a schematic illustration of an example output for a retail store consistent with the present disclosure.

In some embodiments, action determination module 1510 may use the output of data processing module 1504 and data analysis module 1508 to determine at least one suggestion regarding an action for mitigating a shortage or a predicted shortage. A suggested action may be, for example, changing the location of products, the price of products, the restocking rates of products, a promotion assigned to one or more products, and more. Generally, the purpose of the action is to prevent shortages or to reduce the duration of shortages. Examples of suggestions generated by action determination module 1510 are illustrated in FIG. 17A and described in detail below.

As an example, data processing module 1508 may receive inventory data from the plurality of retail stores. The inventory data may be received, e.g., via retail store communication module 1502. The received inventory data may include details about a chain-of-supply of products of at least one product type associated with times in which product shortages of the at least one product type occur. Data processing module 1508 may identify the at least one common factor based on analysis of the image data and the inventory data. Exemplary common factors may include delivery times associated with each shortage, space in storage during each shortage, etc.

Action suggestion module 1510 may receive the common factor information and identify an action for reducing future shortages. For example, the action for potentially reducing product shortage durations of future shortages of the at least one product type may include changing an element in the chain-of-supply of products of the at least one product type. Changing an element may include increase the amount of product delivered each time, increasing the frequency of deliveries, generating a new purchase order or contract with the updated delivery information, etc.

In another example, data analysis module 1508 may receive employment data from a plurality of retail stores. The employment data may include details about store employees that worked during shifts in which a product shortage of at least one product type occurred. Data analysis module 1508 may identify at least one common factor based on analysis of the image data and the employment data. For example, a common factor may be the number of employees during shift, the rank or position of the employees during a shift, the training of an employee during the shift, etc. In some embodiments, a common factor may be the position, training, and/or rank of an employee assigned to one or more tasks. Based on the common factors identified by data analysis module 1508, action suggestion module 1510 may identify an action for potentially reducing product shortage durations of future shortages of the at least one product type. The identified action may include changing employment dynamics in future shifts associated with shifts in which a product shortage of at least one product type has occurred. For example, the action may be to hire more people between for a particular shift, decrease or increase shift lengths, redistribute employee workloads, etc.

In another example, data analysis module 1508 may receive restocking data from a plurality of retail stores, including, for example, details about restocking practices of retail stores in which a product shortage of at least one product type has occurred. Data analysis module 1508 may identify the at least one common factor based on analysis of the image data and the restocking data. For example, the product shortage may be associated with an hour-by-hour restocking schedule or may be associated with an on-demand restocking schedule. Action suggestion module 1510 may identify an action for potentially reducing product shortage durations of future shortages of the at least one product type. The identified action may include changing restocking practices of retail stores in which a product shortage of at least one product type has occurred. For example, the identified action may be to switch from a restock rate of one restock per day, to increase the rate to two restocking events per day.

The action determination module 1510 may use retail store communication module 1502, external sources communication module 1806, or both to provide the at least one suggested action to an entity associated with retail store 105, market research entity 110, and/or supplier 115. In one example, action determination module 1510 may determine that an increased restock rate for a particular shift may prevent a predicted shortage and provide the recommended restock rate and shift to a processing device associated with retail store 105. In a second example, action determination module 1510 may determine that a particular retail store typically experiences regular shortages of a product and may transmit a suggestion to a processing device associated with a specific supplier to deliver a larger quantity of the product in future deliveries.

In some embodiments, database access module 1512 may cooperate with database 1514 to retrieve stored scheduling data such as product supply information. The product supply information may include, for example, a schedule of arrivals of additional products, inventory records, checkout data, calendar data, and historical product turnover data. Data processing module 1504 and data analysis module 1508 may use the product supply information stored in database 1514 to determine one or more factors or patterns associated with detected shortages. Database 1514 may include separate databases, including, for example, a vector database, raster database, tile database, viewport database, and/or a user input database, configured to store data. The data stored in database 1514 may be received from modules 1502-1512, server 135, from any communication device associated with retail stores 105, market research entity 110, suppliers 115, and users 120. Moreover, the data stored in database 1514 may be provided as input using data entry, data transfer, or data uploading.

Modules 1502-1512 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 1502-1512 and data associated with database 1514 may be stored in database 140 and/or located on server 135, which may include one or more processing devices. Processing devices of server 135 may be configured to execute the instructions of modules 1502-1512. In some embodiments, aspects of modules 1502-1512 may include software, hardware, or firmware instructions (or a combination thereof) executable by one or more processors, alone, or in various combinations with each other. For example, modules 1502-1512 may be configured to interact with each other and/or other modules of server 135 to perform functions consistent with disclosed embodiments.

FIG. 16 depicts an exemplary method 1600 for reducing product shortage durations in retail stores based on analysis of image data. For purposes of illustration, in the following description, reference is made to certain components of system 100. It will be appreciated, however, that other implementations are possible and that other components may be used to implement the exemplary method. It will also be readily appreciated that the illustrated method can be altered to modify the order of steps, delete steps, or further include additional steps.

Method 1600 may be executed, for example, by a system having a communication interface configured to receive image data from a plurality of retail stores (e.g., retail store communication module 1502). In step 1602, image data may be received from a plurality of retail stores. The image data received by step 1602 (for example, from a particular retail store, from the plurality of retail stores, etc.) may be indicative of a product shortage of at least one product type relative to information describing a desired placement of products on at least one store shelf. The image data may include, for example, images or data derived from image processing (e.g., by data processing module 1504). The received image data may be indicative of a product shortage of at least one product type relative to information describing a desired placement of products of the at least one product type on at least one store shelf. The information describing desired placement of objects may include a planogram, a realogram, other kind of instructions, rules, obligations, etc.

In one embodiment, the images and/or image data may be acquired by any one of image capturing devices 125 illustrated in FIG. 4A-4C. For example, the images may be acquired by a plurality of image sensors fixedly mounted in retail store 105. Details of the image capturing devices mounted in retail store 105 and configured to acquire images are described with references to FIGS. 5A-5C. The images may be used to derive image data such as processed images (e.g., cropped images, video streams, images preprocessed as described above, and more) or information derived from the captured images (e.g., data about products identified in captured images, data that may be used to construct a 3D image, and more). In one embodiment, the processing device may periodically receive images that correspond with the current inventory of the products on the shelf in retail store 105. In some embodiments, the processing device may receive images and/or image data at predetermined time intervals (e.g., every minute, every 5 minutes, every 15 minutes, every 30 minutes, etc.). In another embodiment, the processing device may receive the images and/or image data in response to a detection of a certain identified event (e.g., a shortage).

At step 1604, a processing device (e.g., processing device 202) may analyze the image data to detect a plurality of occurrences of product shortages of at least one product type in the plurality of retail stores and determine product shortage durations associated with the plurality of occurrences. For example, product shortages may be identified based on analysis of the quantity of product on a shelf at subsequent times. In some embodiments, the at least one product type is considered to be in a state of shortage when a number of products of the at least one product type on the at least one store shelf is below a predefined time duration threshold. For example, a product is in shortage when there is a 30% decrease in product quantity for a predetermined amount of time. In other embodiments, the shortage may be based on a decrease in product weight or decrease in product density. The predefined time duration threshold may be determined based on the at least one product type. For example, a perishable product, e.g., a tomato, may have a different threshold than a non-perishable product, e.g., a lightbulb. In other embodiments, the predefined time duration threshold is determined per retail store. For example, a decrease in product quantity of 30% may indicate a shortage for one retail store, and a decrease in quantity of 40% may indicate a shortage in another store. The identification of a shortage is discussed in further detail with reference to FIGS. 14A-14C.

The threshold product quantities and threshold time duration may be based on one or more factors including: the type of product (e.g., brand, category, particular product, etc.); the location of shelf within the store; the type of shelf (e.g., an end display, a display at a register, or a shelf within the category area); the time of day, the number of employees, the size of the retail store, adjunct products, the number of facings of the product type, and so forth.

At step 1606, the processing device may identify at least one common factor contributing to product shortage duration of at least part of the plurality of occurrences of the product shortages of the at least one product type in the plurality of retail stores. Common factors associated with product shortages and shortage durations may include information related to: a schedule of arrivals of the additional products (e.g., dates, times, updates from a supplier, etc.), known orders of the additional products (e.g., quantity of scheduled products), delivery records (e.g., the reports on the delivery progress of the additional products), cost data (e.g., the different costs associated with the additional products), calendar data (e.g., holidays, sport games, etc.), historical product turnover data (e.g., the amount of product sold in a particular time period), average turnover (e.g., per hour in a day, per day in a week, per special events), employee data (e.g., staffing levels, shift durations, assigned tasks), and more. In some embodiments, conditional distribution of a product shortage duration may be computed with respect to different factors. Further, in some examples, the computed conditional distribution may be analyzed to identify the factors that contribute to longer (or shorter) product shortage durations, to product shortage durations that are above a selected threshold, and so forth. In some embodiments, correlations between product shortage durations and different factors may be computed. Further, in some examples, the computed correlations between the product shortage durations and the different factors may be analyzed to identify the factors that contribute to longer (or shorter) product shortage durations.

Consistent with the present disclosure, the processing device may perform big data analytics on the information about the product shortages. Typically, the big data analytics are executed in an automatic or autonomous manner without using any user input during the learning analysis. In one embodiment, the processing device may perform large-scale data analysis on the received information image data and scheduling data to discover, detect, or learn new data. For example, the large-scale data analysis involves the process of examining large quantities of data (e.g., data mining, data discovery, etc.) to extract new or previously unknown interesting data or patterns such as unusual demand events that correlate to product shortages. The processing device may also perform large-scale data analysis on the stored data (e.g., machine learning analysis, data modeling, pattern recognition, predictive analysis, correlation analysis, etc.) to predict, calculate, or identify implicit relationships or inferences within the stored data. For example, the processing device may identify at least one pattern correlating a combination of different factors to product shortages.

At step 1608, the processing device may determine an action, associated with the at least one common factor, for potentially reducing product shortage durations of future shortages of the at least one product type in the plurality of retail stores. For example, based on the identified common factors and/or patterns associated with product shortages, a suggested action may be a staffing change, restocking rate change, product placement change, etc. such that the action prevents future shortages. For example, if, at step 1606, a common factor associated with a shortage is the location of a product within the retail store (e.g., near a cash register), at step 1608, the determined action may be to increase the restocking rate for that product and/or location. In some embodiments, an action may be determined by accessing a data structure that holds a list of suggested actions for different factors that contribute to the product shortage duration. For example, when the common factor is a low number of store associates, the suggested action may include increasing the number of store associates. In another example, when the common factor is an area in the retail stores, the suggested action may include increasing the rate of product restocking for that area of the retail stores. In yet another example, when the common factor is shelf area smaller than a selected threshold, the suggested action may include increase the shelf area for a selected product type at selected retail stores. In some embodiments, an optimization model may be constructed based on estimated cost of actions and estimated impact of actions on future product shortage durations, and the constructed optimization model may be used to find a set of actions that reduce the estimated future product shortage durations while keeping the cost within a selected budget, for example using a constraint optimization algorithm. In some embodiments, an action may be determined using suggestion determination module 1810, for example, as described below.

At step 1610, the processing device may provide information associated with the identified action to an entity. The entity may be associated with a retail store, for example, an employee (human or robot) of retail store 105, a user of system 100 that monitors retail store 105 (e.g., market research entity 110), a processing device that control operations associated with retail store 105 (e.g., ERP system, WMS system, and SCM system), and any other device or individual capable of implementing the suggested action in retail store 105. In some embodiments, the entity may be an employee (human or robot) of supplier 110.

Figure 17B:
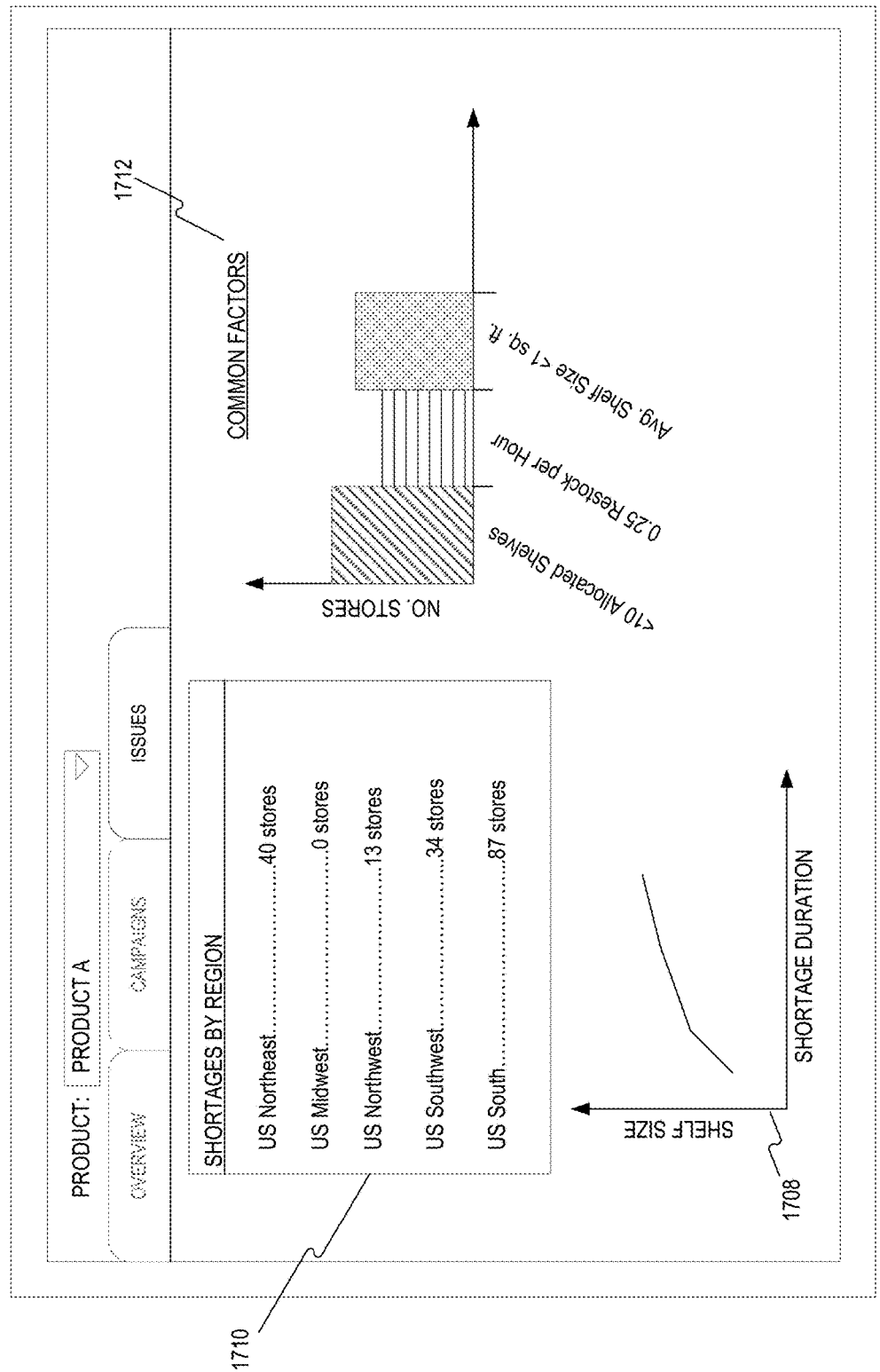
FIG. 17B is a schematic illustration of an example output for a market research entity associated with a retail store consistent with the present disclosure.
Figure 17C:
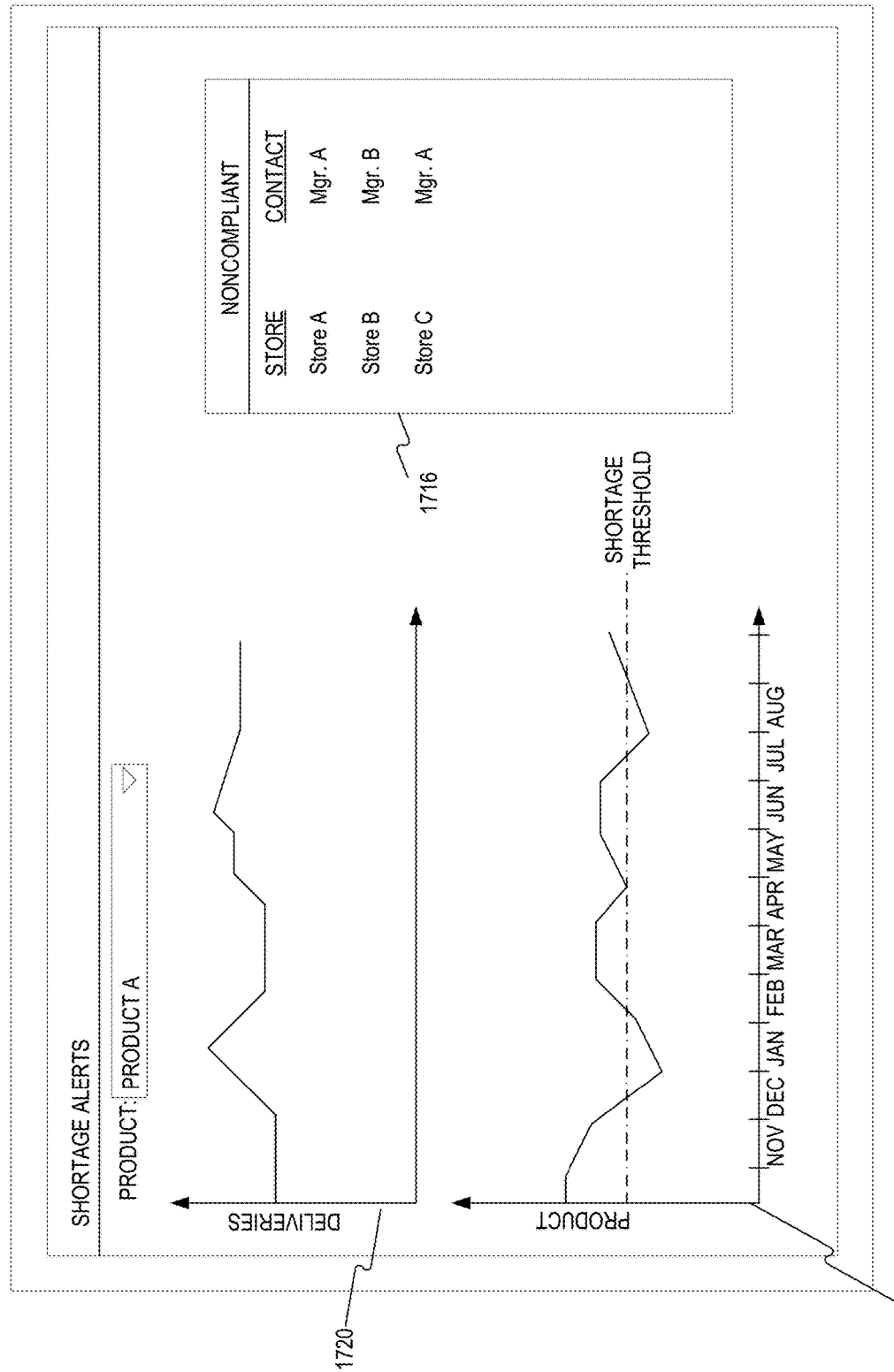
FIG. 17C is a schematic illustration of an example output for a supplier associated with a retail store consistent with the present disclosure.

FIGS. 17A-17C illustrate example outputs based on data automatically derived from machine processing and analysis of images captured in retail store 105 according to disclosed embodiments. FIG. 17A illustrates an optional output for an employee or manager of retail store 105. FIG. 17B illustrates an optional output for a market research entity 110. FIG. 17C illustrates an optional output for supplier 115.

FIG. 17A illustrates an example GUI for a communication device, e.g., output devices 145C, which may be used by managers and/or employees of retail store 105. In some embodiments, a manager may be associated with a plurality of retail stores for which product shortage information is aggregated and analyzed. The communication device may receive, from the processing device, the identified action determined at step 1608 of method 1600. In some embodiments, the communication interface is configured to provide the information associated with the identified action to a communication device associated with a managing entity of the plurality of retail stores. The provided information may include a likelihood that the determined action will reduce product shortage durations of future shortages. The likelihood may be determined, for example, based on big data analysis of the image data received from the plurality of retail stores.

In some embodiments, the information provided to the communication device may include a prediction that a product shortage of a certain product type is about to occur. For example, the prediction may be determined based on an application of one or more big data analysis techniques to image data, employee data, supply chain data received from supplier 110 and/or stored in database 1514, marketing data received from market research entity 110, and the like. For example, data processing module 1508 may use various data analysis techniques, described above, to determine that, based on historic data, before a certain holiday some products tend to be sold out. In response to the prediction, the communication device may display an alert 1704 to the retail store manager. The alert may be a pop-up window or may be sent via one or more notification systems, e.g., to a handheld user device.

For example, as shown in FIG. 17A, action suggestion module 1510 may determine a number of actions to prevent a shortage or reduce the duration of an ongoing shortage. These suggested actions may be displayed to the user of the communication device (e.g., action 1702). In some embodiments, the processing device may predict an outcome if no action is taken by management of the retail store. Action suggestion module 1510 may also determine, e.g., by one or more statistical analysis methods, a likelihood associated with the identified action. For example, the determined likelihood may indicate a percent chance that the identified action will reduce the frequency and/or duration of future shortages. For example, the processing device may determine, and GUI 1700 may indicate, that there is 85% change that increasing the number of employees for a particular shift will reduce the duration future shortages. In another example, the processing device may determine that there is 50% chance that changing the stocking times will reduce future shortages. Thus, a retail manager may use the likelihood to determine the benefit of taking a particular action.

In another embodiment, data analysis module 1508 may predict a level of effectiveness for the determined action in reducing product shortage durations of future shortages of the at least one product type. The provided information, e.g., the information displayed by the communication device, may include an identification of the determined action and its level of effectiveness. For example, a GUI may display an indication that adding one employee to a night shift may decrease the amount of product shortage will by 25%.

FIG. 17B illustrates an example graphical user interface (GUI) 1706 for a communications device (e.g., output device 145A), representative of a GUI that may be used by market research entity 110. Consistent with the present disclosure, market research entity 110 may assist supplier 115 and other stakeholders in identifying trends, optimizing product sales, and/or implementing marketing strategies across a large number of retail stores 105.

GUI 1706 may provide market research entity 110 with information about product shortages, common factors of product shortages, and/or shortage trends associated with a plurality of retail stores. As discussed with reference to step 1610, the action identified by action suggestion module 1510 may be provided to a market research entity. For example, the communication interface (e.g., external communication module 1506) is configured to provide information associated with the identified action to a communication device associated with a marketing entity. The information may include a prediction how a change in a shelf size allocated to the at least one product type will reduce product shortage durations of future shortages. For example, the prediction may be provided as a chart, table, infographic, and/or graph 1708. For example, for a product in high demand, a marketing manager may determine a different shelf size is needed to minimize shortages and push the high-demand product.

In another example, data analysis module 1508 may receive geographic data from the plurality of retail stores, including locations of retail stores in which a product shortage of at least one product type has occurred. Data analysis module 1508 may identify at least one common factor based on analysis of the image data and the geographic data. GUI 1706 may display geographic data, for example, as a table 1710, showing a number of shortages per geographic region. In other embodiments, geographic data may be displayed in a chart or as an infographic. The market research entity 110 may use the geographic information to make decisions about current or future marketing efforts.

In some embodiments, GUI 1706 may also display a breakdown of common factors (bar graph 1712). Exemplary common factors associated with one or more shortages at the plurality of stores may be that less than ten shelves were allocated to the product, the restock rate was one restock every four hours, and the average shelf size on which the product was displayed was less than one square foot. These common factors may be used, for example, by market research entity 110 and/or supplier 115 in determining contract requirements for retail stores to reduce shortages.

FIG. 17C illustrates an example graphical user interface (GUI) 1714 for a communications device (e.g., output device 145B), representative of a GUI that may be used by supplier 115.

GUI 1714 may provide supplier 115 with information about product shortages, common factors of product shortages, and/or shortage trends associated with a plurality of retail stores. GUI 1714 may provide supplier 115 with an identified action to reduce shortages as determined using method 1600. In some embodiments, the communication interface is configured to provide the information associated with the identified action to a communication device associated with a supplier of at least one product type, including an indication that the product shortage is in noncompliance with contractual agreements of a retail store. For example, table 1716 provides an exemplary list of non-compliant stores and lists a contact name of an employee who handles contractual agreements with supplier 115. Other information may be displayed including the non-compliant terms, an action to bring the store back into compliance, an option to provide the retail store with a notification of non-compliance, etc.

In another embodiment, data analysis module 1508 may receive inventory data from the plurality of retail stores, including details about a chain-of-supply of products of at least one product type associated with times in which product shortages of at least one product type occur. For example, chain-of-supply information may include delivery times, space in storage, etc. Data analysis module 1508 may identify at least one common factor based on analysis of the image data and the inventory data.

In another example, data analysis module 1508 may access historical data associated with the plurality of retail stores. The historical data may be indicative of time periods during which a product shortage of at least one product type has occurred. Data analysis module 1508 may identify at least one common factor based on analysis of the image data and the historical data. A common factor may be, for example, a national holiday. The action identified by action suggestion module 1510 for potentially reducing product shortage durations of future shortages of the at least one product type may include changing an element in the chain-of-supply of products of the at least one product type.

As an example, GUI 1714 may display the output of data analysis module 1508 and action suggestion module 1510 in graphs 1718 and 1720, respectively. Data analysis module 1508 may identify certain date ranges as being a common factor in shortages of a particular product. Based on this information, predicted shortages may be displayed in graph 1718. GUI 1714 may also display a recommended amount of deliveries based on the predicted shortages. For example, graph 1720 may provide a recommended delivery schedule. In some embodiments, as shown in FIG. 17A, GUI 1714 may also provide a likelihood of the recommended delivery schedule to prevent product shortages.

Managing Inventory of Perishable Products

In the retail world, managing perishable products such as vegetables, fruits, dairy products, meat products, and so forth, has specific challenges in addition to the typical challenges of managing retail products. Some of these challenges result from the relatively short shelf life and varied quality of the perishable products. Retail stores recognize that they need to treat perishable products differently than other type of retail products. Sophisticated retail stores may maximize profits from perishable products by considering the state of perishable products currently on display, the state of perishable products in storage areas, and/or the state of perishable products scheduled to arrive. In the context of the present disclosure, the state of perishable products may include the quality of the products, the quantity of the products, or both. In an example embodiment for managing inventory of perishable products in retail stores, a retail store may learn about an upcoming shipment of products from a specific type of perishable product and reduces a price of the specific type of perishable product to avoid an unwanted inventory of products with a short shelf life. This embodiment is described in greater detail below with reference to FIGS. 18-21. In another embodiment for managing inventory of perishable products in retail stores, a retail store may initiate restocking shelves of perishable products in some cases and forgo restocking shelves of perishable products at other cases. This embodiment is described in greater detail below with reference to FIGS. 22-23. In yet another embodiment for managing inventory of perishable products in retail stores, a retail store may initiate a clearance sale of perishable products from a first type based on their state and the state of other perishable products from a second type. This embodiment is described in greater detail below with reference to FIGS. 24-25. The disclosed systems and methods may enable retail stores to maximize their profits from perishable products by using image data from image capturing devices 125 (e.g., a plurality of cameras fixedly mounted to shelves and other objects in the perishable products section) and scheduling data about additional products scheduled to be delivered to the retail stores.

Figure 18:
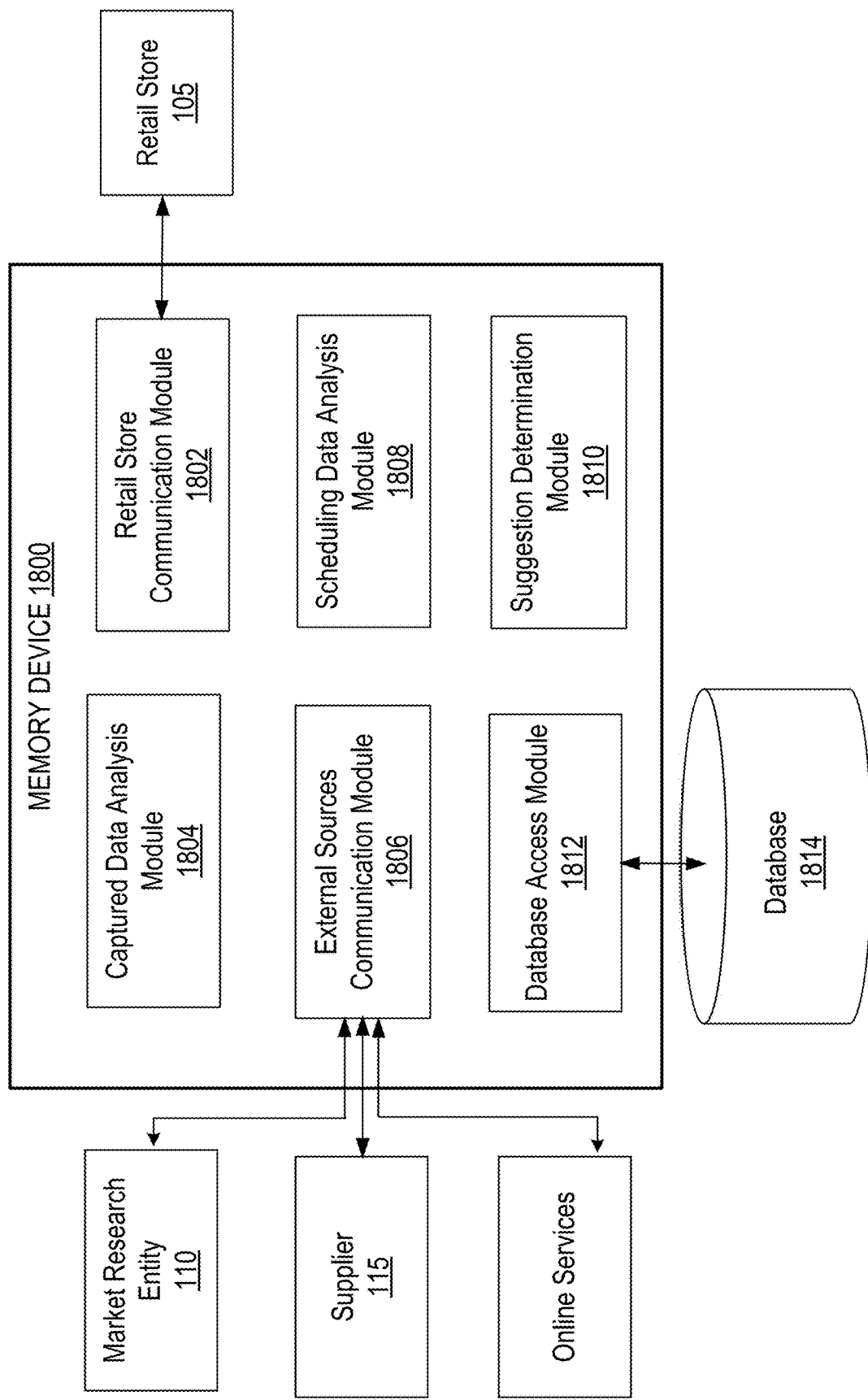
FIG. 18 is a block diagram illustrating an exemplary embodiment of a memory device containing software modules for executing methods consistent with the present disclosure.

FIG. 18 illustrates an exemplary embodiment of a memory device 1800 containing software modules consistent with the present disclosure. In particular, as shown, memory device 1800 may include a retail store communication module 1802, a captured data analysis module 1804, an external sources communication module 1806, a scheduling data analysis module 1808, a suggestion determination module 1810, a database access module 1812, and a database 1814. Modules 1802, 1804, 1806, 1808, 1810, and 1812 may contain software instructions that are executable by at least one processor (e.g., processing device 202) associated with system 100. Retail store communication module 1802, captured data analysis module 1804, external sources communication module 1806, scheduling data analysis module 1808, suggestion determination module 1810, database access module 1812, and database 1814 may cooperate to perform multiple operations. For example, retail store communication module 1802 may receive image data from a plurality of image capturing devices 125 in retail store 105, captured data analysis module 1804 may use the received image data to determine information about a displayed inventory of a plurality of perishable products, external sources communication module 1806 may obtain scheduling data about additional perishable products scheduled to arrive to the retail store (e.g., from supplier 115), scheduling data analysis module 1808 may use the received scheduling data to determine information about a predicted inventory of the plurality of perishable product, and suggestion determination module 1810 may determine at least one suggestion regarding the plurality of perishable products in retail store 105, for example, a suggestion to change prices.

In some embodiments, memory device 1800 may be part of system 100, for example, memory device 226. Alternatively, memory device 1800 may be stored in an external database or an external storage communicatively coupled with server 135, such as one or more databases or memories accessible over communication network 150. Further, in other embodiments, the components of memory device 1800 may be distributed in more than one server and more than one memory device.

In some embodiments, retail store communication module 1802 may receive information from sensors located in retail store 105. In one example, retail store communication module 1802 may receive images captured by a plurality of image sensors fixedly mounted in retail store 105 or receive data derived from images captured by plurality of image sensors fixedly mounted in retail store 105. In another example, retail store communication module 1802 may receive image data (e.g., images or data derived from images) from robotic capturing devices configured to navigate autonomously within retail store 105 and to capture images of multiple types of perishable products. In yet another example, retail store communication module 1802 may receive data from one or more shelf sensors configured to measure properties of perishable products placed on a store shelf. The one or more shelf sensors may include pressure sensitive pads, light detectors, weight sensors, light sensors, odor sensors, resistive sensors, ultrasonic sensors, and more.

Figure 19:
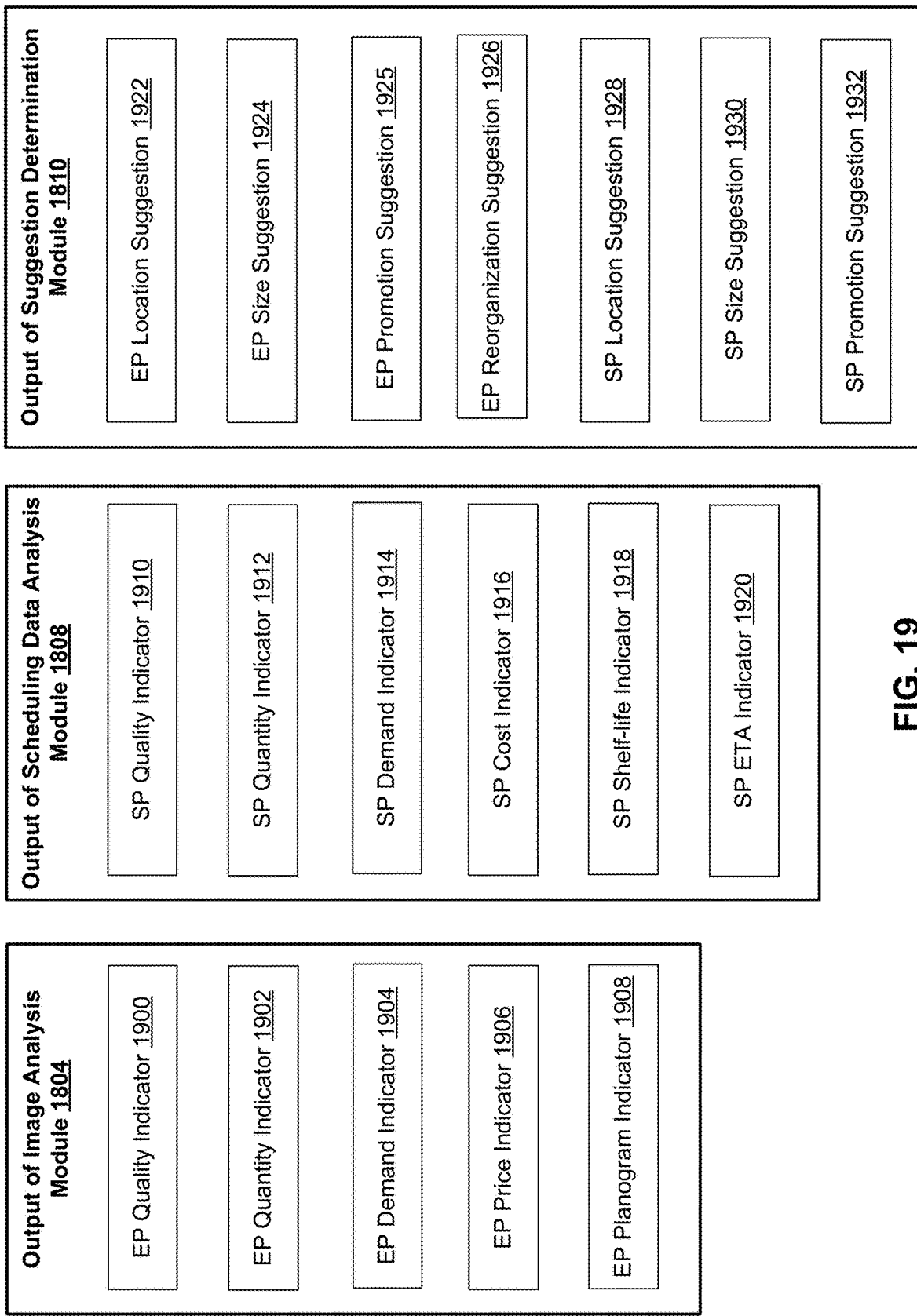
FIG. 19 is a diagram illustrating example outputs of the software modules depicted in FIG. 18 consistent with the present disclosure.

In some embodiments, captured data analysis module 1804 may process the information collected by retail store communication module 1802 to determine one or more existing-products (EP) indicators for the perishable products located in retail store 105. The term "existing-products indicators" or "EP indicators" may refer to data indicative of one or more attributes associated with perishable products found in retail store 105. A portion of the perishable products found in retail store 105 may be located in a display area accessible to customers, while another portion of the perishable products found in retail store 105 may be located in a storage area not accessible to customers. Examples of EP indicators generated by captured data analysis module 1804 are illustrated in FIG. 19 and described in detail below. The term "storage area" broadly includes storage areas of products not displayed or otherwise for sale in the retail store and may include, for example, high shelves (e.g., storage for pallets without displayed pricing information), below display areas of a shelving unit, in a dedicated storage area, and more. In one embodiment, captured data analysis module 1804 may determine EP indicators for multiple types of perishable products based on image data received from a plurality of image sensors fixedly mounted in retail store 105 (e.g., as illustrated in FIG. 4A). In another embodiment, captured data analysis module 1804 may determine EP indicators for multiple types of perishable products using a combination of image data and data from one or more shelf sensors configured to measure properties of perishable products placed on a store shelf (e.g., as illustrated in FIG. 8A). For example, the captured data analysis module 1804 may analyze the data received from detection elements attached to store shelves, alone or in combination with images captured in retail store 105, to determine the EP indicators for multiple types of perishable products. In another embodiment, captured data analysis module 1804 may determine EP indicators for multiple types of perishable products using a combination of image data and information about perishable products available in at least one storage area of retail store 105. For example, the captured data analysis module 1804 may use inventory records and image data to determine information about the current inventory of multiple types of perishable products. The current inventory of the multiple types may include the inventory displayed for sale and the inventory stored in retail store 105.

In addition, captured data analysis module 1804 may determine the quality of perishable products by analyzing image data and other types of captured data. For example, captured data analysis module 1804 may apply one or more image analysis techniques to assess product ripeness, a current state of one more products, etc. For example, a machine learning model may be trained using training examples to determine a quality of perishable products from images and/or videos and/or other types of captured data, and the trained machine learning model may be used to analyze the image data and/or the other captured data to determine the quality of perishable products. An example of such training example may include an image and/or data of other types together with an indication of the quality of the perishable products associated with the image and/or the data. In another example, an artificial neural network (such as a deep neural network, a convolutional neural network, etc.) may be configured to determine quality of perishable products from images and/or videos and/or other types of captured data, and the artificial neural network may be used to analyze the image data and/or the other captured data to determine the quality of perishable products. Captured data analysis module 1804 may also analyze textual information derived from image data, analyze a visual appearance of the perishable products, calculate a duration that a perishable product has been on a shelf, determine turnover of products from the product type on the shelf, and determine storage requirements associated with the perishable products. In some cases, determining the EP indicators for multiple types of perishable products may include aggregating data from two or more locations in retail store 105. For example, in one embodiment, captured data analysis module 1804 may monitor the quality of a type of perishable product displayed on a first shelving unit, on a second shelving unit, and/or in a storing area. For example, the first shelving unit may be located in a specific aisle, the second shelving unit may be located in a display next to the cashier, and the storing area may be in a cold room.

In some embodiments, external sources communication module 1806 may obtain scheduling data about additional perishable products scheduled to arrive at the retail store. In one embodiment, external sources communication module 1806 may receive the scheduling data from one or more of entities in the supply chain. In one example, the scheduling data may be received from online services (e.g., from a server that store data on shipments orders). In another example, the scheduling data may be received from supplier 115 associated with the perishable products (e.g., from a farmer that produced the perishable products). In another example, the scheduling data may be received from a market research entity 110 (e.g., statistics about demand for certain perishable products). In another example, the scheduling data may be received from a shipment company that delivers the perishable products (e.g., from an Internet-of-Things (IoT) sensor in a cargo ship). In another example, the scheduling data may be received from a distribution company that delivers the perishable products (e.g., from an agent who supplies the perishable products to retail stores). In one embodiment, external sources communication module 1806 may determine the scheduling data about the additional perishable products using information collected from one or more of entities in the supply chain and other data sources, for example, Enterprise Resource Planning (ERP), Warehouse Management Software (WMS), and Supply Chain Management (SCM) applications. In addition, external sources communication module 1806 may generate the scheduling data using analytics of data associated with past delivery of perishable products. For example, the external sources communication module 1806 may determine that a shipment of avocados is scheduled to be delivered to retail store 105 based on past deliveries.

In some embodiments, scheduling data analysis module 1808 may process the information collected by external sources communication module 1806 to determine one or more scheduled-products (SP) indicators for perishable products not currently located in retail store 105. The term "scheduled products indicators" or "SP indicators" refers to data indicative of one or more attributes associated with perishable products scheduled to be delivered to retail store 105. Examples of SP indicators generated by scheduling data analysis module 1808 are illustrated in FIG. 19 and described in detail below. In one embodiment, scheduling data analysis module 1808 may determine SP indicators for multiple types of perishable products based on the scheduling data received from a plurality of entities in the supply chain. Consistent with the present disclosure, scheduling data analysis module 1808 may use artificial neural networks, convolutional neural networks, machine learning models, image regression models, and other processing techniques to determine the SP indicators. For example, scheduling data analysis module 1808 may use a regression model on the received scheduling data to predict the state of the perishable products when they are scheduled to be delivered to retail store 105.

In some embodiments, suggestion determination module 1810 may use the output of captured data analysis module 1804 and scheduling data analysis module 1808 to determine at least one suggestion regarding placement of perishable products in the retail store. The term "suggestion regarding the placement of perishable products" may include a recommendation associated with the manner in which the perishable products are to be located in the retail store. It includes the location of the perishable products, the price of the perishable products, the restocking rate of the perishable products, the promotion assigned to the perishable products, and more. Generally, the purpose of the suggestion is to maximize profit from the perishable products. Examples of suggestions generated by suggestion determination module 1810 are illustrated in FIG. 19 and described in detail below. In some embodiments, the suggestion determination module 1810 may determine at least one EP suggestion (i.e., a suggestion about the placement of existing products) and at least one SP suggestion (i.e., a suggestion about the placement of scheduled products). The suggestion determination module 1810 may use retail store communication module 1802, external sources communication module 1806, or both to provide the at least one determined suggestion to an entity associated with retail store 105. In one example, suggestion determination module 1810 may determine that a change in the price of an existing product type is preferred and provide a recommended price to a processing device associated with retail store 105. In a second example, suggestion determination module 1810 may determine that a revision of an order from a specific supplier is recommended and provide the revised order to a processing device associated with the specific supplier.

In some embodiments, database access module 1812 may cooperate with database 1814 to retrieve stored scheduling data such as product supply information. The product supply information may include, for example, a schedule of arrivals of additional products, inventory records, checkout data, calendar data, and/or historical product turnover data. Captured data analysis module 1804 and scheduling data analysis module 1808 may use the product supply information stored in database 1814 to determine one or more indicators. Database 1814 may include separate databases, including, for example, a vector database, raster database, tile database, viewport database, and/or a user input database, configured to store data. The data stored in database 1814 may be received from modules 1802-1812, server 135, from any communication device associated with retail stores 105, market research entity 110, suppliers 115, and users 120. Moreover, the data stored in database 1814 may be provided as input using data entry, data transfer, or data uploading.

Modules 1802-1812 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 1802-1812 and data associated with database 1814 may be stored in database 140 and/or located on server 135, which may include one or more processing devices. Processing devices of server 135 may be configured to execute the instructions of modules 1802-1812. In some embodiments, aspects of modules 1802-1812 may include software, hardware, or firmware instructions (or a combination thereof) executable by one or more processors, alone, or in various combinations with each other. For example, modules 1802-1812 may be configured to interact with each other and/or other modules of server 135 to perform functions consistent with disclosed embodiments.

Reference is now made to FIG. 19, which illustrates example outputs of at least one processing device of system 100 (e.g., processing device 202) associated with captured data analysis module 1804, scheduling data analysis module 1808, and suggestion determination module 1810. As shown in the figure, captured data analysis module 1804 may output one or more EP indicators (i.e., data indicative of attributes associated with perishable products currently existing in retail store 105); scheduling data analysis module 1808 may output one or more SP indicators (i.e., data indicative of attributes associated with perishable products scheduled to be delivered to retail store 105); and suggestion determination module 1810 may output at least one or more suggestions. Consistent with the present disclosure, suggestion determination module 1810 may use at least one EP indicator and at least one SP indicator to generate at least one suggestion.

The at least one processing device of system 100 may use captured data analysis module 1804 to output an EP quality indicator 1900, an EP quantity indicator 1902, an EP demand indicator 1904, an EP price indicator 1906, and an EP planogram indicator 1908. The EP indicators may be determined based on images of the at least one shelving unit (e.g., from image capturing devices 125 of FIGS. 4A-4C explained above), from data from shelf sensors such as the detection elements illustrated in FIGS. 8A and 8B, or from data aggregated from multiple sources. Additionally, the EP indicators may reflect attributes of perishable products currently in a display area of retail store 105, in a storage area of retail store 105, or both. In some retail stores 105, perishable products may be organized in one or more piles on a shelf. Unlike many other products, perishable products of the same type may differ from one another, for example, in weight, volume, shape, quality, condition, colors, and so forth. As a result, determining exact EP indicators from images of perishable products may be difficult. For example, a first pile of perishable products of a certain type may include perishable products with a first specific size, while a second pile of perishable products of the certain type may include perishable products of the certain type with a second specific size. Therefore, the at least one processing device of system 100 may additionally determine and assign a certainty level for each of the determined EP indicators.

In some embodiments, the at least one processing device may use captured data analysis module 1804 to determine one or more EP quality indicators 1900 for multiple types of perishable products. Specifically, the at least one processing device may determine EP quality indicators 1900 for the multiple types of perishable products based on analysis of data captured in retail store 105. Thereafter, the at least one processing device may use a determined EP quality indicator 1900 and at least one SP indicator to determine at least one suggestion regarding placement of perishable products in the retail store. For example, when EP quality indicator 1900 indicates that the current inventory of peaches is of low quality and the at least one processing device knows that another shipment of peaches is scheduled within a predetermined time period (e.g., within the next 8 hours), the at least one processing device may recommend clearing the peaches from the display area.

Consistent with the present disclosure, the at least one processing device may use Artificial Intelligence (AI) and Machine Learning (ML) algorithms to identify a condition of at least part of the perishable products and to determine EP quality indicator 1900 from the identified condition. For example, the at least one processing device may determine that a condition of some perishable products is rotten. For example, a machine learning model may be trained using training examples to identify a condition of perishable products from images and/or videos, and the trained machine learning model may be used to analyze an image of the perishable products to identify the condition of the perishable products. An example of such a training example may include an image of perishable products together with an indication of the condition of the perishable products depicted in the image. In another example, an artificial neural network (such as a deep neural network, a convolutional neural network, etc.) may be configured to identify a condition of perishable products from images and/or videos, and the artificial neural network may be used to analyze an image of the perishable products to identify the condition of the perishable products. In one embodiment, EP quality indicator 1900 may be associated with a duration that the perishable products stayed on the shelf. In some cases, a time threshold may be selected, for example, based on a type of the perishable product, the condition of the perishable product, etc. In these cases, EP quality indicator 1900 may be determined based on the period of time that perishable products stayed on the shelf (e.g., for a specific product type between 0 and 8 hours—high quality, between 8 hours and 24 hours—medium quality, between 24 hours and 36 hours—low quality). In some cases, statistics about the duration the perishable products stayed on the shelf may be generated and provided to an employee of retail store 105 or to an online customer. In another embodiment, EP quality indicator 1900 may be associated with the turnover of perishable products from different parts of the shelf. For example, the turnover may be calculated for different regions of the shelf (such as the front region facing the customers, middle region, back region, left region, right region, grid of regions, etc.), for different heights in the pile, and so forth. For example, turnover of the perishable products may be calculated by identifying the regions the customers pick perishable products from, aggregating the number of products picked from each region. In another example, changes in the structure of the pile may be identified used to calculate the turnover for the different regions. In another embodiment, EP quality indicator 1900 may be associated with a quantity associated with customers returning perishable products to the pile (i.e., returning a perishable product after picking it from the pile). For example, the ratio of products returned to the pile of the products picked relative to products not returned to the pile may be calculated, for example, as a function of a type of product, location of shelf, time in day, condition of the perishable products, and so forth. The number of products returned to the pile may be calculated for selected time duration and may be indicative to the quality of the perishable products. Consistent with the present disclosure, a notification may be provided when the number and/or the ratio of products returned to the pile exceed a selected threshold. For example, the notification may include a suggestion to remove some of the perishable products that are of poor condition from the pile. In another embodiment, EP quality indicator 1900 may be associated with a quality estimation determined using on hyperspectral imaging technology. Specifically, image capturing device 125 (e.g., a robot that roams in certain sections of the retail store) may be equipped with one or more dedicated image sensors that can measure light reflectance or transmittance at individual wavelengths or narrow wavebands for determining the chemical constituents of the perishable products. The chemical constituents of the perishable products may be used to determine at least one trait (e.g., ripeness) associated with EP quality indicator 1900 of the perishable products. In one example, image capturing devices 125 may capture visible and near-infrared spectroscopy, which covers the spectral region between 400 nm and 2500 nm, for chemical analysis and quality assessment of different types of perishable products in retail store 105.

In some embodiments, the at least one processing device may use captured data analysis module 1804 to determine one or more EP quantity indicators 1902 for multiple types of perishable products. For example, the at least one processing device may determine EP quantity indicators 1902 for the multiple types of perishable products based on analysis of data captured in retail store 105, based on analysis of data captured from other sensors (such as weight sensors, pressure sensors, light sensors, etc.) as described above, and so forth. Thereafter, the at least one processing device may use a determined EP quantity indicator 1902 and at least one SP indicator to determine at least one suggestion regarding placement of perishable products in retail store 105. For example, when EP quantity indicator 1902 indicates that there are a large number of peaches currently in the store (in the display area and in the storage area) and the at least one processing device knows that another shipment of peaches is scheduled tomorrow, the at least one processing device may recommend lowering the price of the peaches currently in the store.

Consistent with the present disclosure, the at least one processing device may use AI and ML algorithms to estimate the quantity of the perishable products on display and/or in the storage area and to determine EP quantity indicator 1902. For example, a machine learning model may be trained using training examples to identify a quantity of perishable products from images and/or videos, and the trained machine learning model may be used to analyze an image of the perishable products to identify the quantity of the perishable products. An example of such a training example may include an image of perishable products together with an indication of the quantity of the perishable products depicted in the image. In another example, an artificial neural network (such as a deep neural network, a convolutional neural network, etc.) may be configured to identify a quantity of perishable products from images and/or videos, and the artificial neural network may be used to analyze an image of the perishable products to identify the quantity of the perishable products. In one example, the estimated quantity may include a number that corresponds to the number of products from the at least one product type. In another example, the estimated quantity may be an indicator of the existing quantity of the at least one product type relative to the desired quantity of the at least one product type as identified in a relevant planogram (e.g., 65% of planogram inventory of tomatoes). In one embodiment, EP quantity indicator 1902 may be associated with a volume of the perishable products. Specifically, the at least one processing device may analyze images to determine a representative volume of a product of the perishable products, and use the determined representative volume to estimate the total volume of the perishable products in a pile, for example, by multiplying an estimated number of products by the estimated volume. In another example, the at least one processing device may analyze captured images to detect a label associated with the perishable products, the depiction of the label in the one or more images may be used to determine a representative volume of a product of the perishable products, and the representative volume may be used to estimate the total volume of the perishable products in the pile. In yet another example, the representative volume of a product of the perishable products may be obtained from a user associated with retail store 105. In another embodiment, EP quantity indicator 1902 may be associated with a weight of the perishable products. For example, the at least one processing device may analyze images to determine a representative weight of a product of the perishable products and use the representative weight to estimate the total weight of the perishable products in a pile, for example, by estimating the number of perishable products in the pile and multiplying it by the estimated weight. In yet another example, a representative weight of a product of the perishable products may be obtained from a user associated with retail store 105, and the obtained weight may be used to estimate the total weight of the perishable products in the pile. In addition, the at least one processing device may use weight measurements from additional sensors (e.g., detection element 851) to determine the total weight of the perishable products in the pile and use this information to determine EP quantity indicator 1902. Alternatively, the estimated total volume of the perishable products in a pile may be obtained (for example, as described above), and the representative weight may be used together with the total volume to estimate the quantity of the perishable products in retail store 105.

In some embodiments, the at least one processing device may use captured data analysis module 1804 to determine one or more EP demand indicators 1904 for multiple types of perishable products. Specifically, the at least one processing device may determine EP demand indicators 1904 for the multiple types of perishable products based on analysis of data captured in retail store 105. Thereafter, the at least one processing device may use EP demand indicator 1904 and at least one SP indicator to determine at least one suggestion regarding placement of perishable products in retail store 105. For example, when EP demand indicator 1904 indicates that there is a high demand for peaches and another shipment of peaches is scheduled for the day after tomorrow, the at least one processing device may recommend increasing the price of the peaches currently in the store. Consistent with the present disclosure, the at least one processing device may use AI and ML algorithms to estimate the demand for different types of perishable products and to determine EP demand indicator 1904. In one embodiment, EP demand indicator 1904 may be associated with a number of customers standing next to at least one shelving unit associated with a specific type of perishable products within a selected time duration. For example, the at least one processing device may analyze captured images to determine the number of customers standing next to a shelving unit. For example, a machine learning model may be trained using training examples to determine the number of people in a selected region of the environment from images and/or videos, and the trained machine learning model may be used to analyze the captured images and determine the number of customers standing next to a shelving unit. An example of such a training example may include an image with an indication of a selected region in the image, together with an indication of the number of people within the selected region. In another example, an artificial neural network (such as a deep neural network, a convolutional neural network, etc.) may be configured to determine the number of people in a selected region of the environment from images and/or videos, and the artificial neural network may be used to analyze the captured images and determine the number of customers standing next to a shelving unit. In another embodiment, EP demand indicator 1904 may be associated with the number of customers picking up perishable products from a shelving unit associated with the specific type of perishable products during a selected time duration. For example, the at least one processing device may analyze the captured images to determine the number of customers picking up perishable products from the shelving unit. For example, a machine learning model may be trained using training examples to determine the number of customers picking up perishable products from selected shelving units using images and/or videos, and the trained machine learning model may be used to analyze the captured images and determine the number of customers picking up perishable products from the shelving unit. An example of such a training example may include an image with an indication of a selected shelving unit, together with an indication of the number of customers picking up perishable products from the shelving unit. In another example, an artificial neural network (such as a deep neural network, a convolutional neural network, etc.) may be configured to determine the number of customers picking up perishable products from shelving units using images and/or videos, and the artificial neural network may be used to analyze the captured images and determine the number of customers picking up perishable products from the shelving unit. In another embodiment, EP demand indicator 1904 may be associated with a quantity of perishable products that each costumer picks from at least one shelving unit associated with the specific type of perishable products. For example, the at least one processing device may analyze the captured images to determine the quantity of products that each costumer picks from at least one shelving unit. For example, a machine learning model may be trained using training examples to determine the quantities of products that different costumer picks from selected shelving units using images and/or videos, and the trained machine learning model may be used to analyze the captured images and determine the quantity of products that each costumer picks from the shelving unit. An example of such a training example may include images with an indication of a selected shelving unit, together with an indication of the quantity of products that each costumer picks from the shelving unit. In another example, an artificial neural network (such as a deep neural network, a convolutional neural network, etc.) may be configured to determine the quantities of products that different costumer picks from selected shelving units using images and/or videos, and the artificial neural network may be used to analyze the captured images and determine the quantity of products that each costumer picks from the shelving unit. In some embodiments, the at least one processing device may use captured data analysis module 1804 together with data from other sources to determine EP demand indicators 1904 for multiple types of perishable products located in retail store 105. In one example, EP demand indicator 1904 may be associated with the number of searches that online customers made for a specific type of perishable products within a selected time duration. In another example, EP demand indicator 1904 may be associated with sales data during a selected time duration.

In some embodiments, the at least one processing device may use captured data analysis module 1804 to determine one or more EP price indicators 1906 for one or more types of perishable products. For example, the at least one processing device may determine price indicators 1906 for one or more types of perishable products based on analysis of data captured in retail store 105, based on information from a database that contain prices for different products, and so forth. Thereafter, the at least one processing device may use a determined EP price indicators 1906 and at least one SP indicator to determine at least one suggestion regarding placement of perishable products in retail store 105. For example, the EP price indicators 1906 may include prices of one or more perishable products, may include indication of whether the prices of one or more perishable products are below or above a selected threshold, may include an indication of whether one or more perishable products are on special sale, and so forth. For example, when the price of a particular perishable product is below a selected threshold and the SP indicators indicates that another shipment of the particular perishable product is not scheduled for at least a selected time duration, the at least one processing device may recommend increasing the price of the particular perishable product. In some examples, images captured from the retail store may be analyzed to determine a price of a particular perishable product. For example, an OCR algorithm may be used to extract textual information from a price label associated with the particular perishable product.

In some embodiments, the at least one processing device may use captured data analysis module 1804 to determine one or more EP planogram indicators 1908 for multiple types of perishable products. For example, the at least one processing device may determine planogram indicators 1908 for the multiple types of perishable products based on analysis of data captured in retail store 105, based on input from other sensors (such as weight sensors, pressure sensors, light sensors, etc., for example as described above in relation to processes 1000 and 1050), and so forth. Thereafter, the at least one processing device may use a determined EP planogram indicator 1908 and at least one SP indicator to determine at least one suggestion regarding placement of perishable products in retail store 105. For example, when planogram indicator 1908 indicates that a temporary size of a display area for peaches is lower than an original display area allocated to peaches (e.g., with respect to a planogram, with respect to a realogram, etc., e.g., due to shortage of peaches) and the at least one processing device knows that another shipment of peaches is scheduled only the day after tomorrow, the at least one processing device may recommend increasing the display area of a different product. Consistent with the present disclosure, the at least one processing device may analyze captured images to determine a measurement of planogram compliance associated with a specific type of perishable products (e.g., with respect to a planogram, with respect to a realogram, etc.) and determine the planogram indicators 1908 based on the measurement of planogram compliance.

As further illustrated in FIG. 19, the at least one processing device of system 100 may use scheduling data analysis module 1808 to output an SP quality indicator 1910, an SP quantity indicator 1912, an SP demand indicator 1914, an SP cost indicator 1916, an SP shelf-life indicator 1918, and an SP ETA indicator 1920. The SP indicators may be determined based on scheduling data received from one or more sources (e.g., entities in the supply chain). Additionally, the SP indicators may reflect attributes of perishable products currently not located in retail store 105, but scheduled to be delivered to retail store 105.

In some embodiments, the at least one processing device may use scheduling data analysis module 1808 to determine one or more SP quality indicators 1910 for the additional perishable products scheduled to be displayed on at least one shelving unit in retail store 105. Specifically, the at least one processing device may determine a predicted quality for multiple types of perishable products scheduled to be delivered to retail store 105 based on data obtained by external sources communication module 1806. Thereafter, the at least one processing device may use at least one EP indicator and SP quality indicator 1910 to determine at least one suggestion regarding placement of perishable products in retail store 105. For example, when SP quality indicator 1910 indicates that the condition of the bananas in an upcoming shipment is already ripe and the at least one processing device knows that there is a large number of ripe bananas in retail store 105, the at least one processing device may recommend lowering the price of the bananas currently in retail store 105. Consistent with the present disclosure, the at least one processing device may use product quality information associated with additional perishable products and the estimated arrival time of the additional perishable products to predict the quality of the additional perishable products at the time they are estimated to arrive to retail store 105. The at least one processing device may use a regression model on the product quality information and possibly additional inputs such as the supplier's records, calendar data, the delivery conditions (e.g., using refrigerator truck), and more. In some examples, the at least one processing device may determine SP quality indicator 1910 using a machine learning model trained to predict the quality of the additional perishable products from the inputs described above. In other examples, the at least one processing device may determine SP quality indicator 1910 using an artificial neural network configured to predict the quality of the additional perishable products from the inputs described above. In one embodiment, the at least one processing device may determine a distribution of predicted qualities (i.e., assigning probabilities to different level of qualities) for the additional perishable products during the time they are estimated to arrive to retail store 105. Some examples of such distributions may include normal distribution, Fisher's non-central hypergeometric distribution, Wallenius' non-central hypergeometric distribution, Poisson distribution, and so forth.

In some embodiments, the at least one processing device may use scheduling data analysis module 1808 to determine one or more SP quantity indicators 1912 for the additional perishable products scheduled to be displayed on at least one shelving unit in retail store 105. Specifically, the at least one processing device may determine the quantity for multiple types of perishable products scheduled to be delivered to retail store 105 based on data obtained by external sources communication module 1806. Thereafter, the at least one processing device may use at least one EP indicator and SP quantity indicator 1912 to determine at least one suggestion regarding placement of perishable products in retail store 105. For example, when SP quantity indicator 1912 indicates that only half of the ordered bananas are scheduled to arrive and the at least one processing device knows that there is a limited number of ripe bananas in retail store 105, the at least one processing device may recommend increasing the price of the bananas currently in retail store 105. Consistent with the present disclosure, the at least one processing device may determine the quantity of the additional perishable products scheduled to be delivered to retail store 105 based on reports from the suppliers, reports from the delivery company, IoT sensors that accompany the additional perishable products during their shipments, and other sources. In one embodiment, when updates and reports on the additional perishable products are unavailable, the at least one processing device may predict the quantity of the additional perishable products scheduled to be delivered to retail store 105 based on orders data and past delivery data.

In some embodiments, the at least one processing device may use scheduling data analysis module 1808 to determine one or more SP demand indicators 1914 for the additional perishable products scheduled to be displayed on at least one shelving unit in retail store 105. Specifically, the at least one processing device may determine the predicted demand for multiple types of perishable products scheduled to be delivered to retail store 105 based on data obtained by external sources communication module 1806. Thereafter, the at least one processing device may use at least one EP indicator and SP demand indicator 1914 to determine at least one suggestion regarding placement of perishable products in retail store 105. For example, when SP demand indicator 1914 indicates that the predicted demand for bananas is high and the bananas in retail store 105 are displayed at a location associated with a low turnover, the at least one processing device may recommend to reposition the bananas at a location with a high turnover. Consistent with the present disclosure, the at least one processing device may determine the predicted demand for multiple types of perishable products scheduled to be delivered to retail store 105 using forecasting algorithms, including statistical algorithms such as Fourier and multiple linear regression algorithms. The forecasting algorithms may use a variety of factors relating to different perishable products, and various types of demand history data (e.g., shipments data, point-of-sale data, customer order data, return data, marketing data, and more). Generally, demand history data can be broken into two types: base and non-base. Base history data includes predictable demand data that may be repeatable. Conversely, non-base history data is that part of demand that is due to special events, such as promotions or extreme market circumstances. As such, non-base history data may be associated with past demand events that are not anticipated to repeat themselves from one period of time to the next. However, non-base history data may still be stored within the history database to help the system to forecast the impact of special events upon future product demand. The at least one processing device may use one or more forecasting algorithms paired with various type of history data and run various simulations to increase the confidence level in determining the SP demand indicator 1914. For example, predictable seasonal patterns in demand history can be very accurately modeled by sine and cosine waves. Thus, the at least one processing device may use Fourier type demand planning algorithms with two to three years of demand history to generate SP demand indicator 1914.

In some embodiments, the at least one processing device may use scheduling data analysis module 1808 to determine one or more SP cost indicators 1916 for the additional perishable products scheduled to be displayed on at least one shelving unit in retail store 105. Specifically, the at least one processing device may estimate the costs associated with multiple types of perishable products scheduled to be delivered to retail store 105 based on data obtained by external sources communication module 1806. Thereafter, the at least one processing device may use at least one EP indicator and SP cost indicator 1916 to determine at least one suggestion regarding placement of perishable products in retail store 105. For example, when SP cost indicator 1916 indicates that the expenses associated the shipment of the bananas are high and the at least one processing device knows that other available fruits (classified as alternative to bananas) in retail store 105 are in low quality, the at least one processing device may recommend a minimum price for the bananas scheduled to be delivered to retail store 105. Consistent with the present disclosure, the at least one processing device may determine recommended prices for multiple types of perishable products scheduled to be delivered to retail store 105 based data obtained by external sources communication module 1806. In one example, the at least one processing device may obtain from market research entity 110 information about competitor's prices of a type of product scheduled to be delivered to retail store 105, information about the predicted demand for the type of product scheduled to be delivered to retail store 105, information about recent sales of the type of product scheduled to be delivered to retail store 105, and more. The at least one processing device may use the information from market research entity 110 to determine SP cost indicators 1916. In another example, the at least one processing device may obtain from supplier 115 information about costs associated with the type of product scheduled to be delivered to retail store 105, information about the quality of the type of product scheduled to be delivered to retail store 105, information about the shelf-life scheduled to be delivered to retail store 105, and more. The at least one processing device may use the information from supplier 115 to determine SP cost indicators 1916. In another example, the at least one processing device may obtain from online services information about events that may affect the demand for the type of product scheduled to be delivered to retail store 105, information from one or more IoT sensors that accompany a delivery of the perishable products and monitor the condition of the perishable products during the delivery. The at least one processing device may use some or all the information obtained from online services to determine SP cost indicators 1916.

In some embodiments, the at least one processing device may use scheduling data analysis module 1808 to determine one or more SP shelf-life indicators 1918 for the additional perishable products scheduled to be displayed on at least one shelving unit in retail store 105. Specifically, the at least one processing device may estimate the shelf-life of multiple types of perishable products scheduled to be delivered to retail store 105 based on data obtained by external sources communication module 1806. Thereafter, the at least one processing device may use at least one EP indicator and SP shelf-life indicator 1918 to determine at least one suggestion regarding placement of perishable products in retail store 105. For example, when SP shelf-life indicator 1918 indicates that the bananas scheduled to be delivered to retail store 105 will be overripe in three days and processing device knows that retail store 105 already has a large amount of ripe bananas, the at least one processing device may recommend a maximum price for the bananas. Consistent with the present disclosure, the at least one processing device may determine the shelf-life of the additional perishable products scheduled to be delivered to retail store 105 based on the predicted quality of the additional perishable products at the estimated delivery time. In one embodiment, the at least one processing device may retrieve from a database information correlating a predicted condition of each type of perishable product with an estimated shelf-life value. Additionally, the at least one processing device may determine SP shelf-life indicator 1918 using artificial neural network and/or a machine learning model trained to predict the estimated shelf-life of the additional perishable products from history data and other inputs described above.

In some embodiments, the at least one processing device may use scheduling data analysis module 1808 to determine one or more SP ETA indicators 1920 for additional perishable products scheduled to be displayed on at least one shelving unit in retail store 105. Specifically, the at least one processing device may determine the estimated arrival time of the additional perishable products scheduled to be delivered to retail store 105 based on data obtained by external sources communication module 1806. Thereafter, the at least one processing device may use at least one EP indicator and SP ETA indicator 1920 to determine at least one suggestion regarding placement of perishable products in retail store 105. For example, when SP ETA indicator 1920 indicates that the bananas scheduled to be delivered to retail store 105 in 16 hours and the at least one processing device knows that retail store 105 recently ran out of bananas, it may recommend using the display area allocated to bananas to promote sales of a different product. Consistent with the present disclosure, the at least one processing device may receive updates from a delivery company to determine SP ETA indicator 1920. Additionally, the at least one processing device may determine SP ETA indicator 1920 using artificial neural network and/or a machine learning model trained to predict the estimated arrival time of the additional perishable products from history data and other inputs described above.

As further illustrated in FIG. 19, the at least one processing device of system 100 may use suggestion determination module 1810 to output an EP location suggestion 1922, an EP size suggestion 1924, an EP promotion suggestion 1925, an EP reorganization suggestion 1926, an SP location suggestion 1928, an SP size suggestion 1930 and an SP promotion suggestion 1932. As mentioned above, suggestion determination module 1810 may use at least one EP indicator and at least one SP indicator to generate at least one suggestion. In one embodiment, suggestion determination module 1810 may use a plurality of EP indicators (e.g., at least two, at least three, at least four) and a plurality of SP indicators (e.g., at least two, at least three, at least four, or at least five) to generate at least one suggestion. In another embodiment, suggestion determination module 1810 may use any combination of a set of EP indicators with any set of SP indicators to determine any type of suggestion. The term "a set of indicators" in this disclosure refers to one or more indicators.

In some embodiments, the at least one processing device may use suggestion determination module 1810 to determine EP location suggestion 1922 that includes an indication of a temporary location for at least some of the plurality of perishable products to reside prior to arrival of the additional perishable products. Similarly, the at least one processing device may use suggestion determination module 1810 to determine SP location suggestion 1928 that includes an indication of a location for the additional perishable products after they have been delivered to retail store 105. In particular, the at least one processing device may determine the location for at least one type of perishable products based on the information about the displayed inventory (i.e., at least one EP indicator) and the information about the additional perishable products (i.e., at least one SP indicator). For example, when the determined EP quality indicator 1900 indicates that about 75% of the avocados in retail store 105 are ripe, and SP quality indicator 1910 indicates that about 25% of the avocados scheduled to be delivered today to retail store 105 are also ripe, the at least one processing device may recommend placing at least some of the avocados in a location associated with high customer turnover (e.g., displays in the middle of an aisle, on a corner bay stand, on the first stand the customers see when entering the department, etc.). Consistent with the present disclosure, the at least one processing device may use AI and ML algorithms to determine a customer turnover ranking for different locations in retail store 105, and to use the customer turnover ranking in determining EP location suggestion 1922 and SP location suggestion 1928. The determination of the customer turnover ranking may be based on image data analysis and sale data analysis. In addition, the at least one processing device may use subsequently captured image data to monitor compliance to the EP location suggestion 1922 and/or SP location suggestion 1928, find correlation between actual in store coupling to sales, and improve its AI and ML algorithms accordingly. In some embodiments, a conditional distribution of product turnover rank may be computed with respect to different locations. Further, in some examples, the computed conditional distribution may be analyzed to identify the locations that contribute to higher (or lower) product turnover, to product turnover that is above a selected threshold, and so forth. In some embodiments, correlations between product turnover and different locations may be computed. Further, in some examples, the computed correlations between the product turnover and the different locations may be analyzed to identify the locations that contribute to higher (or lower) product turnover.

In some embodiments, the at least one processing device may use suggestion determination module 1810 to determine EP size suggestion 1924 that includes an indication of a temporary size of a display area for at least some of the plurality of perishable products to be used prior to arrival of the additional perishable products. Similarly, the at least one processing device may use suggestion determination module 1810 to determine SP size suggestion 1930 that includes an indication of the size of a display area for the additional perishable products after they have been delivered to retail store 105. In particular, the at least one processing device may determine the suggested display area for at least one type of perishable products based on the information about the displayed inventory (i.e., at least one EP indicator) and the information about the additional perishable products (i.e., at least one SP indicator). For example, when the determined EP quantity indicator 1902 indicates that the amount of avocados retail store 105 is 130% than a typical amount and SP ETA indicator 1920 indicates that another shipment of avocados is scheduled to be delivered later today to retail store 105, the at least one processing device may recommend increasing the display area of avocados relative to another product that has longer shelf life. Consistent with the present disclosure, EP size suggestion 1924 and SP size suggestion 1930 may be time dependent. Specifically, based on image data analysis and/or sale data analysis, the at least one processing device may determine that a predicted demand for a certain type of perishable product during first time period is greater than the predicted demand during a second time period, and suggest a greater display size during the first time period. For example, the at least one processing device may determine that on Mondays and Wednesdays there is greater demand for avocados relative to the other days of the week. Thus, the at least one processing device may consider the temporal changes in the determined demand when determining EP size suggestion 1924 and SP size suggestion 1930.

In some embodiments, the at least one processing device may use suggestion determination module 1810 to determine EP promotion suggestion 1925 and SP promotion suggestion 1932. In this disclosure, the term "promotion" may include a change in price or an advertisement. EP promotion suggestion 1925 may include an indication of a temporary price for at least some of the plurality of perishable products to be applied prior to arrival of the additional perishable products. Similarly, SP promotion suggestion 1932 may include an indication of the price for the additional perishable products after they have been delivered to retail store 105. In particular, the at least one processing device may determine the recommended promotion for at least one type of perishable products based on the information about the displayed inventory (i.e., at least one EP indicator) and the information about the additional perishable products (i.e., at least one SP indicator). For example, when the determined EP demand indicator 1904 indicates that the demand for avocados is low and SP ETA indicator 1920 indicates that another shipment of avocados is scheduled to be delivered later today to retail store 105, the at least one processing device may recommend lowering the price and of avocados and display a "sale" sign. Consistent with the present disclosure, the at least one processing device may use the following list of variables to determine promotion suggestions for a type of perishable products: quantity of existing products, quantity of scheduled products, quality of existing products, quality of scheduled products, predicted shelf-life for existing products, predicted shelf-life for scheduled products, average quantity sales per day, predicted demand, retail price, costs, costs of discarding the perishable products, costs of returning the perishable products to the supplier, and more. The price may be dynamically determined for each type of perishable product based on the financial impact. In some cases, the at least one processing may autonomously control a price display (e.g., an electronic display) to present the determined price for the perishable products.

In some embodiments, the at least one processing device may use suggestion determination module 1810 to determine EP reorganization suggestion 1926 that includes at least one task for reorganizing perishable products in retail store 105. Specifically, the at least one processing device may determine the least one task for reorganizing perishable products in retail store 105 based on information about perishable products available in a storage area of retail store 105 (i.e., at least one EP indicator) and the information about the additional perishable products (i.e., at least one SP indicator). In one embodiment, EP reorganization suggestion 1926 may include a task for reorganizing perishable products currently available in the storage area. For example, when the determined EP quantity indicator 1902 indicates that there are 200 Kg of avocados in the cold store and SP ETA indicator 1920 indicates that another shipment of 500 Kg avocados is scheduled to be delivered in the next hour, the at least one processing device may recommend reorganizing the space in the cold store by taking the apples out from the cold store. In another embodiment, EP reorganization suggestion 1926 may include a task for reorganizing perishable products placed on the at least one shelving unit. For example, when EP demand indicator 1904 indicates that the tomatoes located in a display area adjacent to the avocados have low demand and SP quality indicator 1910 indicates that about 50% of the avocados in the coming shipment are ripe, the at least one processing device may recommend increasing the display area of the avocado relative to the tomatoes' display area. Consistent with the present disclosure, the at least one processor may predict a condition of the perishable products available in the storage area of retail store 105 at a time when the additional perishable products are scheduled to arrive (e.g., EP quality indicator 1900). Thereafter, the at least one processor may use the information about the perishable products available in the storage area, the information about the additional perishable products and the predicted condition to determine at least one task for reorganizing perishable products in retail store 105. For example, by the time the new shipment of avocados will arrive, the avocados in the display area will be overripe and, therefore, the avocados in the display area should be cleared.

Figure 20:
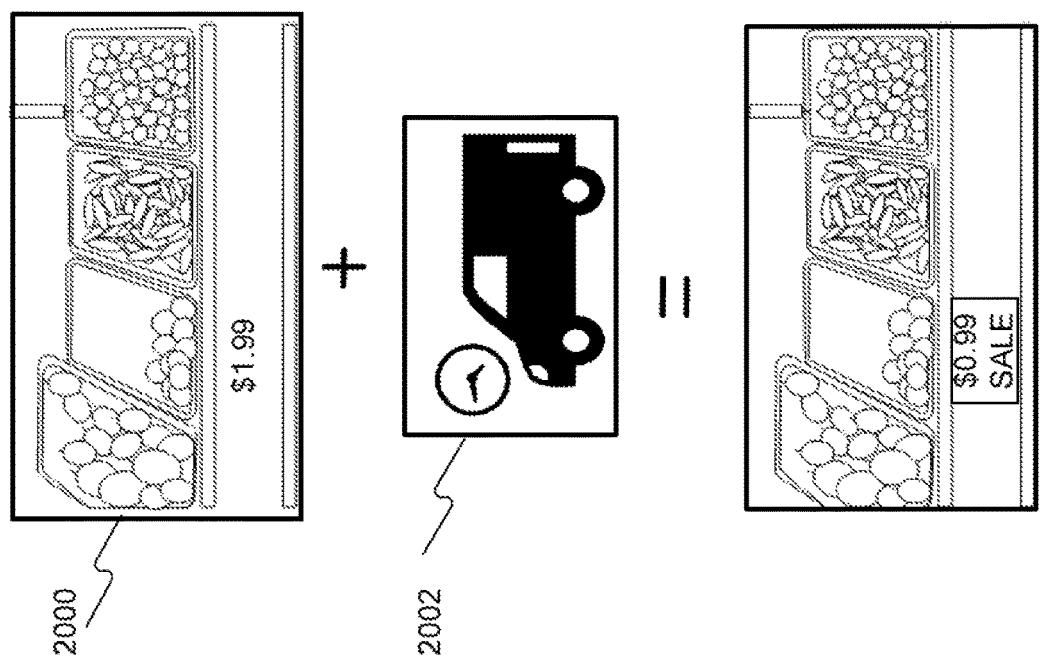
FIG. 20 is a diagram illustrating an example of how an inventory of perishable products in retail stores is managed based on image data and scheduling data consistent with the present disclosure.

Reference is now made to FIG. 20, which illustrates an example of generating a suggestion relating to perishable products based on image data and scheduling data. In the illustrated example, system 100 receives and analyses image data 2000 to determine at least one EP indicator. Image data 2000 may include an image depicting the display area of the onions and, as shown, the amount of onions left on the store shelf is low. Thereafter, system 100 receives scheduling data 2002 and analyzes scheduling data 2002 to determine at least one SP indicator. Scheduling data 2002 may indicate that a shipment of onions is en route. Using image data 2000 and scheduling data 2002, system 100 may determine at least one suggestion regarding placement of perishable products in retail store 105. In the following example, system 100 may cause a change in the displayed price of the onions and added a promotion sign. In one embodiment, system 100 may cause the change in the displayed price of the onions by controlling an electronic price display. In another embodiment, system 100 may assign a task to a store employee associated with the determined suggestion.

Figure 21:
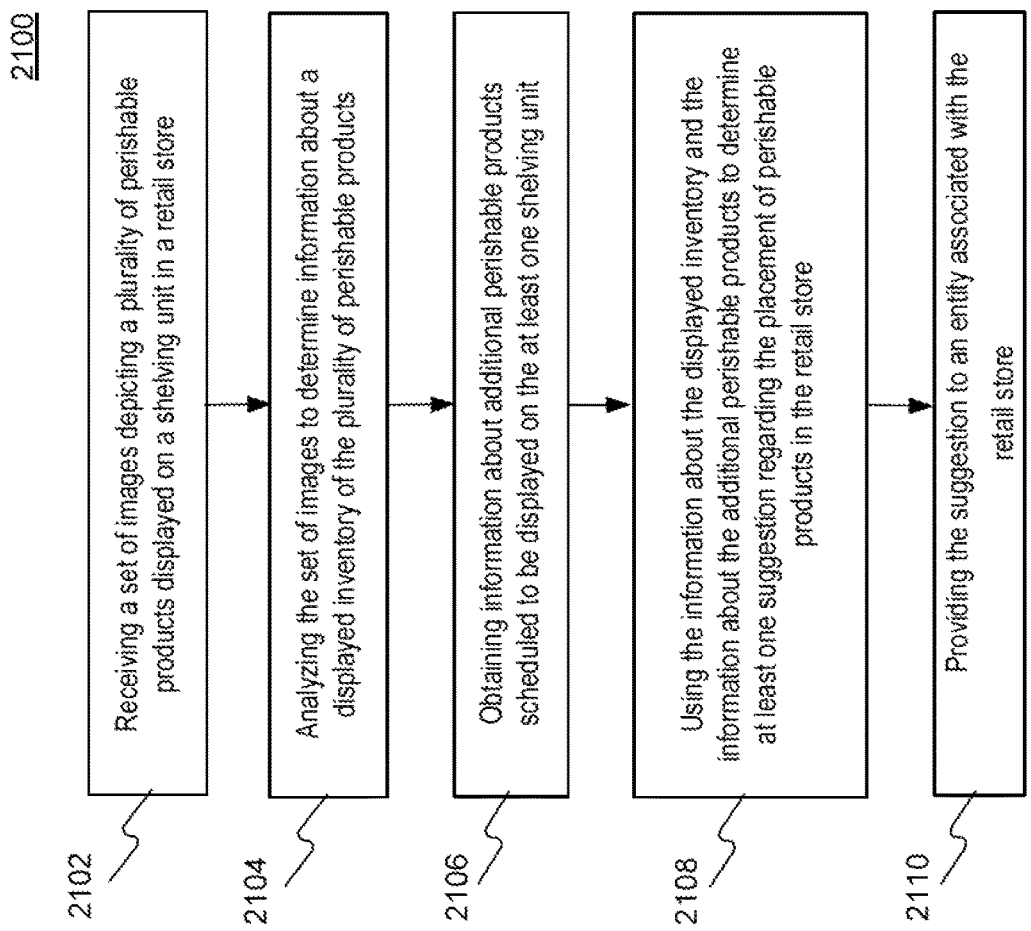
FIG. 21 is a flowchart of an exemplary method consistent with an embodiment for managing inventory of perishable products in retail stores consistent with the present disclosure.

FIG. 21 depicts an exemplary method 2100 for identifying perishable products and automatically generating suggestions relating to the identified products based on analysis of image data 2000. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 2102, a processing device (e.g., processing device 202) may receive a set of images depicting a plurality of perishable products displayed on a shelving unit in retail store 105. In one embodiment, the set of images may be acquired by any one of image capturing devices 125 illustrated in FIG. 4A-4C. For example, the set of images may be acquired by a plurality of image sensors fixedly mounted in retail store 105. Details of the image capturing devices mounted in retail store 105 and configured to acquire the set of images are described with references to FIGS. 5A-5C. The set of images may be used to derive image data such as processed images (e.g., cropped images, video streams, and more) or information derived from the captured images (e.g., data about products identified in captured images, data that may be used to construct a 3D image, and more). In one embodiment, the processing device may periodically receive a set of images that corresponds with the current inventory of the perishable products on the shelf. In this disclosure, the term "set of images" refers to one or more images. For example, the processing device may receive a set of images at predetermined time intervals (e.g., every minute, every 5 minutes, every 15 minutes, every 30 minutes, etc.). In another embodiment, the processing device may receive the set of images in response to a detection of a certain identified event. In one example, the processing device may receive the set of images after an event, such as a detected lifting of a perishable product from the shelving unit.

At step 2104, the processing device may analyze the set of images to determine information about a displayed inventory of the plurality of perishable products. Consistent with the present disclosure, the processing device may analyze image data 2000 to determine one or more EP indicators associated with one or more types of perishable products in retail store 105. The one or more types may include, for example, more than 25 types of perishable products, more than 50 types of perishable products, more than 100 types of perishable products, etc. In one embodiment, the processing device may determine the information about the displayed inventory of the plurality of perishable products using a combination of image data derived from the received set of images and/or data from one or more additional sensors configured to detect properties of perishable products placed on a store shelf. For example, the one or more additional sensors may include weight sensors, pressure sensors, touch sensors, light sensors, odors sensors, and detection elements as described in relation to FIGS. 8A, 8B and 9, and so forth. Such sensors may be used alone or in combination with image capturing devices 125. For example, the processing device may analyze the data received from odors sensors alone or in combination with images captured from the retail store, to estimate the condition or the ripeness level of perishable products placed on a store shelving unit.

In some embodiments, analyzing the set of images to determine information about a displayed inventory of the plurality of perishable products may further comprise preprocessing the image data. In some examples, the image data may be preprocessed by transforming the image data using a transformation function to obtain a transformed image data, and the preprocessed image data may include the transformed image data. For example, the transformation function may comprise convolutions, visual filters (such as low-pass filters, high-pass filters, band-pass filters, all-pass filters, etc.), nonlinear functions, and so forth. In some examples, the image data may be preprocessed by smoothing the image data, for example, by using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy compression representation of at least part of the image data; a lossless compression representation of at least part of the image data; a time order series of any of the above; any combination of the above; and so forth. In some examples, the image data may be preprocessed to extract edges, and the preprocessed image data may include information based on and/or related to the extracted edges. In some examples, the image data may be preprocessed to extract visual features from the image data. Some examples of such visual features include edges, corners, blobs, ridges, Scale Invariant Feature Transform (SIFT) features, temporal features, and so forth. One of ordinary skill in the art will recognize that the image data may be preprocessed using other kinds of preprocessing methods.

In some embodiments, a machine learning model may be trained using training examples to determine information about displayed inventories of perishable products from images and/or videos, and the trained machine learning model may be used to analyze the set of images and the information about a displayed inventory of the plurality of perishable products. An example of such a training example may include one or more images together with the desired information to be determined for that one or more images. In some embodiments, an artificial neural network (such as a deep neural network, a convolutional neural network, etc.) may be configured to determine information about displayed inventories of perishable products from images and/or videos, and the artificial neural network may be used to analyze the set of images and the information about a displayed inventory of the plurality of perishable products.

At step 2106, the processing device may obtain information about additional perishable products scheduled to be displayed on the at least one shelving unit. Consistent with the present disclosure, the processing device may analyze scheduling data 2002 to determine one or more SP indicators associated with one or more types of perishable products scheduled to be delivered to retail store 105. The information about additional perishable products may include at least one of: a schedule of arrivals of the additional products (e.g., dates, times, updates from a supplier, etc.), known orders of the additional products (e.g., quantity of scheduled products), delivery records (e.g., the reports on the delivery progress of the additional products), cost data (e.g., the different costs associated with the additional products), calendar data (e.g., holidays, sport games, etc.), historical product turnover data (e.g., the amount of avocados sold per last April), average turnover (e.g., per hour in a day, per day in a week, per special events), and more. In one embodiment, the information about the additional perishable products may be obtained from multiple sources (e.g., market research entity 110, supplier 115, and multiple retail stores 105) and may include different types of parameters. In some embodiments, the obtained information about the additional perishable products may be stored digitally in memory device 226, stored in database 140, received using network interface 206 through communication network 150, received from a user, determined by processing device 202, and so forth.

At step 2108, the processing device may use the information about the displayed inventory and the information about the additional perishable products to determine at least one suggestion regarding the placement of perishable products in retail store 105. Consistent with the present disclosure, the processing device may perform big data analytics on the information about the displayed inventory and/or the information about the additional perishable products. Typically, the big data analytics may be executed in an automatic or autonomous manner without using any user input during the learning analysis. In one embodiment, the processing device may perform large-scale data analysis on the received information image data and scheduling data to discover, detect, or learn new data. For example, the large-scale data analysis involves the process of examining large quantities of data (e.g., data mining, data discovery, etc.) to extract new or previously unknown interesting data or patterns such as unusual demand events for a certain type of perishable product. The processing device may also perform large-scale data analysis on the stored data (e.g., machine learning analysis, data modeling, pattern recognition, predictive analysis, correlation analysis, etc.) to predict, calculate, or identify implicit relationships or inferences within the stored data. For example, the processing device may identify at least one pattern correlating a combination of different parameters to product sales. The different parameters may include the quantity of perishable products on display, the quality of perishable products on display, the predicted demand for the perishable products, the location that the perishable products are being displayed, the time of day, the day of the week, the price of perishable products. Later on, the identified at least one pattern may be used for determining suggestions regarding the placement of different types of perishable products in retail store 105.

At step 2110, the processing device may provide the suggestion to an entity associated with the retail store. Consistent with the present disclosure, the entity associated with retail store 105 may be an employee (human or robot) of retail store 105, a costumer of retail store 105, a user of system 100 that monitors retail store 105 (e.g., market research entity 110), a processing device that control operations associated with retail store 105 (e.g., ERP system, WMS system, and SCM system), and any other device or individual capable of implementing suggestions regarding placement of perishable products in retail store 105.

Consistent with an embodiment of the present disclosure, system 100 may support different types of retail stores. For example, a first type of retail store may have a policy that fruits, vegetables, and baked goods stands should be full in order to provide a positive visual experience. Therefore, if a display area dedicated to one type of perishable product is below a visual threshold (e.g., the height of the pile may be too low or the total empty space on a part of the shelf is greater than 50%) the type of perishable product should be restocked. However, if there are no more products from that type of perishable products in the store inventory, the display area dedicated to that type of perishable products needs to be reduced in favor of another type of perishable product that is available. On the other hand, a second type of retail store may have a policy to get to the end-of-day (or the end-of-week) with empty perishable products shelves to reduce the number of perishable products with low shelf life being thrown away. For example, when system 100 predicts that a large amount of tomatoes will remain on shelf at the end-of-day, a promotion may be launched to reduce the price of the tomatoes. In another example, when system 100 predicts that a certain type of baked product may remain on shelf at the end-of-day, a suggestion may be provided to stop baking additional products from this type.

Figure 22:
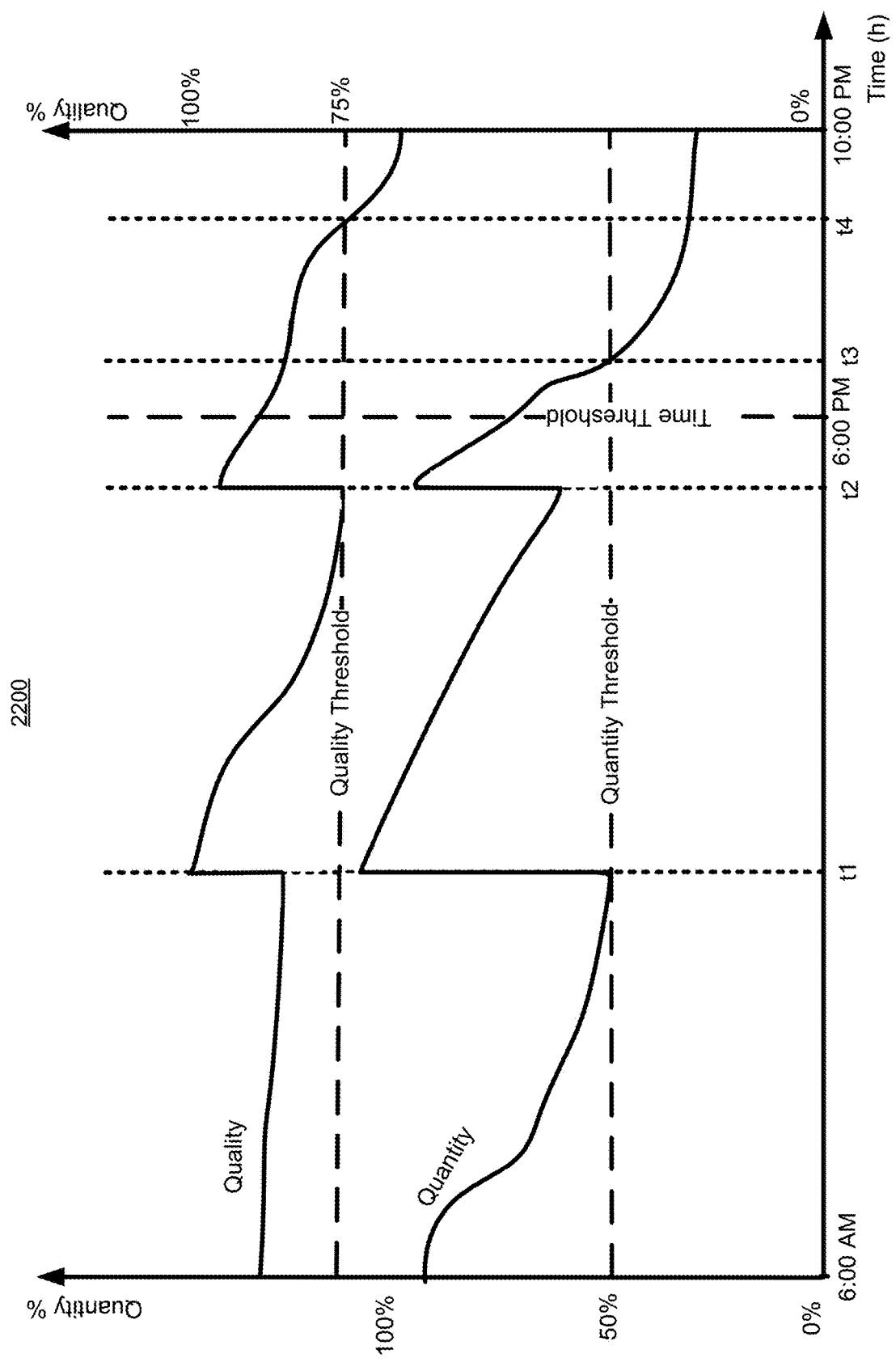
FIG. 22 is a graph showing example changes in quality and quantity of perishable products from a certain type in a retail store consistent with the present disclosure.

FIG. 22 illustrates a graph 2200 that shows the changes in quality and quantity of perishable products from a certain type in retail store 105 during a workday from 6:00 AM to 10:00 PM. Graph 2200 includes three thresholds: a quality threshold at 75%, a quantity threshold at 50%, and a time threshold at 6:00 PM. As shown, system 100 triggered two product restocking events, the first restocking event took place at t1 and the second restocking event took place at t2. In addition, the depicted workday is divided to five time periods.

The first time period is from 6:00 to t1. In the first time period, the quality of the perishable products remains substantially the same, but the quantity of the perishable products drops down and reaches the quantity threshold at t1. When system 100 determines that the quantity of the perishable products is about to reach the quantity threshold, it triggers a first restocking event. Consistent with the present disclosure, system 100 determines that the quantity of the perishable products is about to reach the quantity threshold using the determined EP indicators, for example, by analyzing images captured by image capturing devices 125 and optionally analyzing data from one or more types of shelf sensors.

The second time period is from t1 to t2. In the second time period, the quality of the perishable products drops down and reaches the quality threshold at t2, and the quantity of the perishable products drops down but does not reach the quantity threshold. When system 100 determines that the quality of the perishable products is about to reach the quality threshold, it triggers a second restocking event. Consistent with the present disclosure, system 100 determines that the quality of the perishable products is about to reach the quality threshold using the determined EP indicators, for example, by analyzing images captured by image capturing devices 125 and optionally analyzing data from one or more types of shelf sensors.

The third time period is from t2 to t3. In the third time period, the quality of the perishable products drops down but does not reach the quality thresholds and the quantity of the perishable products drops down and reaches the quantity threshold at t3. In addition, during the third time period the time threshold passes. After the time threshold passes, system 100 avoids triggering restocking events. In particular, although system 100 determines that at t3 the quantity of the perishable products drops down and reaches the quantity threshold, it decides to forgo initiating a restocking event because t3 is later than the time threshold.

The fourth time period is from t3 to t4. In the fourth time period, the quality of the perishable products drops down and reaches the quality threshold at t4. Similar to the situation in the third time period, system 100 decides to forgo initiating a restocking event because t4 is later than the time threshold. The fifth time period is from t4 to 22:00. The quantity and the quality of the perishable products continues dropping down, but system 100 still does not initiating a third restocking event.

Consistent with some embodiments illustrated in graph 2200, system 100 may be configured to avoid from triggering actions that will enhance the state of certain types of perishable products (e.g., increase their quantity or improve their quality) towards the end-of-day or towards the end-of-week. In one implementation, a processing device of system 100 may analyze the received set of images to determine EP quantity indicators 1902 indicative of quantities of certain types of perishable products at different times of day. At a first time of day (e.g., t1) when a quantity of products from the certain type of perishable products reaches or below a quantity threshold, the processing device may initiate an action for restocking the shelving unit with additional products from the certain type of perishable products. At a second time of day (e.g., t3), later than the first time of day, when a quantity of products from the certain type of perishable products reaches below the quantity threshold, the processing device may decide to forgo initiating the action for restocking the shelving unit with additional products from the certain type of perishable products. The decision to forgo initiating the action for restocking may be based on the time and date, based on inventory level, or based on store's policy. In some cases, processing device of system 100 may predetermine a value to the quantity threshold (or the quality threshold) specifically for the certain type of perishable products based on EP and SP indicators associated with the certain type of perishable products. For example, the value of the threshold may be determined based on the estimated time of arrival of the next shipment of products from the certain type.

In another implementation, a processing device of system 100 may analyze the set of images to determine EP quality indicators 1900 indicative of qualities of certain types of perishable products at different times of day. At a first time of day (e.g., t2) when a quality of products from the certain type of perishable products is below a quality threshold, the processing device may initiate an action for improving the quality associated with the products of the certain type of perishable products. In one example, the action for improving the quality may include removing rotten products from the pile and adding additional products to the pile. At a second time of day (e.g., t4), later than the first time of day, when a quality of products of the certain type of perishable products is below the quantity threshold, a processing device of system 100 may forgo initiating the action for improving the quality associated with the products of the certain type of perishable products.

Further to the discussion above about determining EP quality indicator 1900, in one embodiment, the processing device of system 100 may determine that the quality associated with the products of the certain type of perishable products is below a quality threshold determined for the certain type of perishable products. For example, by counting a number of times that customers engaged with a product of the certain type of perishable products but did not retain the product of the certain type of perishable products. The processing device of system 100 may count the number of times based on analysis of the received set of images. The underlying assumption of this embodiment is that if customers that were interested in this type of perishable products decided not to buy them, their quality may be not high enough. In another embodiment, the processing device of system 100 may determine that the quality associated with the products of the certain type of perishable products is below the quality threshold by comparing quality reference data with visual characteristics of the products displayed on the shelving unit, the visual characteristics being determined by analyzing the set of images. For example, the color distribution of a pile of bananas (e.g., green, yellow, dark yellow) may be indicative to the condition of the bananas. In another embodiment, the processing device of system 100 may determine that the quality associated with the products of the certain type of perishable products is below the quality threshold by comparing quality reference data with an estimated time duration that the products have been displayed on the shelving unit. The quality reference data may be specific to the certain type of perishable products and specific to the time of the year. For example, when peaches stay on the shelf for more than two days, they are considered to be of low quality. In contrast, avocados can stay on the shelf for seven days before they are considered to be of low quality.

As mentioned above, the processing device of system 100 may initiate an action for improving the quality associated with the products of a certain type of perishable products displayed on a shelving unit of retail store 105. The action for improving the quality associated with the products of the certain type of perishable products may improve an average quality, improve a quality of a selected group of instances of the perishable products (such as of 90% of the instances with the highest/lowest quality), improve the median quality, improve the mode quality, etc. Consistent with the present disclosure, the processing device of system 100 may analyze a set of images received from image capturing devices 125 to predict a time when the quality associated with the products of the certain type of perishable products will be below the quantity threshold. Thereafter, the processing device of system 100 may schedule a task for improving the quality associated with the products of the certain type of perishable products before the predicted time. The task may be implemented by a store employee (human or robot). In one example, the action for improving the quality associated with the products of the certain type of perishable products may include transmitting instructions for adding to the shelving unit products of the certain type of perishable products currently available in a storage area associated with the retail store. In another example, the action for improving the quality associated with the products of the certain type of perishable products may include transmitting instructions for sorting out low-quality products being displayed on the shelving unit.

In one specific embodiment, the at least one processing device of system 100 may analyze a set of images to determine whether a quantity of the products of a certain type of perishable products is below a quantity threshold. In response to a determination that the quantity of the products of the certain type of perishable products is below (or predicted to reach) the quantity threshold, the at least one processing device may initiate an action for restocking the shelving unit with additional products from the certain type of perishable products. The decision to restock the shelving unit with additional products from the certain type of perishable products occurs when the specific time is, for example, about t=t1 in graph 2200. In addition, in response to a determination that the quantity of the products of the certain type of perishable products is above the quantity threshold, the at least one processing device may forgo initiating the action for restocking the shelving unit with additional products from the certain type of perishable products. The decision to forgo initiating the action for restocking the shelving unit with additional products occurs when the specific time is, for example, between t1 and t2 in graph 2200. The at least one processing device of system 100 may also analyze the set of images to determine that the quantity of the products of the certain type of perishable products is above the quantity threshold but a quality associated with the products of the certain type of perishable products is below a quality threshold. In response to a determination that the quantity of the products of the certain type of perishable products is above the quantity threshold but the quality associated with the products of the certain type of perishable products is below the quality threshold, the at least one processing device may initiate an action for improving the quality associated with the products of the certain type of perishable products. The decision to improve the quality of perishable products while the quantity of perishable products is above the quantity threshold occurs when the specific time is, for example, about t=t2 in graph 2200.

Figure 23:
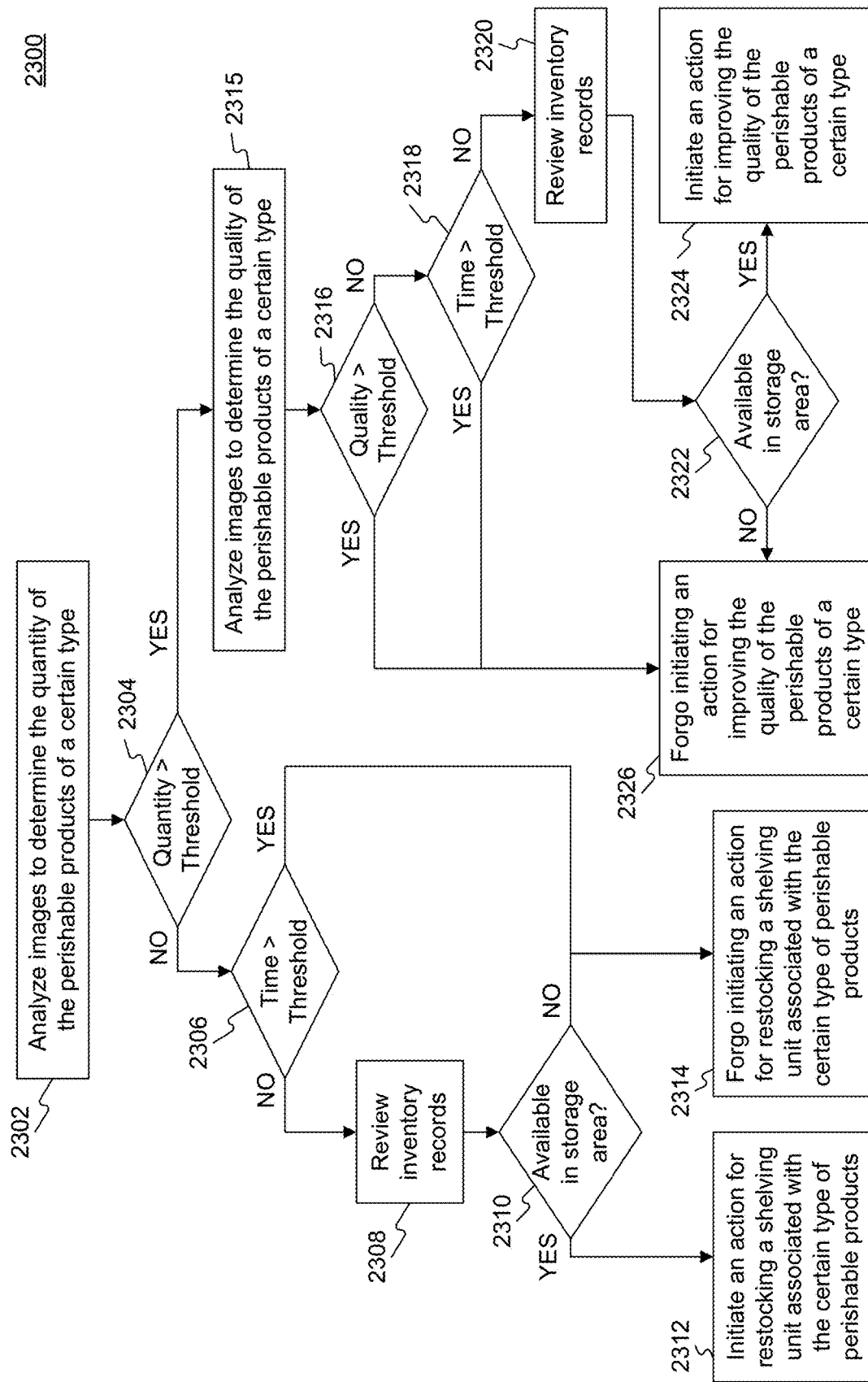
FIG. 23 is a flowchart of an exemplary process consistent with an embodiment for managing inventory of perishable products in retail stores consistent with the present disclosure.

FIG. 23 depicts a flowchart of an example process 2300 executed by a processing device of system 100 (e.g., processing device 202) for managing the quality and quantity of perishable products in retail store 105. For purposes of illustration, in the following description, reference is made to certain components of system 100. It will be appreciated, however, that other implementations are possible and that other components may be utilized to implement example process 2300. It will also be readily appreciated that the example process 2300 can be altered to modify the order of steps, delete steps, or further include additional steps.

Process 2300 begins when the processing device analyzes a received set of images to determine a quantity of the perishable products from a certain type of perishable products (block 2302), for example, as described above. The received set of images depicts the state of the perishable products from the certain type at a specific time. Thereafter, the processing device determines if the quantity of the perishable products from the certain type is greater than a quantity threshold (decision block 2304). In the example illustrated in FIG. 22, the quantity threshold was determined to be 50% for that certain type of perishable products. When the quantity of the products is below the quantity threshold, the processing device may determine if the specific time is greater than the time threshold (decision block 2306). In the example illustrated in FIG. 22, the time threshold was set to 6 PM. In other examples, the time threshold may be set to a selected time in day, to a selected duration before planned closure of the retail store, and so forth. When the specific time is before the time threshold, the processing device may review inventory records to determine availability of the products of the certain type of perishable products in the store's storage area (block 2308). Thereafter, the processing device may determine if additional products of the certain type of perishable products are currently available in a storage area associated with the retail store (decision block 2310). When additional products of the certain type of perishable products are currently available in the storage area, the processing device may initiate an action for restocking a shelving unit associated with the certain type of perishable products (block 2312). However, when additional products of the certain type of perishable products are not available in the storage area, and/or when the specific time is later than the time threshold, the processing device may determine to forgo initiating an action for restocking a shelving unit associated with the certain type of perishable products (block 2314). In some examples, the quantity threshold of decision block 2304 may be selected based on the type of the perishable product (for example, selecting a first quantity threshold for a first type of perishable product, and selecting a second quantity threshold for a second type of perishable product, where the first quantity threshold may differ from the second quantity threshold), the current time in day (for example, selecting a first quantity threshold at a first time in day, and selecting a second quantity threshold at a second time in day, where the first quantity threshold may differ from the second quantity threshold), the current day in week (for example, selecting a first quantity threshold at a first day in week, and selecting a second quantity threshold at a second day in week, where the first quantity threshold may differ from the second quantity threshold), the current date (for example, selecting a first quantity threshold at a first date, and selecting a second quantity threshold at a second date, where the first quantity threshold may differ from the second quantity threshold, for example when the first date correspond to a holiday and the second date do not correspond to a holiday), the location of the perishable product within the retail store (for example, selecting a first quantity threshold at a first location, and selecting a second quantity threshold at a second location, where the first quantity threshold may differ from the second quantity threshold), on the type of the retail store (for example, selecting a first quantity threshold at a first type of retail store, and selecting a second quantity threshold at a second type of retail store, where the first quantity threshold may differ from the second quantity threshold), and so forth.

The processing device may also analyze the received set of images to determine the quality of the perishable products of the certain type (block 2315), for example, as described above. Thereafter, the processing device determines if the quality of the products of the certain type is greater than a quality threshold (decision block 2316). In the example illustrated in FIG. 22, the quality threshold was determined to be 75% for the certain type of perishable products. When the quality of the products is below the quality threshold, the processing device may determine if the specific time is greater than the time threshold (decision block 2318). In some examples, the time threshold may be set to a selected time in day, to a selected duration before planned closure of the retail store, and so forth. The time threshold of decision block 2318 may be identical to or different from the time threshold of decision block 2306. When the specific time is before than the time threshold, the processing device may review inventory records (block 2320). Thereafter, the processing device may determine if additional products of the certain type of perishable products are currently available in a storage area associated with the retail store (decision block 2322). When additional products of the certain type of perishable products are currently available in the storage area, the processing device may initiate an action for improving the quality of the perishable products of the certain type (block 2324). However, when the quality of the perishable products are greater than the threshold, when additional products of the certain type of perishable products are not available in the storage area, and/or when the specific time is after than the time threshold, the processing device may forgo initiating an action for improving the quality of the perishable products of the certain type (block 2326). In one specific case, the action for improving the quality of the perishable products of the certain type may include removing rotten and/or expired products and does not include restocking the shelf with additional products. In this case, the action for improving the quality of the perishable products of the certain type may occur even when there are currently available in a storage area associated with the retail store (decision block 2322). In some examples, the quality threshold may be selected based on the type of the perishable product (for example, selecting a first quality threshold for a first type of perishable product, and selecting a second quality threshold for a second type of perishable product, where the first quality threshold may differ from the second quality threshold), the current time in day (for example, selecting a first quality threshold at a first time in day, and selecting a second quality threshold at a second time in day, where the first quality threshold may differ from the second quality threshold), the current day in week (for example, selecting a first quality threshold at a first day in week, and selecting a second quality threshold at a second day in week, where the first quality threshold may differ from the second quality threshold), the current date (for example, selecting a first quality threshold at a first date, and selecting a second quality threshold at a second date, where the first quality threshold may differ from the second quality threshold, for example when the first date correspond to a holiday and the second date do not correspond to a holiday), the location of the perishable product within the retail store (for example, selecting a first quality threshold at a first location, and selecting a second quality threshold at a second location, where the first quality threshold may differ from the second quality threshold), on the type of the retail store (for example, selecting a first quality threshold at a first type of retail store, and selecting a second quality threshold at a second type of retail store, where the first quality threshold may differ from the second quality threshold), and so forth.

Consistent with the present disclosure, the processing device action for restocking the shelving unit with additional products in block 2312 may include transmitting instructions for adding to the shelving unit products of the certain type of perishable products currently available in a storage area associated with retail store 105. In one embodiment, after determining that an action prompting restocking the shelving unit is needed, the at least one processing device may determine that there are no available products of the certain type of perishable products available in the storage area associated with the retail store (e.g., decision block 2310 and 2322). In response to the determination that there are no available products of the certain type of perishable products in the storage area associated with retail store 105, the at least one processing device may withhold from initiating the action prompting restocking the shelving unit. In another embodiment, in response to the determination that that there are no available products of the certain type of perishable products in the storage area associated with retail store 105, the at least one processing device may suggest placing on the shelving unit products from a different type of perishable product that are currently available in the storage area associated with retail store 105.

Consisted with an embodiment of the present disclosure, a processing device of system 100 may use artificial neural networks and machine learning algorithms to identify possible relationships between two or more types of products. The identified relationships may be for perishable products with regular retail products, or for perishable products with another type of perishable products. In one embodiment, the processing device may use the identified relationships to determine EP and SP suggestions, such as EP location suggestion 1922 and SP location suggestion 1928. For example, the at least one processing device may recommend placing tortilla chips and a recipe for guacamole next to ripe avocados. In another embodiment, the processing device may use the identified relationships to determine EP suggestions for a first type of perishable products at least partially based on indicators associated with a second type of perishable products.

Figure 24:
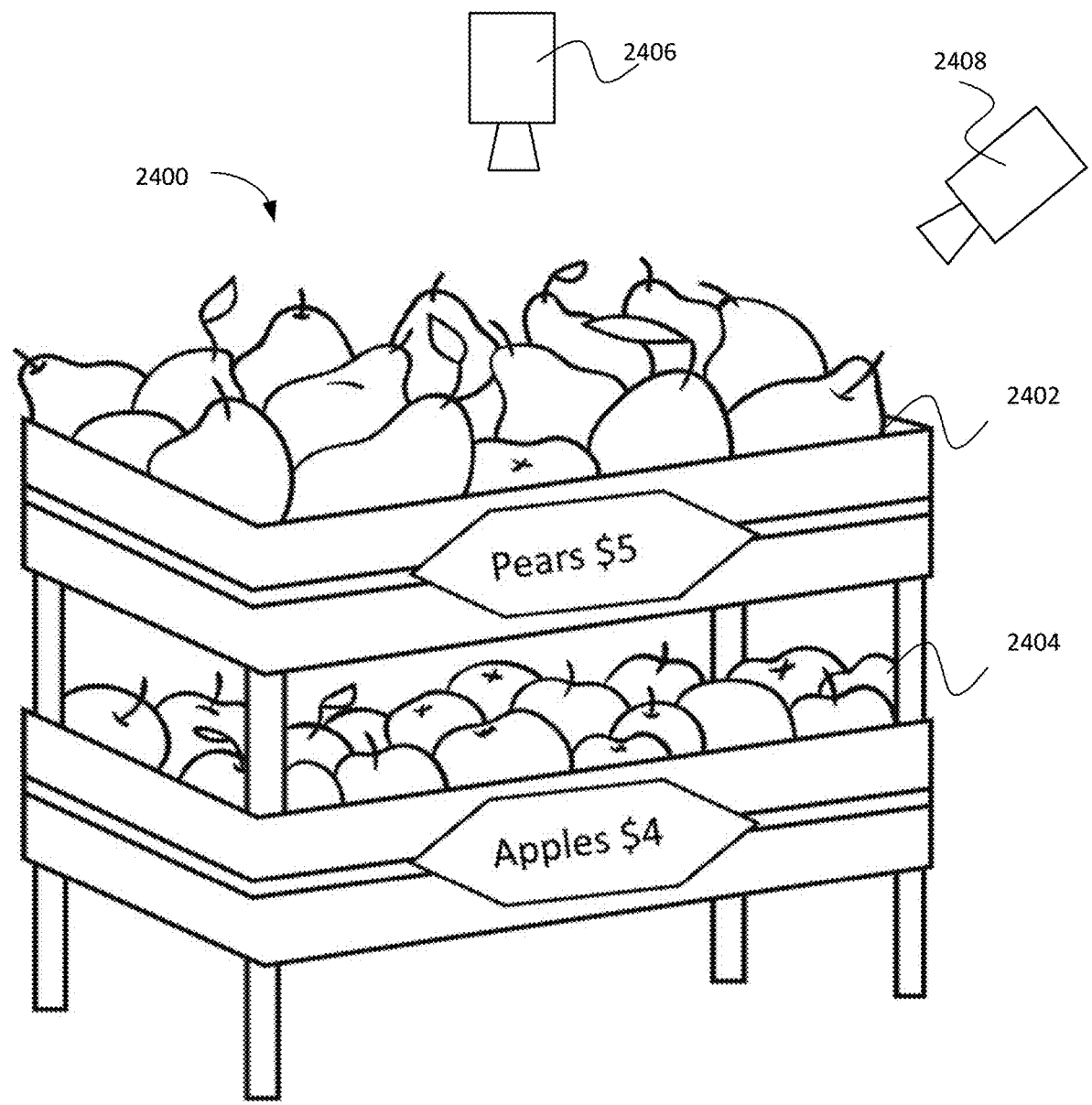
FIG. 24 is an illustration of a shelving unit with display areas for two different types of perishable products, consistent with the present disclosure.

FIG. 24 illustrates a shelving unit 2400 that includes a first display area 2402 for a first type of perishable products (e.g., pears) and a second display area 2404 for a second type of perishable products different from the first type of perishable product (e.g., apples). Consistent with the present disclosure, shelving unit 2400 may be monitored by a plurality of image capturing devices 125 (e.g., a first camera 2406 may be positioned above shelving unit 2400 and a second camera 2408 may be positioned to the side of shelving unit 2400). In one embodiment, an optical axis of first camera 2406 may be substantially vertical. For example, between −10° and 10° relative to a normal of the floor of retail store 105.

Consistent with the present disclosure, at least one processing device of system 100 may receive a set of images depicting a plurality of perishable products displayed on shelving unit 2400. In one embodiment, the set of images may be captured using at least one image capturing device 125 (such as camera 2406 and/or camera 2408). The set of images may be analyzed to identify a first area of shelving unit 2400 that includes perishable products and a second area of shelving unit 2400 that does not include perishable products. At least one processing device of system 100 may analyze the set of images to determine one or more EP indicators for perishable products from the first type of perishable products found on first display area 2402 and one or more EP indicators for perishable products from the second type of perishable products found on second display area 2404. In one example, the set of images may be analyzed to determine information to a user, such as a planogram compliance report, a shelf utilization report, and so forth.

In an embodiment, at least one processing device of system 100 may identify in the set of images representations of one or more products of a first type of perishable of products (e.g., pears) and one or more products of a second type of perishable products different from the first type of perishable products (e.g., apples). The at least one processing device of system 100 may analyze the set of images to determine information about a displayed inventory of the first type of perishable products and to determine information about a displayed inventory of the second type of perishable products. The determined information about the displayed inventories of the first and second types of perishable products may include one or more of: EP quality indicator 1900, EP quantity indicator 1902, EP demand indicator 1904, EP price indicator 1906, and EP planogram indicator 1908. In addition, the at least one processing device of system 100 may obtain information about additional perishable products of the first and second types of perishable products scheduled to be delivered to retail store 105. The obtained information about the scheduled products of the first and second types of perishable products may include SP quality indicator 1910, SP quantity indicator 1912, SP demand indicator 1914, SP cost indicator 1916, SP shelf-life indicator 1918, and SP ETA indicator 1920.

The at least one processing device of system 100 may determine to initiate an action prompting a clearance sale of the products of the first type of perishable products based on the determined information about the displayed inventory of the first type of perishable product, the obtained information about additional perishable products of the first type of perishable products scheduled to be delivered to retail store 105, or a combination of both. In a similar manner, the at least one processing device of system 100 may determine one or more indicators for the second type of perishable products. Thereafter, the at least one processing device of system 100 may determine to avoid initiating an action prompting a clearance sale of products of the second type of perishable products based on: the determined information about the displayed inventory of the first type of perishable product, the obtained information about additional perishable products of the first type of perishable products scheduled to be delivered to retail store 105, the determined information about the displayed inventory of the second type of perishable products, the obtained information about additional perishable products of the second type of perishable products scheduled to be delivered to retail store 105, or a combination of them.

Figure 25:
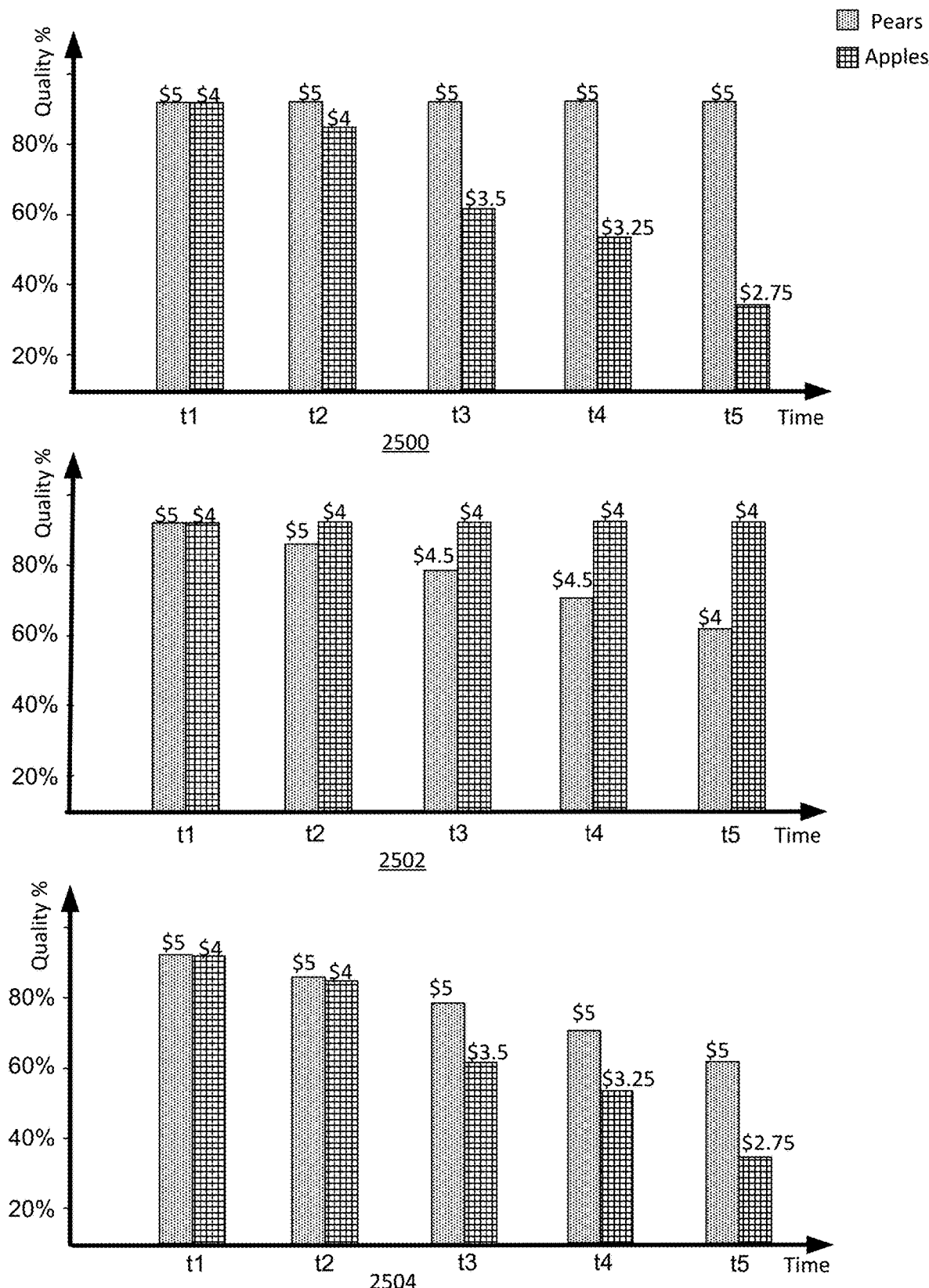
FIG. 25 includes three bar diagrams illustrating an implementation of an embodiment for managing inventory of perishable products in retail stores consistent with the present disclosure.

FIG. 25 illustrates three bar diagrams showing three scenarios in which the prices of the first and second types of products change with respect to changes of quality over time. In the three bar diagrams in FIG. 25 the quality of perishable products from the first and second types of products is depicted as the only factor for determining the price of the first and second types of products. However, one of ordinary skill in the art will recognize that any EP indicator or any SP indicator (or any combination of indicators) associated with perishable products from the first and second types of products may be used in determining the price of the first and second types of products. For example, the processing device may initiate an action prompting a clearance sale of perishable products from a first type based on data about the upcoming shipment of perishable products of the second type of products.

In a first bar diagram 2500, the quality of the apples declines over time and the quality of the pears remains substantially the same. As illustrated in first bar diagram 2500, at t=t3 the processing device determines to reduce the price of the apples. The price of the apples is being differentially reduced throughout a period of time from $4 per Kg to $2.75 per Kg and the price of the pears remains $5 per Kg. In a second bar diagram 2502, the quality of the pears declines over time and the quality of the apples remains substantially the same. As illustrated in second bar diagram 2502, at t=t3 the processing device may determine reduce the price of the pears. The price of the pears is being differentially reduced throughout a period of time from $5 per Kg to $4 per Kg and the price of the apples remains $4 per Kg. In a third bar diagram 2504, both the quality of the apples and the quality of the pears decline over time. As illustrated in third bar diagram 2504, at t=t3 the processing device may determine to differentially reduce the price of the apples while determining to keep the price of the pears at $5 per Kg. The price of the pears remains $5 per Kg even when their quality declines.

The following describes an example scenario that would explain why in third bar diagram 2504 the processing device determines to differentially reduce the price of the apples from $4 to $2.75 while keeping the price of the pears at $5 per Kg. In the example scenario, the demand for pears is higher than the demand for apples, and retail store 105 has a rule that when the quality of a product is below 30%, it should be thrown away. Consistent with third bar diagram 2504, at t=t3, the processing device may predict that the quality of the apples will decline faster than the quality of the pears. Retail store 105 has incentive to sell as many apples before their quality reaches to the 30% threshold. Based on the determined relationship between apples and pears, the processing device predicts that lowering the price of the pears will hurt the sale of the apples. Therefore, the processing device may avoid initiating an action prompting a clearance sale of pears.

In some embodiments, the processing device may determine if initiating the action prompting a clearance sale of the products of the first type of perishable products is needed based on information about products of the first type of perishable products available in a storage area associated with retail store 105. In addition, the processing device may determine if initiating the action prompting a clearance sale of the products of the first type of perishable products is needed based on information about products of the first type of perishable products scheduled to be delivered to retail store 105. In a similar example, assuming the demand for pears is higher than the demand for apples and a shipment of apples is scheduled to arrive soon, retail store 105 may have an incentive to sell as many apples before the shipment of apples arrives. Based on the determined relationship between apples and pears, the processing device may predict that lowering the price of the pears will hurt the sale of the apples. Therefore, the processing device may note initiate an action prompting a clearance sale of pears.

In other embodiments, the processing device may use EP indicators associated with products of the first type of perishable products to determine whether the products from the first type of perishable products need to be cleared by the end of the day. Alternatively, the processing device may use EP indicators associated with products of the first type of perishable products to determine whether the products from the first type of perishable products need to be cleared by the end of the week. In case the processing device determines that the products of the first type of perishable products need to be cleared by the end of a given time window, it may initiate the action prompting the clearance sale of the products of the first type of perishable products. For example, as discussed above, the processing device may use one or more EP indicators to predict that the condition of the products of the first type of perishable products will be below a quality threshold by the end of the day (or the end of the week) and accordingly initiate the action prompting the clearance sale.

Consistent with the present disclosure, the action prompting a clearance sale of the products of the first type of perishable products may include transmitting instructions to differentially lower a price of the first type of perishable products throughout a period of time. The processing device may determine a rate for lowering the price of the first type of perishable products based on changes in the determined quality of products of the first type. For example, when the first type of perishable products should be cleared by the end of the day, the prices may change every hour. Alternatively, the action prompting a clearance sale of the products of the first type of perishable products includes transmitting instructions to move the products of the first type of perishable products to a location with a higher customer throughput. With reference to the example discussed above, the apples may be moved to first display area 2402, and the pears may be moved to second display area 2404. In specific cases where the first type of perishable products is being produced in retail store 105 (e.g., baked goods), the action prompting a clearance sale may include transmitting instructions to stop producing more products of the first type of perishable products.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for identifying perishable products in a retail store based on analysis of image data and for automatically generating suggestions relating to the identified products, the system comprising:

at least one processor configured to:
receive, from an image capture device, at least one hyperspectral digital image depicting a plurality of perishable products displayed on at least one shelving unit in a retail store;
transform the at least one hyperspectral digital image to generate transformation digital image data by using a transformation function, the transformation function comprising at least one of a convolution, a visual filter, or a nonlinear function;
analyze the transformation digital image data using an image analysis technique to determine information about a displayed inventory of the plurality of perishable products, the information comprising an indicator of an existing product, the analysis of the transformation image data comprising:
comparing the transformation digital image data to a product quality profile pattern, the product quality profile pattern having been generated by a first machine learning model, the first machine learning model having been trained using combinations of digital hyperspectral images and corresponding levels of product qualities including measured levels of hyperspectral wavelength information or waveband information for chemical constituents; and
determining that values of the transformation digital image data match values of the product quality profile pattern within a value threshold;
receive information from at least one external source, the information indicating additional perishable products scheduled to be displayed on the at least one shelving unit;
analyze, using a second machine learning model, the received information to determine an indicator of a scheduled product associated with the additional perishable products, wherein the second machine learning model is configured to learn relationships between product scheduling information and a state of products when delivered to predict a future state of products after delivery;
generate, based on the indicator of the existing product and the indicator of the scheduled product, at least one suggestion regarding placement of perishable products in the retail store; and
transmit, to a device associated with an entity of the retail store, instructions for implementing the at least one suggestion.

2. The system of claim 1, wherein the information about the displayed inventory includes quantity indicators for multiple types of perishable products, and wherein the at least one processor is configured to:
determine the quantity indicators for the multiple types of perishable products based on analysis of the at least one image; and
use the determined quantity indicators for the multiple types of perishable products to generate the at least one suggestion regarding placement of perishable products in the retail store.

3. The system of claim 1, wherein the information about the displayed inventory includes quality indicators for multiple types of perishable products, and wherein the at least one processor is configured to:
determine the quality indicators for the multiple types of perishable products based on analysis of the at least one image; and
use the determined quality indicators for the multiple types of perishable products to generate the at least one suggestion regarding placement of perishable products in the retail store.

4. The system of claim 1, wherein the information about the displayed inventory includes demand indicators for multiple types of perishable products, and wherein the at least one processor is configured to:
determine the demand indicators for the multiple types of perishable products based on analysis of the at least one image; and
use the determined demand indicators for the multiple types of perishable products to generate the at least one suggestion regarding placement of perishable products in the retail store.

5. The system of claim 1, wherein the received information indicating the additional perishable products scheduled to be displayed on the at least one shelving unit includes a quantity indicator for the additional perishable products, and wherein the at least one processor is configured to generate the at least one suggestion regarding placement of the additional perishable products based on the quantity indicator of the additional perishable products.

6. The system of claim 1, wherein the received information indicating the additional perishable products scheduled to be displayed on the at least one shelving unit includes a quality indicator for the additional perishable products, and wherein the at least one processor is configured to generate the at least one suggestion regarding placement of the additional perishable products based on the quality indicator for the additional perishable products.

7. The system of claim 1, wherein the received information indicating the additional perishable products scheduled to be displayed on the at least one shelving unit includes a shelf-life estimation of the additional perishable products, and wherein the at least one processor is configured to generate the at least one suggestion regarding placement of the additional perishable products based on the shelf-life estimation of the additional perishable products.

8. The system of claim 1, wherein the received information indicating the additional perishable products scheduled to be displayed on the at least one shelving unit includes costs associated with the additional perishable products, and wherein the at least one processor is configured to generate the at least one suggestion regarding placement of the additional perishable products based on the costs of the additional perishable products.

9. The system of claim 1, wherein the received information indicating the additional perishable products scheduled to be displayed on the at least one shelving unit includes estimated arrival time of the additional perishable products, and wherein the at least one processor is configured to generate the at least one suggestion regarding placement of the additional perishable products based on the estimated arrival time of the additional perishable products.

10. The system of claim 1, wherein the received information indicating the additional perishable products scheduled to be displayed on the at least one shelving unit includes a predicted demand for the additional perishable products, and wherein the at least one processor is configured to generate the at least one suggestion regarding placement of the additional perishable products based on the predicted demand for the additional perishable products.

11. The system of claim 1, wherein the at least one suggestion includes an indication of a temporary location for at least some of the plurality of perishable products to reside prior to arrival of the additional perishable products, and wherein the at least one processor is configured to determine the temporary location for the at least some of the plurality of perishable products based on the information about the displayed inventory and the information indicating the additional perishable products.

12. The system of claim 1, wherein the at least one placement suggestion includes an indication of a temporary size of a display area for at least some of the plurality of perishable products to be used prior to arrival of the additional perishable products, and wherein the at least one processor is configured to determine the temporary size based on the information about the displayed inventory and the information indicating the additional perishable products.

13. The system of claim 1, wherein the at least one placement suggestion includes an indication of a temporary price for at least some of the plurality of perishable products to be applied prior to arrival of the additional perishable products, and wherein the at least one processor is configured to determine the temporary price based on the information about the displayed inventory and the information indicating the additional perishable products.

14. The system of claim 1, wherein the at least one placement suggestion includes an indication of a location for placing the additional perishable products on the at least one shelving unit, and wherein the at least one processor is configured to determine the location for placing the additional perishable products based on the information about the displayed inventory and the information indicating the additional perishable products.

15. The system of claim 1, wherein the at least one placement suggestion includes an indication of a size for a display area for the additional perishable products, and wherein the at least one processor is configured to determine the size for the display area based on the information about the displayed inventory and the information indicating the additional perishable products.

16. The system of claim 1, wherein the at least one placement suggestion includes a price for the additional perishable products, and wherein the at least one processor is configured to determine the price for the additional perishable products based on the information about the displayed inventory and the information indicating the additional perishable products.

17. The system of claim 1, wherein the at least one processor is further configured to:
receive information about perishable products available in a storage area of the retail store; and
use the information about the perishable products available in the storage area and the information indicating the additional perishable products to determine at least one task for reorganizing perishable products in the retail store.

18. The system of claim 17, wherein the at least one task for reorganizing perishable products includes a task for reorganizing perishable products currently available in the storage area.

19. The system of claim 17, wherein the at least one task for reorganizing perishable products includes a task for reorganizing perishable products placed on the at least one shelving unit.

20. The system of claim 17, wherein the at least one processor is further configured to:
predict a condition of the perishable products available in the storage area of the retail store at a time when the additional perishable products are scheduled to arrive; and
use the information about the perishable products available in the storage area, the information indicating the additional perishable products, and the predicted condition to determine at least one task for reorganizing perishable products in the retail store.

21. The system of claim 1, wherein the at least one processor is further configured to analyze the transformation image data by distinguishing a first product represented in the transformation image data from a second product using a classification algorithm generated by a third model learning model.

22. The system of claim 1, wherein comparing the transformation image data to the product quality profile pattern is performed as part of a sequence of fuzzy matching between the transformation image data and a plurality of product quantity profile patterns stored in a database.

23. The system of claim 1, wherein the at least one external source is a sensor in a product transportation vehicle.

24. The system of claim 1, wherein the generated suggestion is dependent on at least one of: a product quantity, a type of the plurality of perishable products, a current date, a current time, a product location within the retail store, or a type of retail store.

25. The system of claim 1, wherein the first and second machine learning models are each at least one of: a deep neural network or a convolutional neural network.

26. The system of claim 1, wherein the second machine learning model is a regression model and analyzing the received information to determine an indicator of a scheduled product comprises predicting a state of the additional perishable products at a scheduled delivery time.

27. The system of claim 1, wherein the information about the displayed inventory of the plurality of perishable products is further determined based on analysis of data captured by at least one weight sensor or at least one pressure sensor.

28. The system of claim 1, wherein the analysis of the transformation image data further comprises determining a ripeness associated with the plurality of perishable products based on the determining that the values of the transformation digital image data match the values of the product quality profile pattern within the value threshold.

29. The system of claim 1, wherein transforming the at least one hyperspectral digital image comprises constructing a 3D image.

30. A method for identifying perishable products in a retail store based on analysis of image data and for automatically generating suggestions relating to the identified products, the method comprising:
- receiving, from an image capture device, at least one hyperspectral digital image depicting a plurality of perishable products displayed on at least one shelving unit in a retail store;
- transform the at least one hyperspectral digital image to generate transformation digital image data by using a transformation function, the transformation function comprising at least one of a convolution, a visual filter, or a nonlinear function;
- analyzing the transformation digital image data using an image analysis technique to determine information about a displayed inventory of the plurality of perishable products, the information comprising an indicator of an existing product, the analysis of the transformation image data comprising:
  - comparing the transformation digital image data to a product quality profile pattern, the product quality profile pattern having been generated by a first machine learning model, the first machine learning model having been trained using combinations of hyperspectral digital images and corresponding levels of product qualities including measured levels of hyperspectral wavelength information or waveband information for chemical constituents; and
  - determining that values of the transformation digital image data match values of the product quality profile pattern within a value threshold;
- receiving information from at least one external source, the information indicating additional perishable products scheduled to be displayed on the at least one shelving unit;
- analyzing, using a second machine learning model, the received information to determine an indicator of a scheduled product associated with the additional perishable products, wherein the second machine learning model is configured to learn relationships between product scheduling information and a state of products when delivered to predict a future state of products after delivery;
- generating, based on the indicator of the existing product and the indicator of the scheduled product, at least one suggestion regarding placement of perishable products in the retail store; and
- transmitting, to a device associated with an entity of a retail store, instructions for implementing the at least one suggestion.

31. A computer program product for identifying perishable products in a retail store based on analysis of image data and for automatically generating placement suggestions relating to the identified products embodied in a non-transitory computer-readable medium and executable by at least one processor, the computer program product including instructions for causing the at least one processor to execute a method comprising:
- receiving, from an image capture device, at least one hyperspectral digital image depicting a plurality of perishable products displayed on at least one shelving unit in a retail store;
- transform the at least one hyperspectral digital image to generate transformation digital image data by using a transformation function, the transformation function comprising at least one of a convolution, a visual filter, or a nonlinear function;
- analyzing the transformation digital image data using an image analysis technique to determine information about a displayed inventory of the plurality of perishable products, the information comprising an indicator of an existing product, the analysis of the transformation image data comprising:
  - comparing the transformation digital image data to a product quality profile pattern, the product quality profile pattern having been generated by a first machine learning model, the first machine learning model having been trained using combinations of hyperspectral digital images and corresponding levels of product qualities including measured levels of hyperspectral wavelength information or waveband information for chemical constituents; and
  - determining that values of the transformation digital image data match values of the product quality profile pattern within a value threshold;
- receiving information from at least one external source, the information indicating additional perishable products scheduled to be displayed on the at least one shelving unit;
- analyzing, using a second machine learning model, the information to determine an indicator associated with a scheduled product, wherein the second machine learning model is configured to learn relationships between product scheduling information and a state of products when delivered to predict a future state of products after delivery;
- generating, based on the indicator of the existing product and the indicator of the scheduled product, at least one suggestion regarding placement of perishable products in the retail store; and
- transmitting, to a device associated with an entity of the retail store, instructions for implementing providing the at least one suggestion.

* * * * *